(12) United States Patent
White et al.

(10) Patent No.: US 11,865,862 B2
(45) Date of Patent: Jan. 9, 2024

(54) HUB AND ROTOR ASSEMBLY

(71) Applicant: Hendrickson USA, L.L.C., Schaumburg, IL (US)

(72) Inventors: Jay D. White, North Canton, OH (US); Matthew P. Karich, Fairlawn, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 487 days.

(21) Appl. No.: 17/077,529

(22) Filed: Oct. 22, 2020

(65) Prior Publication Data

US 2021/0039435 A1 Feb. 11, 2021

Related U.S. Application Data

(63) Continuation-in-part of application No. 15/985,865, filed on May 22, 2018, now Pat. No. 10,851,860.

(Continued)

(51) Int. Cl.
*F16D 65/12* (2006.01)
*B60B 27/00* (2006.01)
*F16D 65/02* (2006.01)

(52) U.S. Cl.
CPC ........ *B60B 27/0052* (2013.01); *F16D 65/123* (2013.01); *B60B 2360/102* (2013.01); *B60B 2900/111* (2013.01); *B60B 2900/113* (2013.01); *B60B 2900/311* (2013.01); *B60B 2900/321* (2013.01); *B60B 2900/541* (2013.01); *F16D 65/128* (2013.01); *F16D 2065/1328* (2013.01); *F16D 2065/1384* (2013.01)

(58) Field of Classification Search
CPC .......... B60B 27/0052; B60B 2360/102; B60B 2900/111; B60B 2900/113; B60B 2900/311; B60B 2900/321; B60B 2900/541; F16D 65/123; F16D 65/128; F16D 2065/1328; F16D 2065/1384
USPC .................................. 188/17, 18 A, 218 XL
See application file for complete search history.

(56) References Cited

U.S. PATENT DOCUMENTS

| | | | |
|---|---|---|---|
| 10,851,860 B2 * | 12/2020 | Wittlinger | F16D 65/128 |
| 2003/0121153 A1 * | 7/2003 | Tajima | F16D 65/12 29/898.062 |

(Continued)

FOREIGN PATENT DOCUMENTS

DE 102019202215 A1 * 8/2020 ................ B60T 1/06

*Primary Examiner* — Christopher P Schwartz
(74) *Attorney, Agent, or Firm* — Dureska & Moore, LLC; David P. Dureska; David J. Danko

(57) ABSTRACT

A disc brake hub and rotor assembly for a heavy-duty vehicle. The disc brake hub and rotor assembly includes a hub receivable on and rotatable about an axle spindle of a heavy-duty vehicle. A rotor is connectable with the hub for rotation with the hub. The rotor includes a disc segment, a flange mounting segment, and a cylindrical sleeve segment connecting the disc segment and the flange mounting segment. A flange is connectable with the flange mounting segment and separately with the hub. The flange mounting segment of the rotor has an inboard facing surface at least part of which is for engaging head portions of wheel studs. The inboard facing surface is substantially planar and free of wheel stud clearance reliefs. A transition region is located between the flange mounting segment and sleeve segment and is also free of wheel stud clearance reliefs.

26 Claims, 35 Drawing Sheets

Related U.S. Application Data

(60) Provisional application No. 62/634,237, filed on Feb. 23, 2018, provisional application No. 62/510,805, filed on May 25, 2017.

(56) References Cited

U.S. PATENT DOCUMENTS

| | | | | |
|---|---|---|---|---|
| 2011/0062772 A1* | 3/2011 | White | ............... | B60B 27/001 29/446 |
| 2012/0247881 A1* | 10/2012 | Root | ............... | F16D 65/123 188/18 A |
| 2015/0021128 A1* | 1/2015 | White | ............... | F16D 65/12 188/218 XL |
| 2015/0369313 A1* | 12/2015 | White | ............... | F16D 65/123 188/218 XL |

* cited by examiner

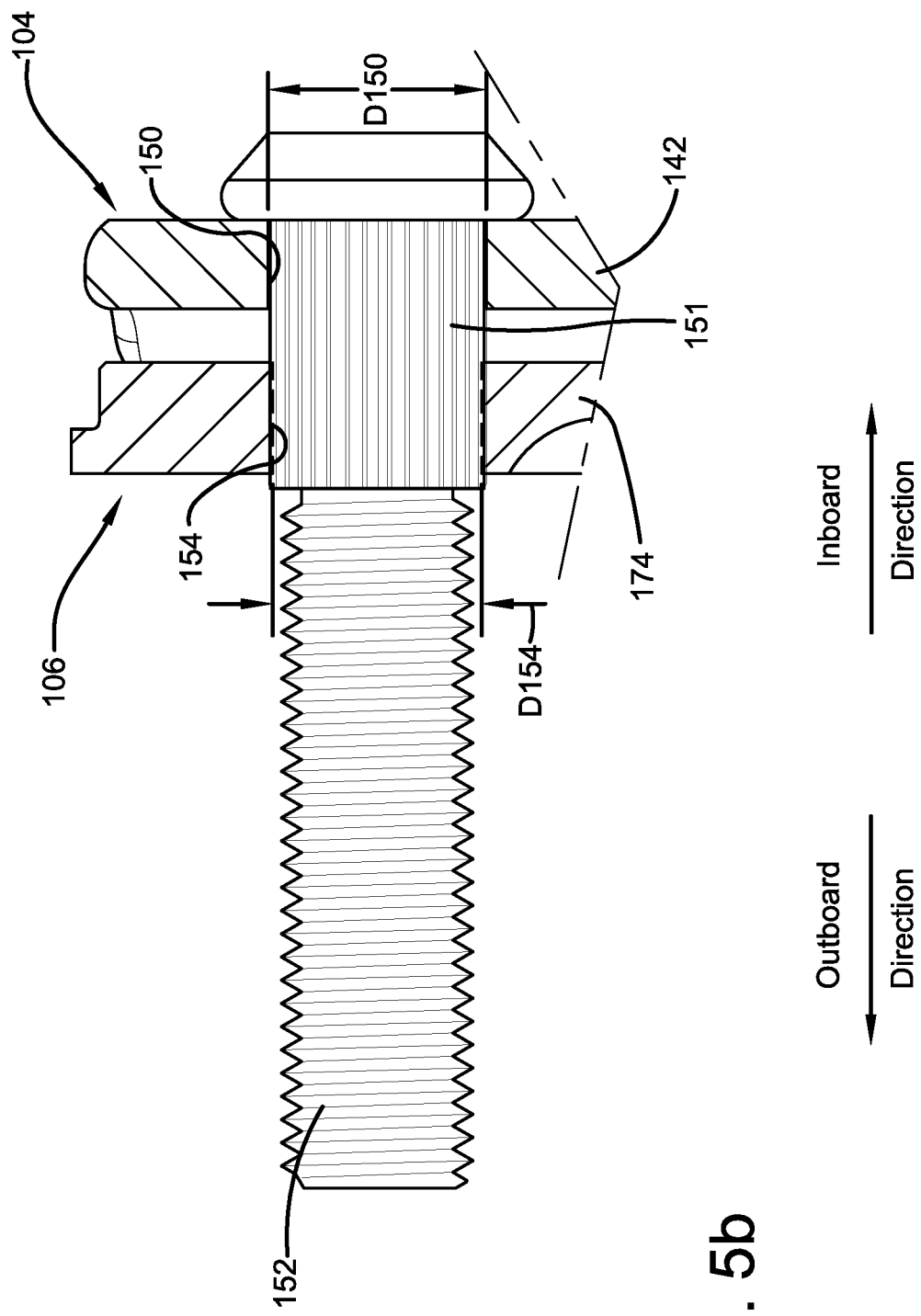

HUB AND ROTOR ASSEMBLY

CROSS-REFERENCE TO RELATED APPLICATIONS

This application is a continuation-in-part and claims the benefit of U.S. patent application Ser. No. 15/985,865 filed May 22, 2018 which in turn claims the benefit of U.S. Provisional Patent Application Ser. No. 62/510,805 filed May 25, 2017 and U.S. Provisional Patent Application Ser. No. 62/634,237 filed Feb. 23, 2018, the entire contents of each are incorporated herein by reference in their entireties.

TECHNICAL FIELD

The disclosed subject matter relates generally to a hub and rotor assembly used in wheel end assemblies for heavy-duty vehicles. The disclosed subject matter relates particularly to structure of the rotor and to wheel mounting studs.

BACKGROUND

Disc brake systems are common on many types of vehicles ranging from automobiles to heavy-duty vehicles. Air disc brake systems are one type of disc brake system and are often employed on heavy-duty vehicles. Heavy-duty vehicles include trucks, tractor-trailers and semi-trailers, and trailers, and the tractor-trailers or semi-trailers may be equipped with one or more trailers. Reference shall be made generally throughout to a heavy-duty vehicle for the purpose of convenience.

Air disc brake systems for vehicles are known. Such air disc brake systems operate by using air pressure to force a pair of opposing brake pads toward one another and against a disc of a rotor. Friction is created between the brake pads and the disc to slow or stop the vehicle. The disc brake system typically has a plurality of disc brake assemblies associated with the heavy-duty vehicle. Each disc brake assembly is operatively mounted on a wheel end assembly of the heavy-duty vehicle.

The disc brake assembly includes a rotor and a hub, both of which are typically made from cast iron. The rotor includes an integrally formed flange that mounts to a hub of a wheel end assembly by mechanical fasteners, such as bolts. A sleeve also is integrally formed with, and extends between, the disc and the flange of the rotor. The flange of the rotor is located at the outboard end of the rotor. The hub has a mounting flange. The flange of the rotor is attached to the hub at a location inboard of the mounting flange of the hub. The smallest inner diameter or dimension of the rotor is less than the largest outer diameter of the hub. Thus, in order to service or replace the rotor, the hub must be removed from the axle spindle typically with the rotor still attached.

The rotor mounted to the hub is relatively heavy. The rotor and hub assembly can exceed 100 pounds in weight. At this weight, the rotor and hub assembly is somewhat difficult to handle and generally requires lift assist equipment, which may or may not be available and convenient, or more than one service technician to help lift the hub and rotor assembly. The prior art disc brake hub and rotor assemblies also require a skilled service technician to devote considerable time to service prior art air disc brake systems. The relatively long service time contributes to the heavy-duty vehicle being out of service and not generating revenue. The relatively heavy weight of the rotor and hub assembly increases the likelihood of accidentally damaging a main wheel seal and/or bearing while removing and/or installing the relatively heavy prior art hub and rotor assembly.

The previously known hub and rotor assemblies, while mostly satisfactory for their intended purpose, do have certain limitations, drawbacks and disadvantages. For example, the radially-extending mounting flange of the known disc brake rotor is typically mounted on the inboard side of the radially extending attachment portion of the wheel hub. The largest outer diameter of the mounting flange of the hub is larger than the smallest inner diameter of the disc brake rotor. As a result, should the disc brake rotor require servicing or replacement, the hub must be removed with the disc brake rotor attached. This can be a relatively heavy assembly that is difficult to handle. The relatively heavy hub and rotor assembly must then be maneuvered off of the axle spindle which may cause damage to the bearings and/or main wheel seal during removal or installation of the assembly from or onto the axle spindle.

Another drawback with previously known hub and rotor assemblies, especially when attempts are made to lighten the weight of components, is that unintended stresses are introduced that may affect strength and fatigue life of the components. For example, a region of a rotor adjacent openings for wheel studs may have modified portions to facilitate installation of the wheel studs. The modified portions may have material of the rotor removed to create clearance reliefs for wheel stud installation. Such material removal may create areas in the rotor that have less than optimal overall strength and fatigue life of the rotor. Further, the wheel studs themselves may be of a design that may be difficult to fully install. Therefore, it is desirable to provide a disc brake hub and rotor assembly having a rotor that is relatively light in weight while maintaining or improving strength and fatigue life and to provide an improved wheel stud.

The improved disc brake hub and rotor assembly for heavy-duty vehicles according to the disclosed subject matter satisfies these needs and overcomes the drawbacks, limitations and disadvantages of prior art hub and rotor assemblies. That is, a disc brake hub and rotor assembly of the disclosed subject matter includes an improved disc brake rotor with a flange mounting segment having an inboard facing surface at least part of which is for engaging portions of wheel fastening studs. The inboard facing surface is substantially planar and free of wheel stud head clearance reliefs. The rotor also employs a new and improved wheel stud that extend through openings in the mounting structure of the rotor and through openings in the flange for securing a wheel to the flange.

SUMMARY

A summary is provided to introduce concepts of the disclosed subject matter. The summary is not intended to identify key factors or essential features of the disclosed subject matter. The summary also is not intended to limit the scope of the disclosed subject matter.

An improved disc brake hub and rotor assembly for heavy-duty vehicles of the disclosed subject matter is relatively light weight, strong, and employs an improved wheel stud. The improved disc brake hub and rotor assembly permits a rotor to be removed from the wheel end assembly without removing a hub portion from an axle spindle. While several aspects may be described, it is to be understood that such description or descriptions would apply equally to all aspects.

The disclosed subject matter, according to at least one aspect, provides a three-piece disc brake hub and rotor assembly for an air disc braking system of a heavy-duty vehicle. The disc brake hub and rotor assembly includes a hub. The hub is receivable on, and rotatable about, an axle spindle of the heavy-duty vehicle. A rotor includes a disc segment, a flange mounting segment and a substantially cylindrical sleeve segment connecting the disc segment with the flange mounting segment. A flange connects separately with the rotor portion. The flange also connects separately with the hub. A smallest inner dimension of the rotor is greater than a largest outer dimension of the hub to provide for removal of the rotor without removing the hub from the axle spindle. The flange and flange mounting segment of the rotor connect to the hub at a location outboard of mounting structure of the hub. The hub may be removed from the axle spindle without removing the rotor.

That is, a disc brake hub and rotor assembly of the disclosed subject matter includes the rotor having an inboard facing surface at least part of which is for engaging portions of wheel fastening studs. The inboard facing surface is substantially planar and free of wheel stud head clearance reliefs. The rotor further includes a transition region located between the flange mounting segment and sleeve segment. The transition region is also free of wheel stud clearance reliefs. The rotor has a caliper clearance section of a first diameter in the sleeve segment. The caliper clearance section is located between axially opposite sleeve end sections of second diameters. The second diameters are greater than the first diameter. One of the sleeve end sections is located in the transition region of the rotor.

The flange mounting segment of the rotor is constructed to have a plurality of circumferentially spaced apart wheel mounting flange engaging bosses in an outboard facing surface. The flange mounting segment of the rotor has a plurality of lips. Each of the lips extends axially from a respective one of the bosses to assist in receiving and positioning the flange.

The disc brake hub and rotor assembly includes a plurality of new and improved mechanical fasteners or wheel mounting studs that extend through openings in the mounting structure of the rotor and through openings in a flange. Each of the wheel studs has a knurled portion extending for a length through an opening in the flange mounting structure of the rotor but not in the opening in the flange. The knurled portion engages a surface of the opening in the flange mounting structure. The length of the knurled portion is no greater than a thickness of the flange mounting structure. The wheel stud has a cylindrical portion axially spaced from the knurled portion and interference fit into an opening in the flange. A diameter of the openings in the flange mounting segment of the rotor is greater than a diameter of the openings in the flange.

DRAWINGS

The following description and drawings set forth certain illustrative aspects and implementations of the disclosed subject matter. The description and drawings are indicative of but a few of the various ways in which one or more aspects or implementations may be employed. Further features of the disclosed subject matter will become apparent from reading the description with reference to the accompanying drawings, in which:

FIG. 5a is a greatly enlarged fragmentary cross-sectional view of a portion of the disc brake hub and rotor assembly illustrating components cooperating to define a passage for cooling fluid to flow through;

FIG. 5b is a greatly enlarged fragmentary cross-sectional view of a hub portion illustrating stud mounting structure in a rotor portion and a flange portion of the disc brake hub and rotor assembly;

Figure 9:
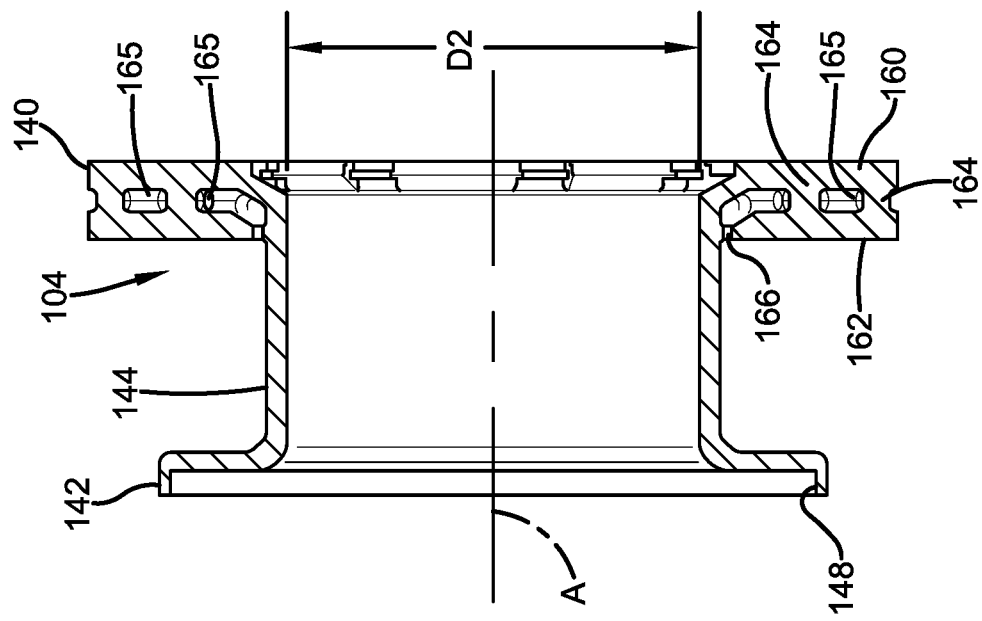
Figure 8:
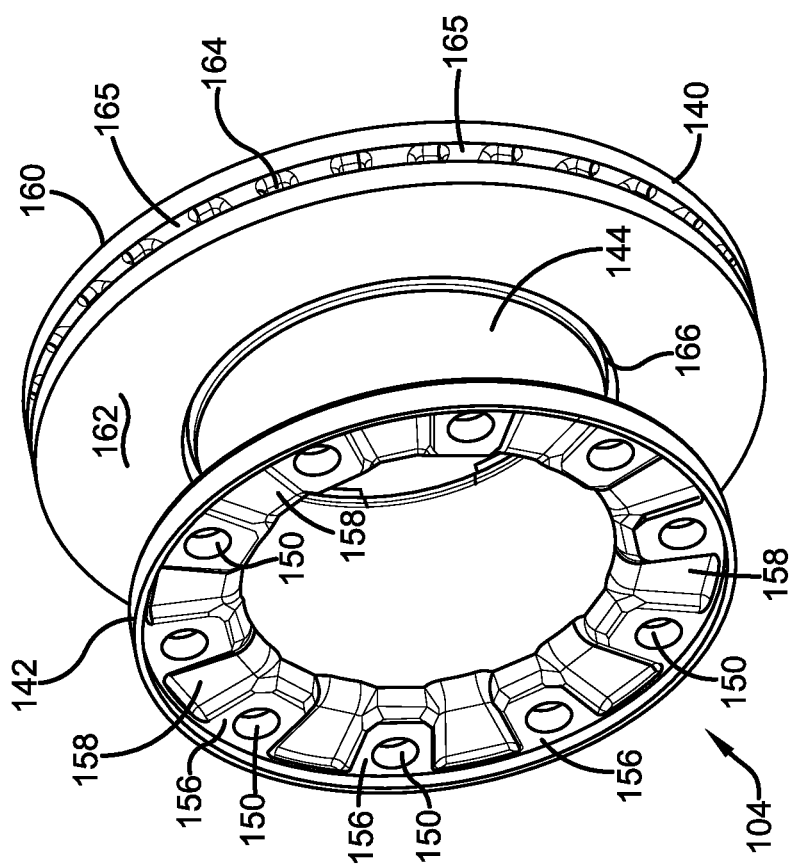
FIG. 8 is a perspective view of a rotor portion of the disc brake hub and rotor assembly.
Figure 11:
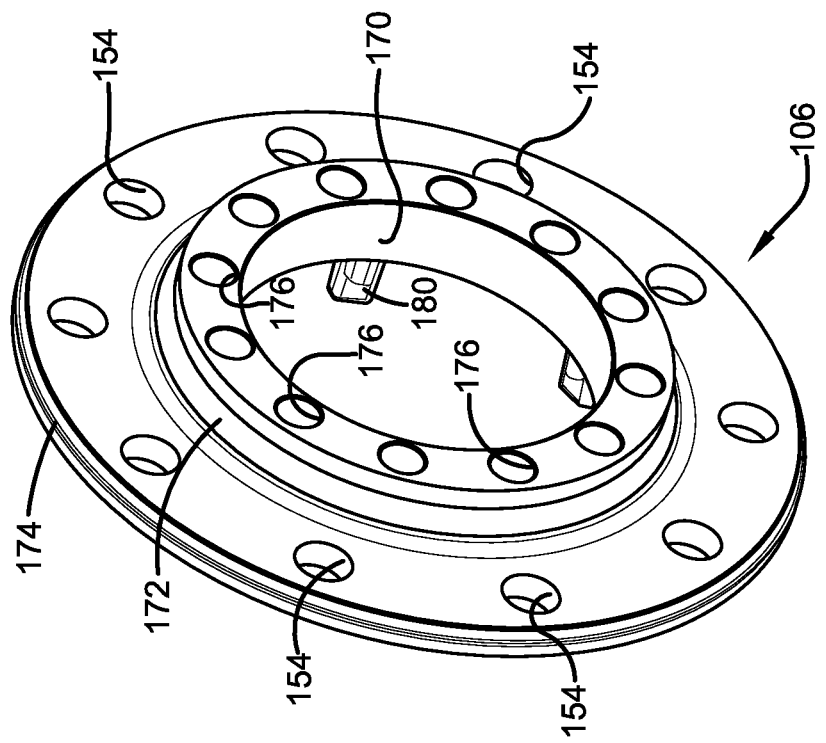
Figure 10:
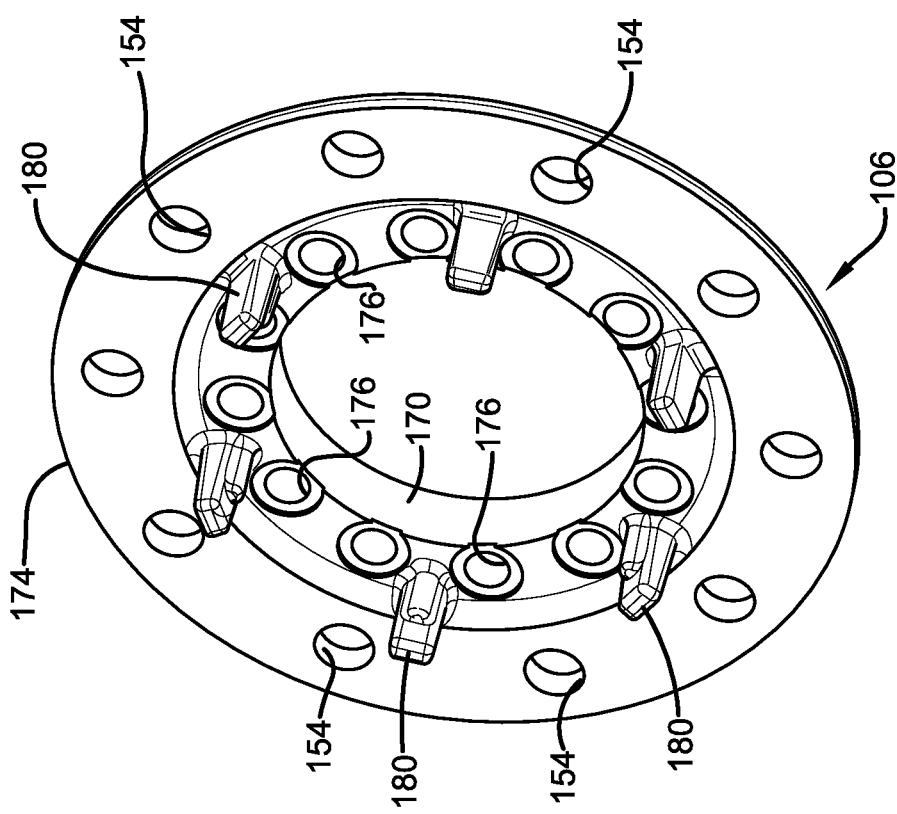
Figure 12:
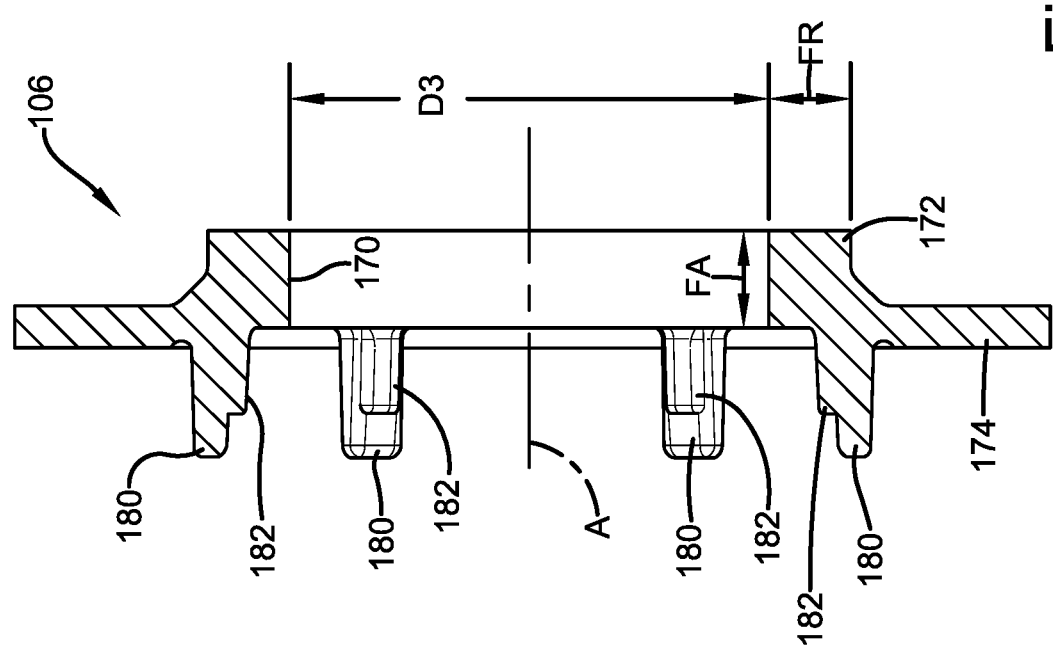
Figures 13, 14:
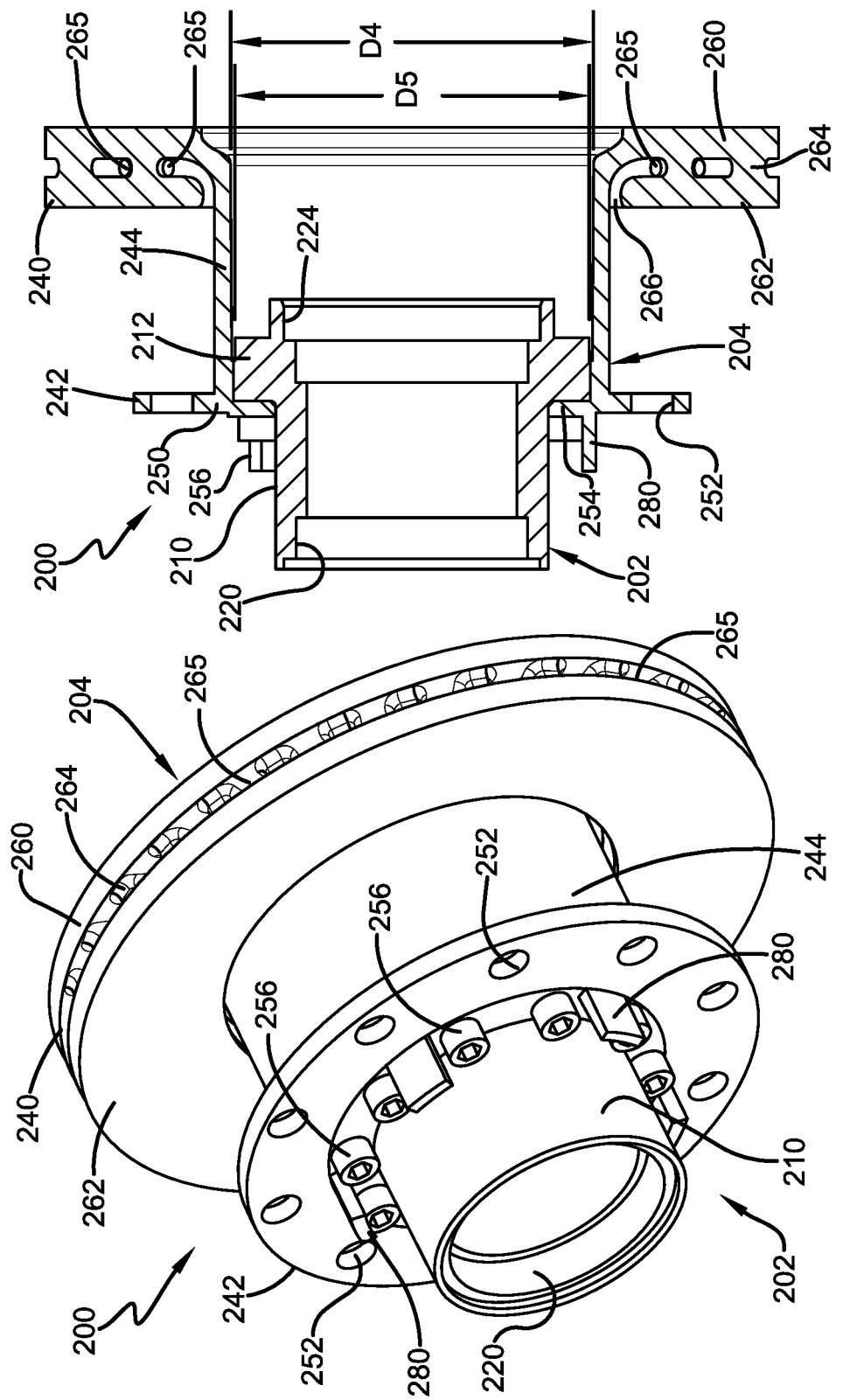

FIG. 9 a cross-sectional side elevation view of the rotor portion of the disc brake hub and rotor assembly illustrated in FIG. 8;

FIG. 10 is a perspective view of a flange portion of the disc brake hub and rotor assembly viewed from the outboard side;

FIG. 11 is a perspective view of the flange portion of the disc brake hub and rotor assembly illustrated in FIG. 10, viewed from the inboard side;

FIG. 12 a cross-sectional side elevation view of the flange portion illustrated in FIGS. 11-12;

FIG. 13 is a perspective view of a disc brake hub and rotor assembly according to another aspect, viewed from an outboard side; and FIG. 14 is a cross-sectional side elevation view of the alternate disc brake hub and rotor assembly illustrated in FIG. 13.

Figure 15:
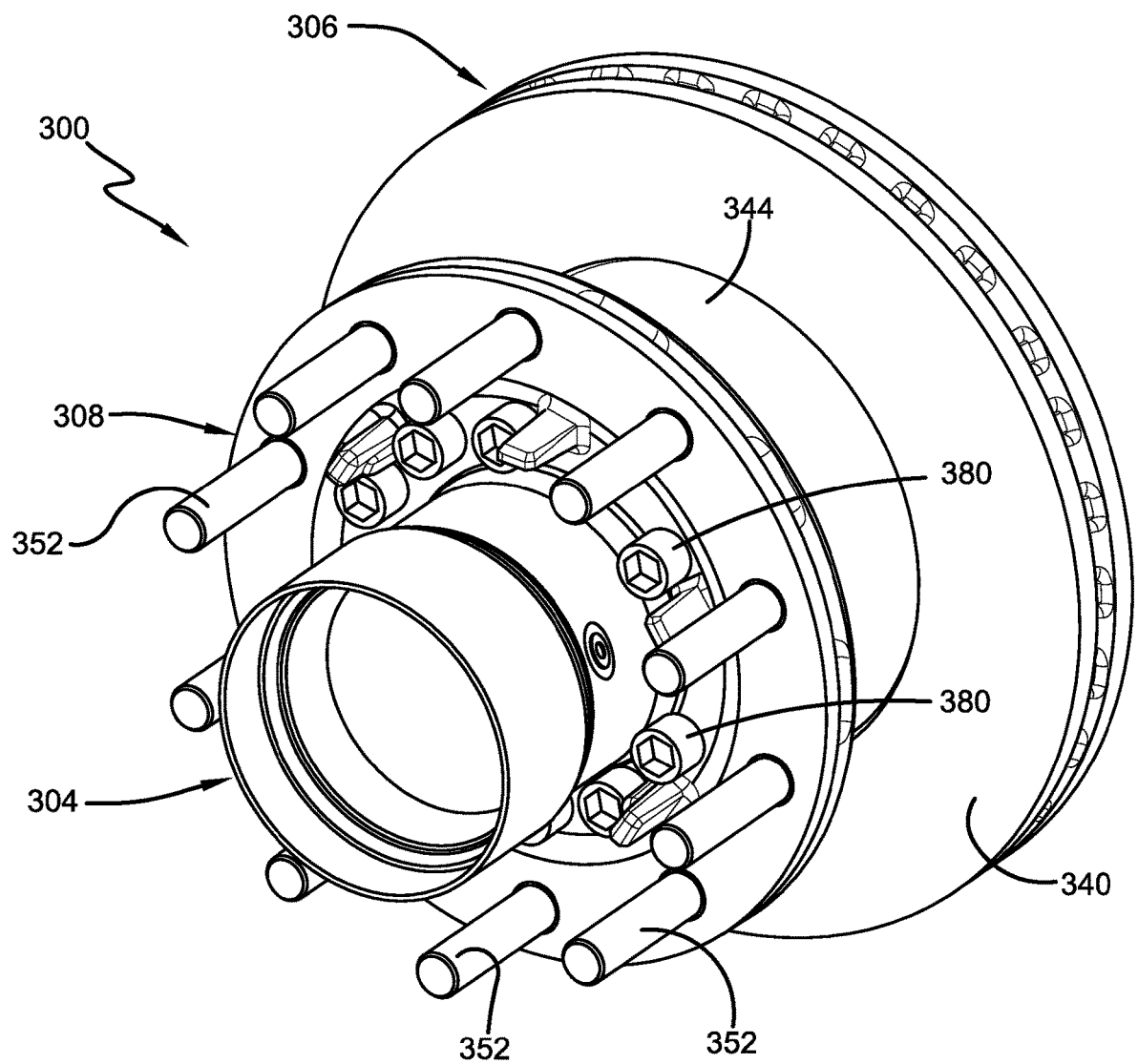
Figure 16:
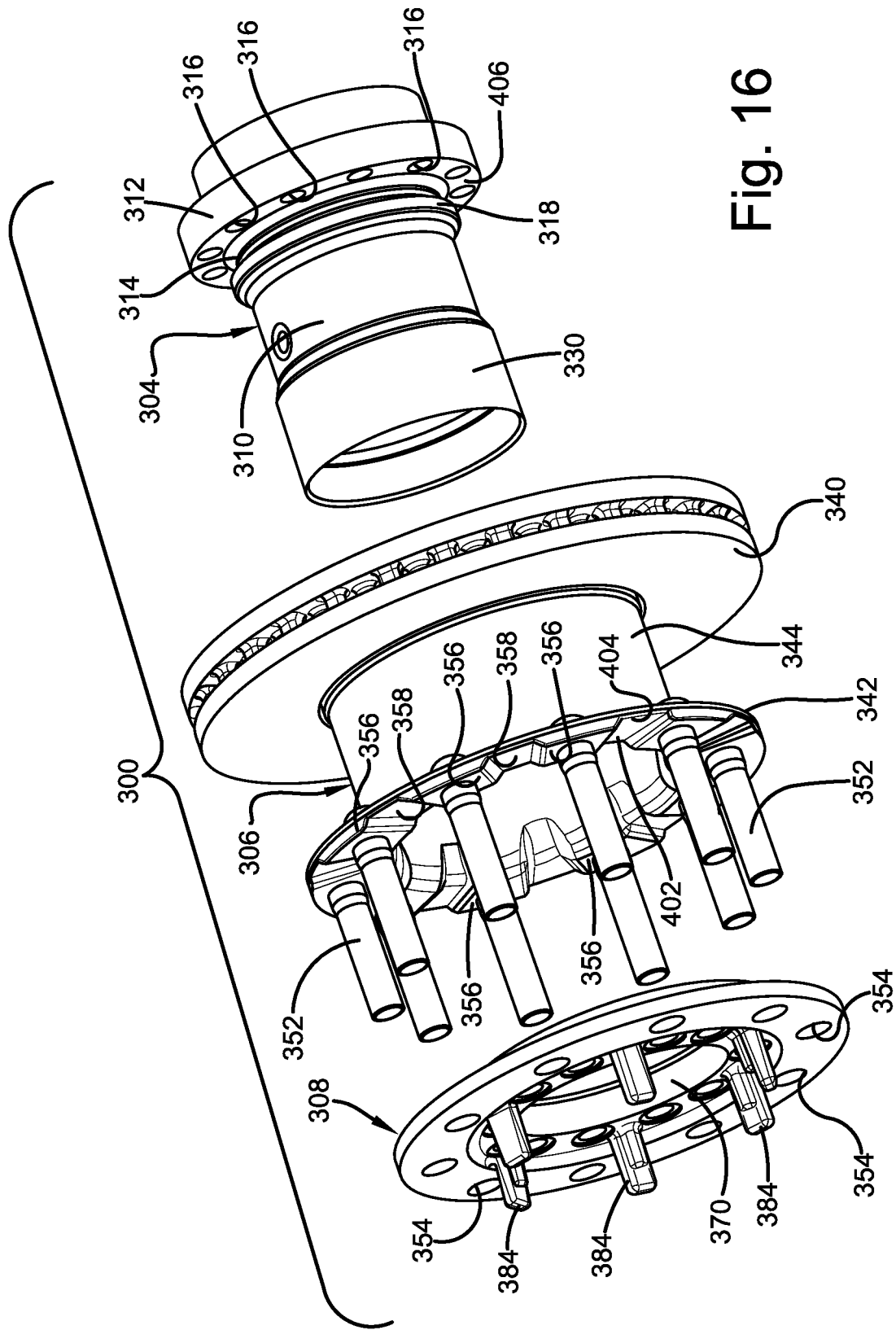
Figure 17:
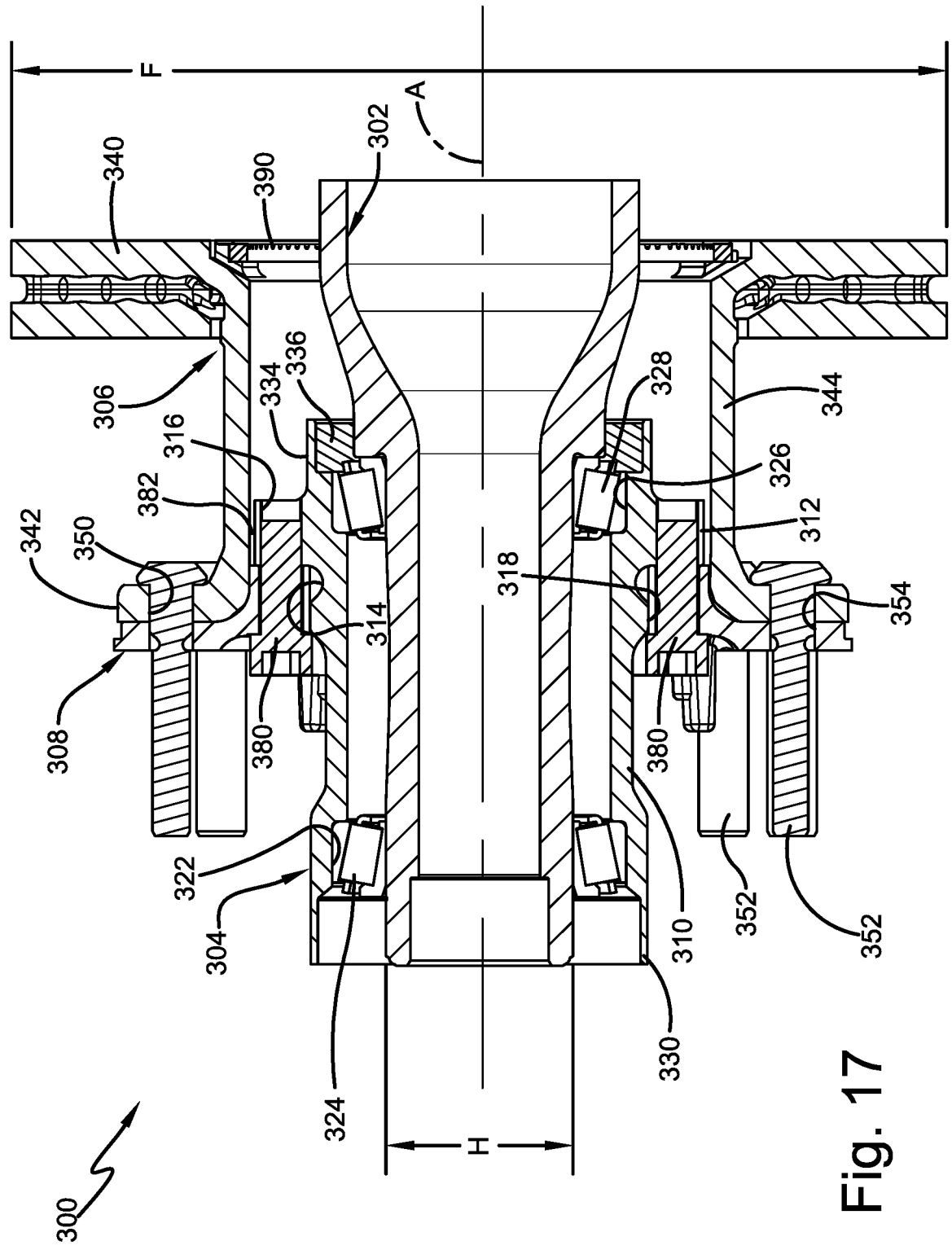
Figure 18:
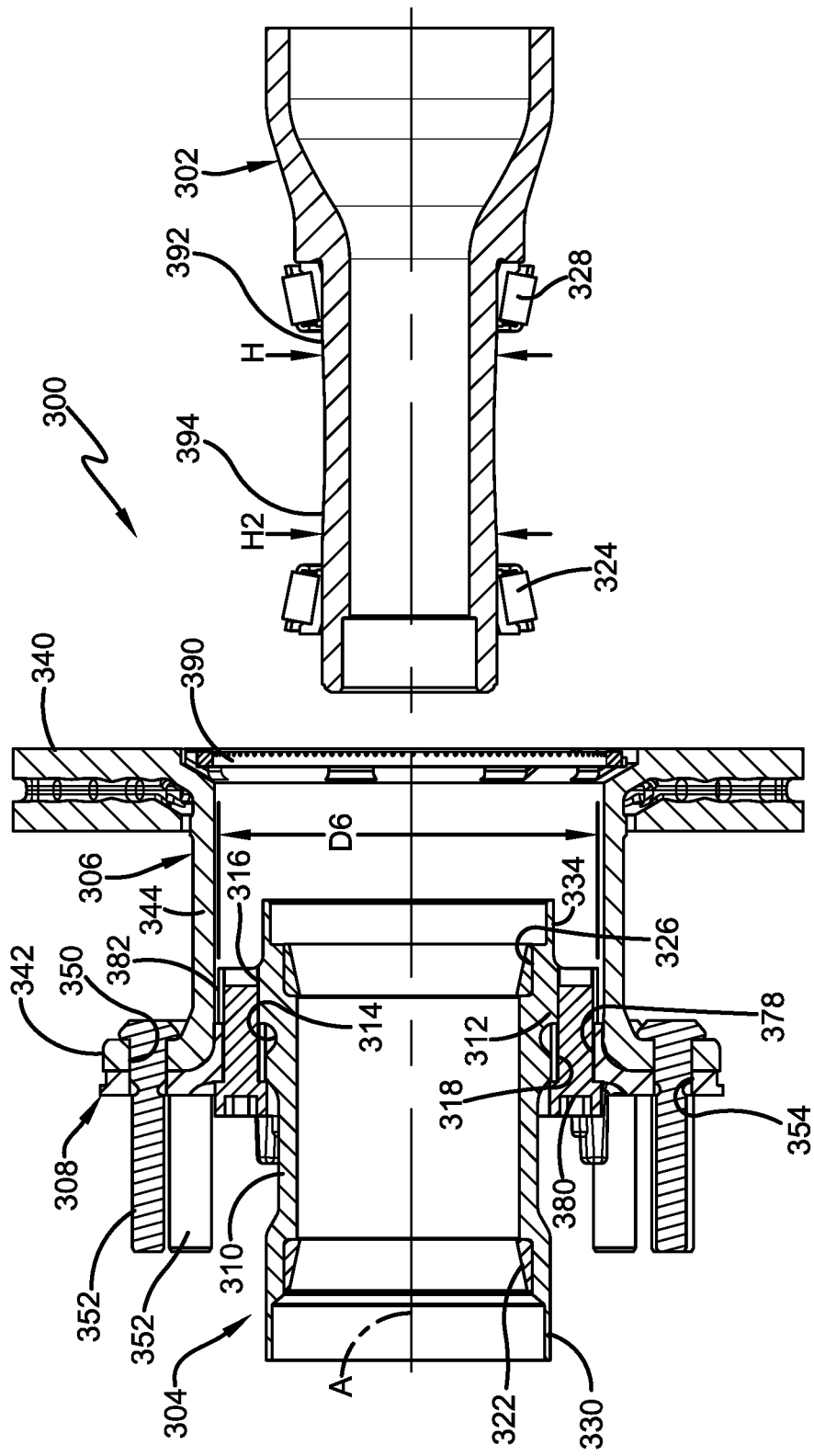
Figure 19:
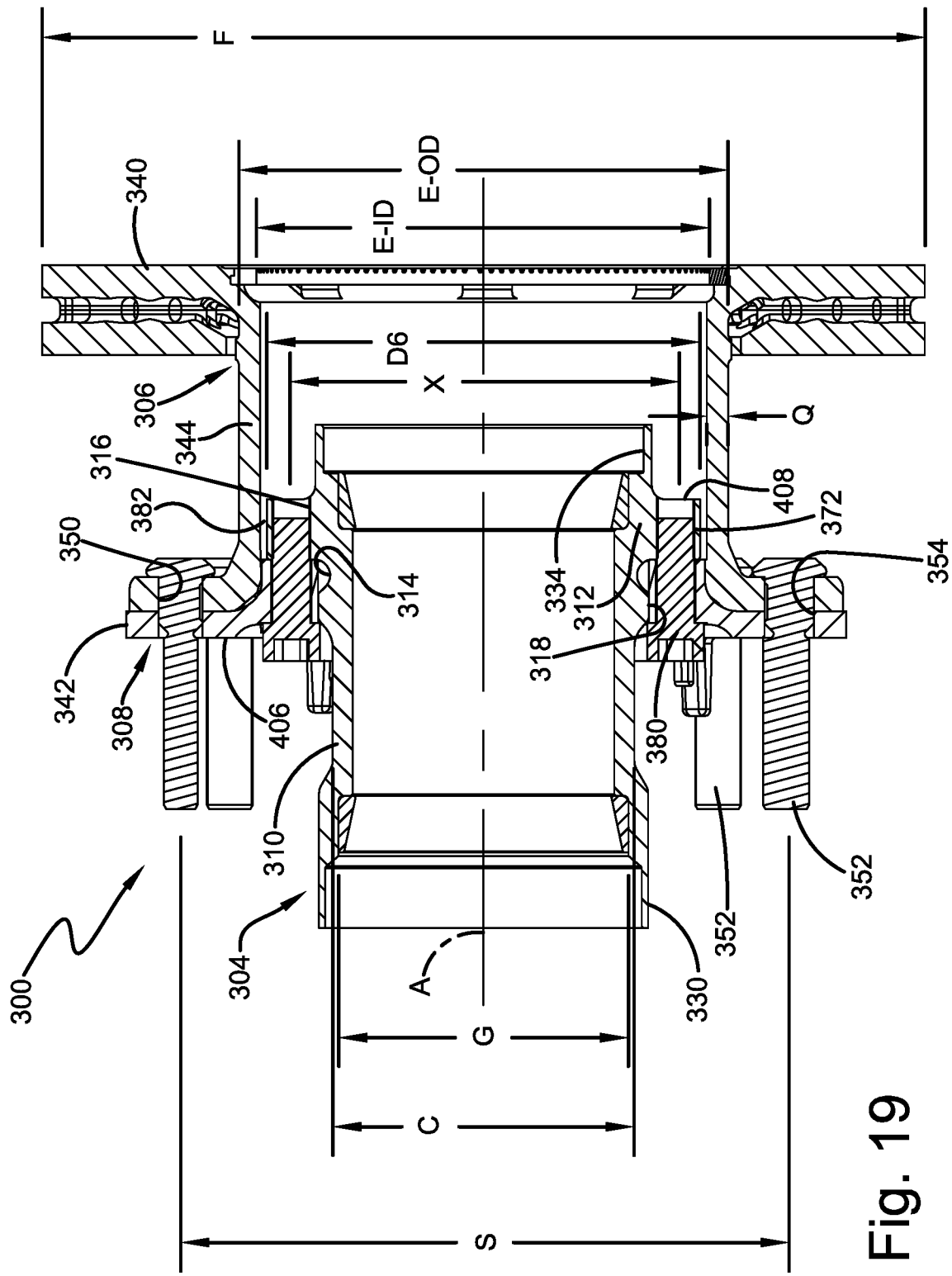
Figure 20:
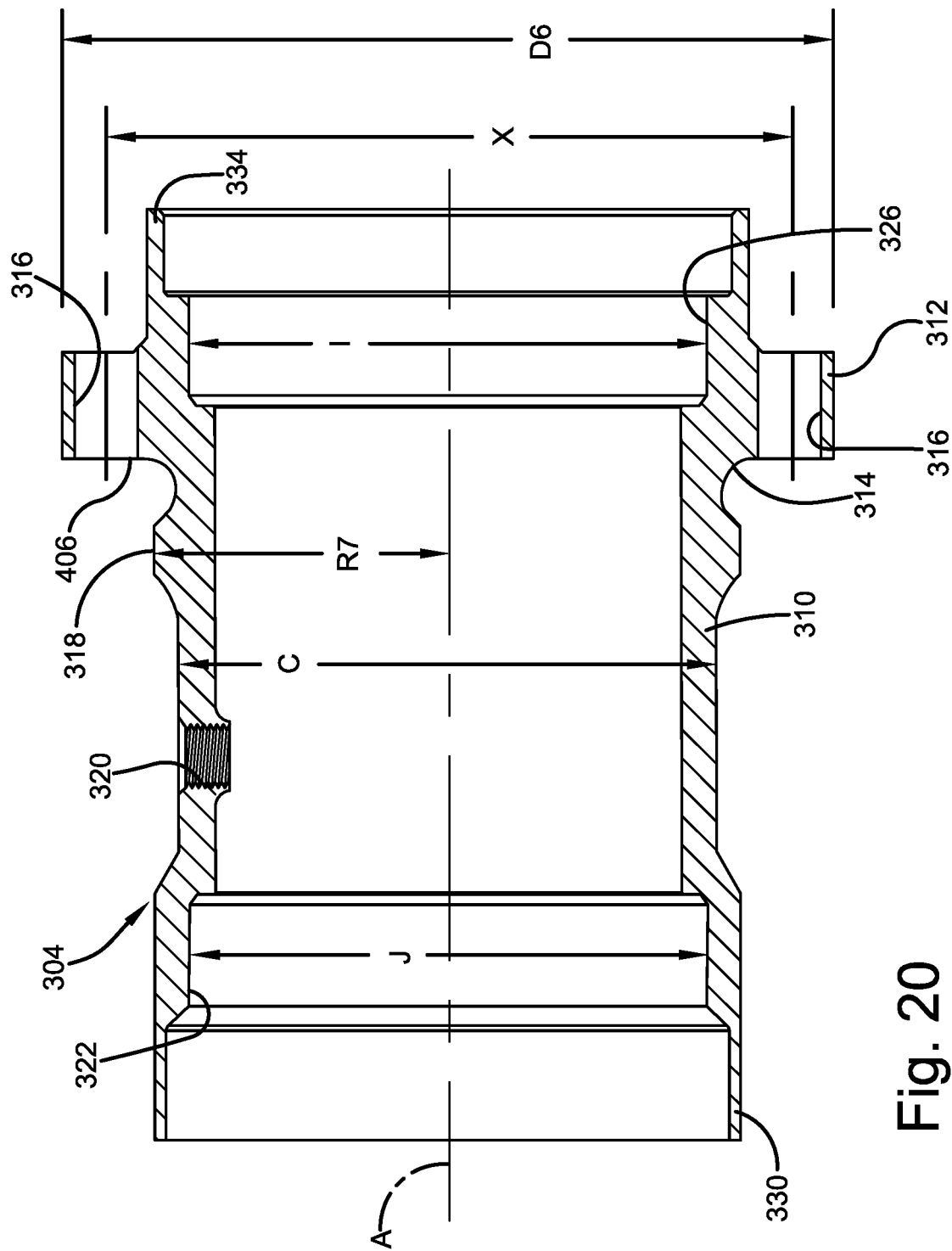
Figure 20A:
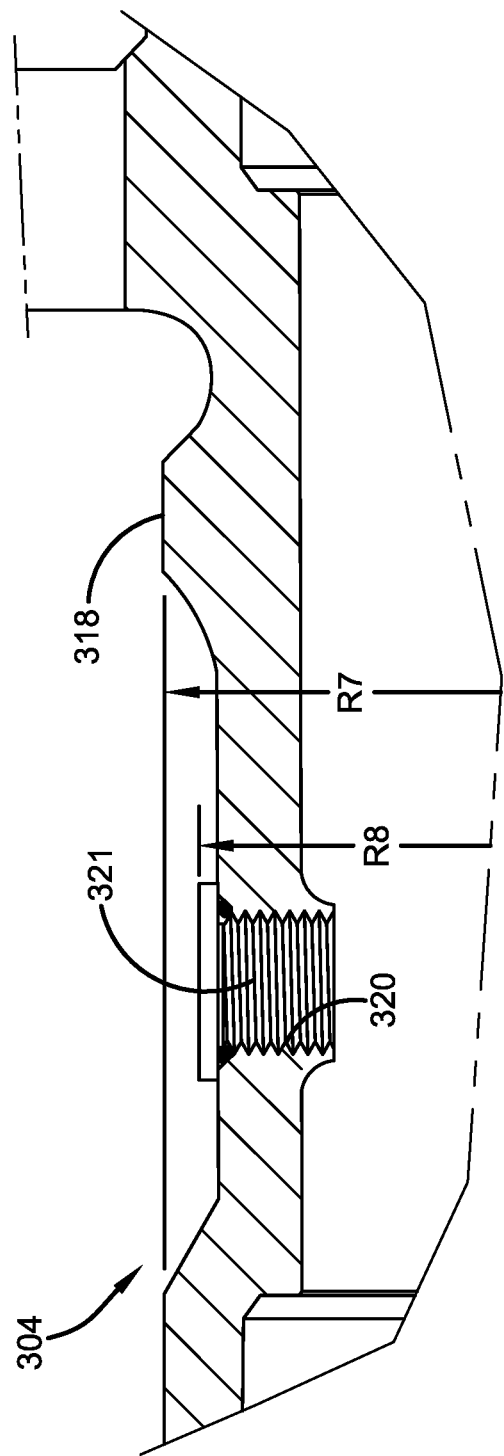
Figure 21:
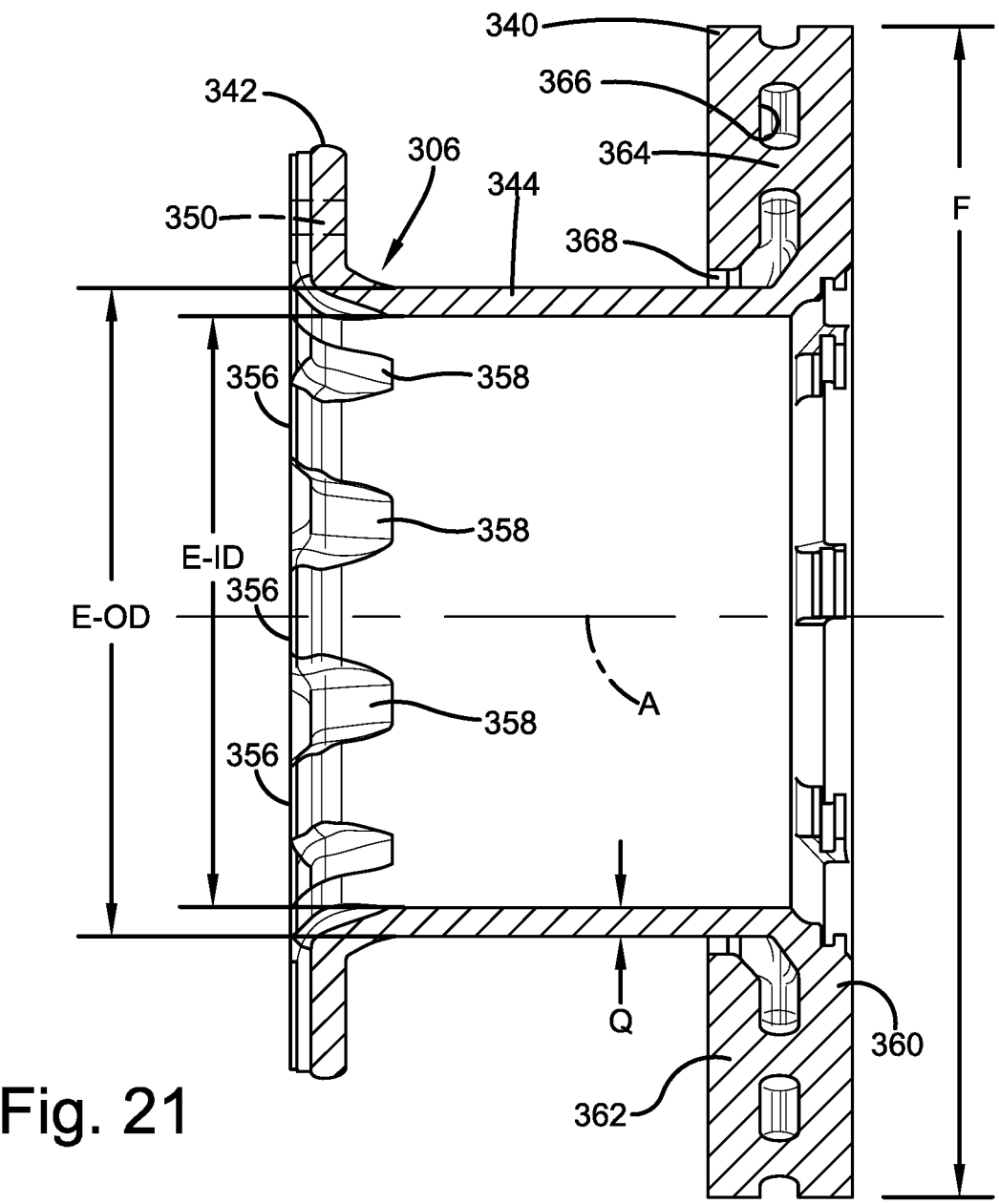
Figure 22:
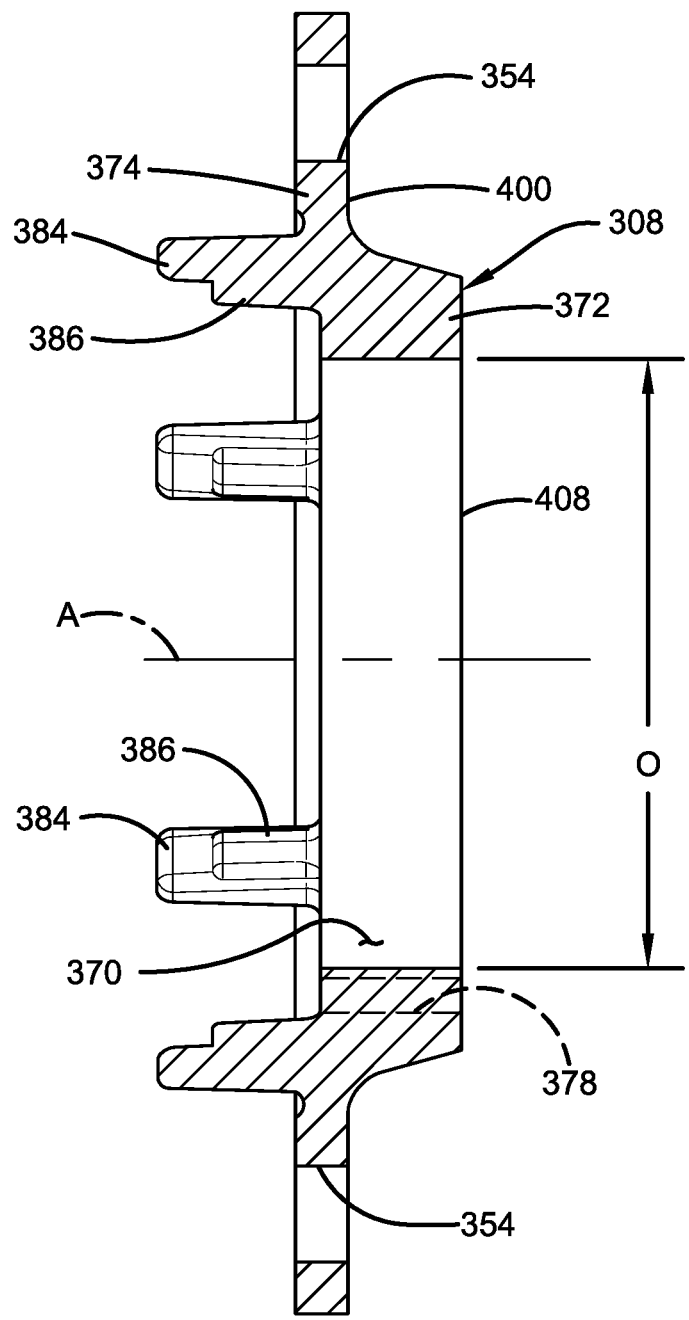
Figure 23:
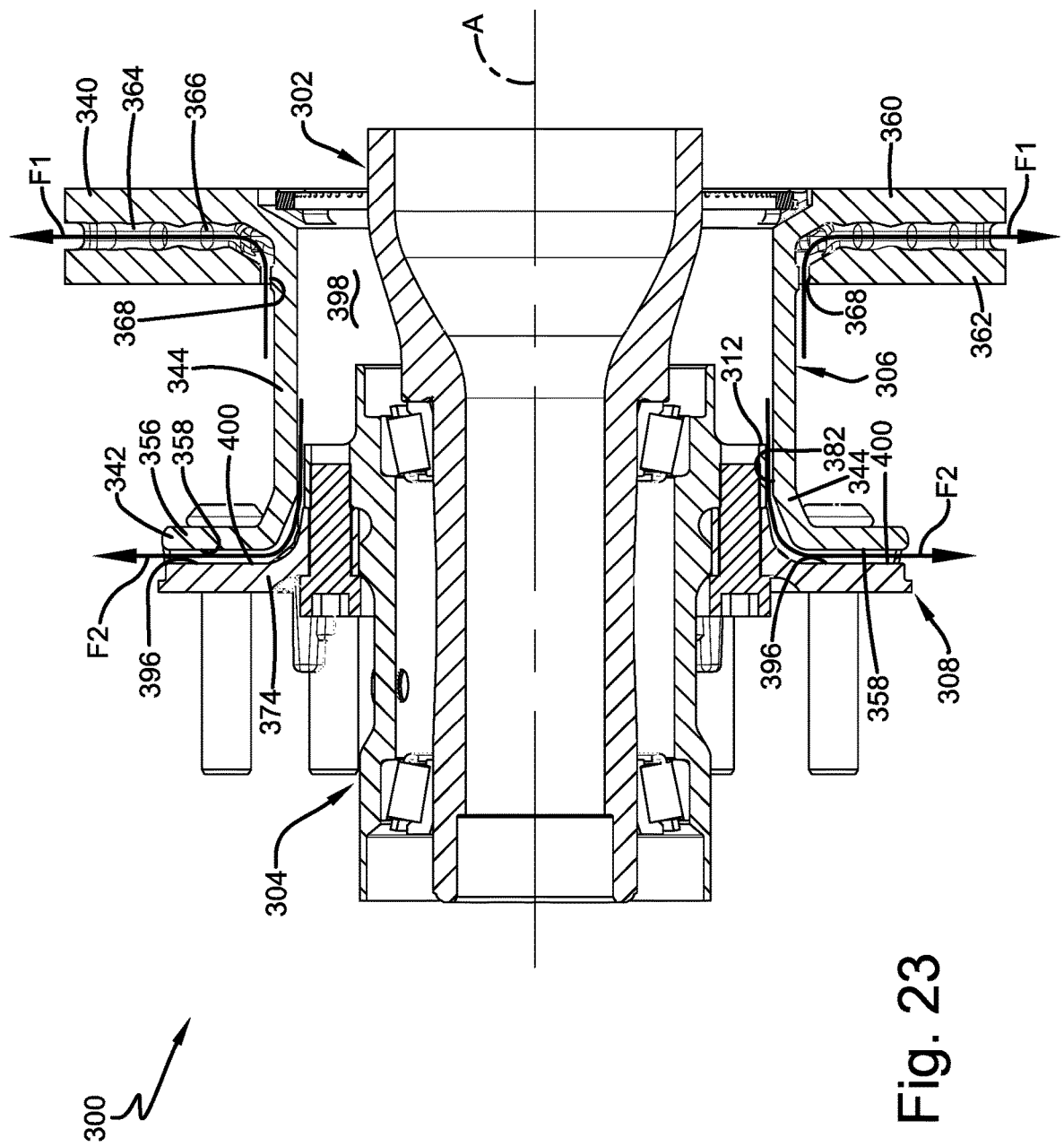
Figure 24:
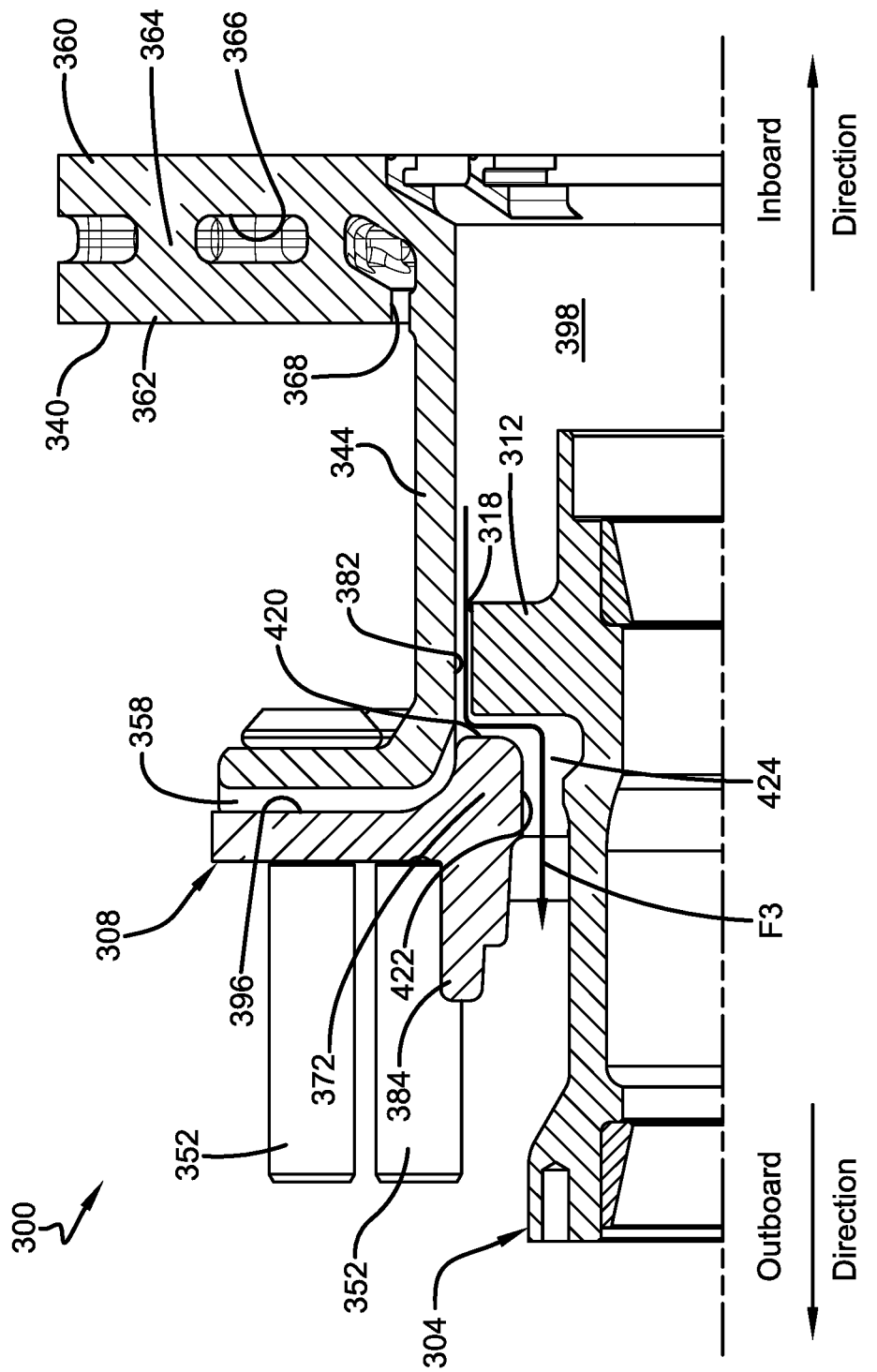
Figure 25:
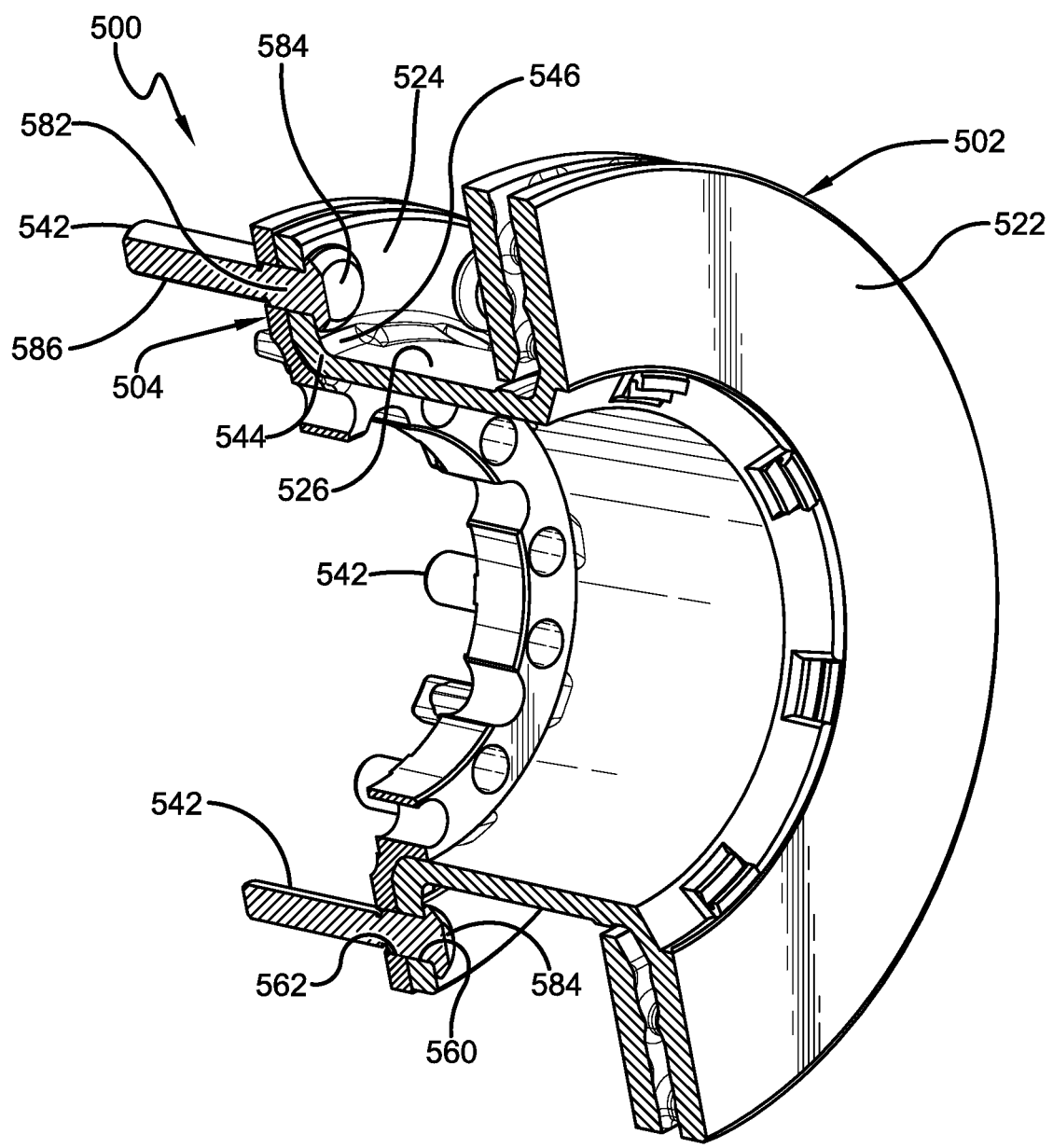
Figure 26:
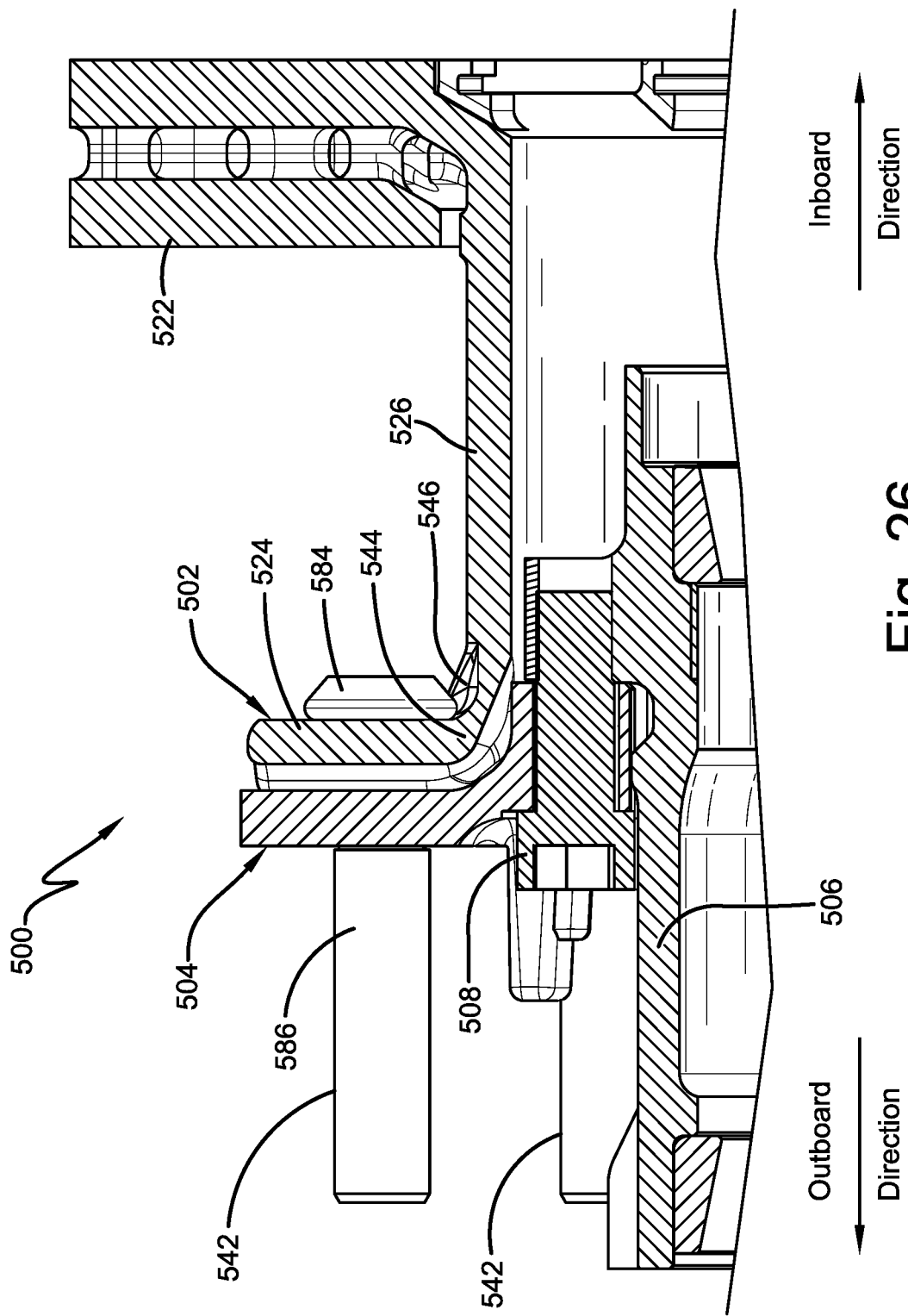
Figure 27:
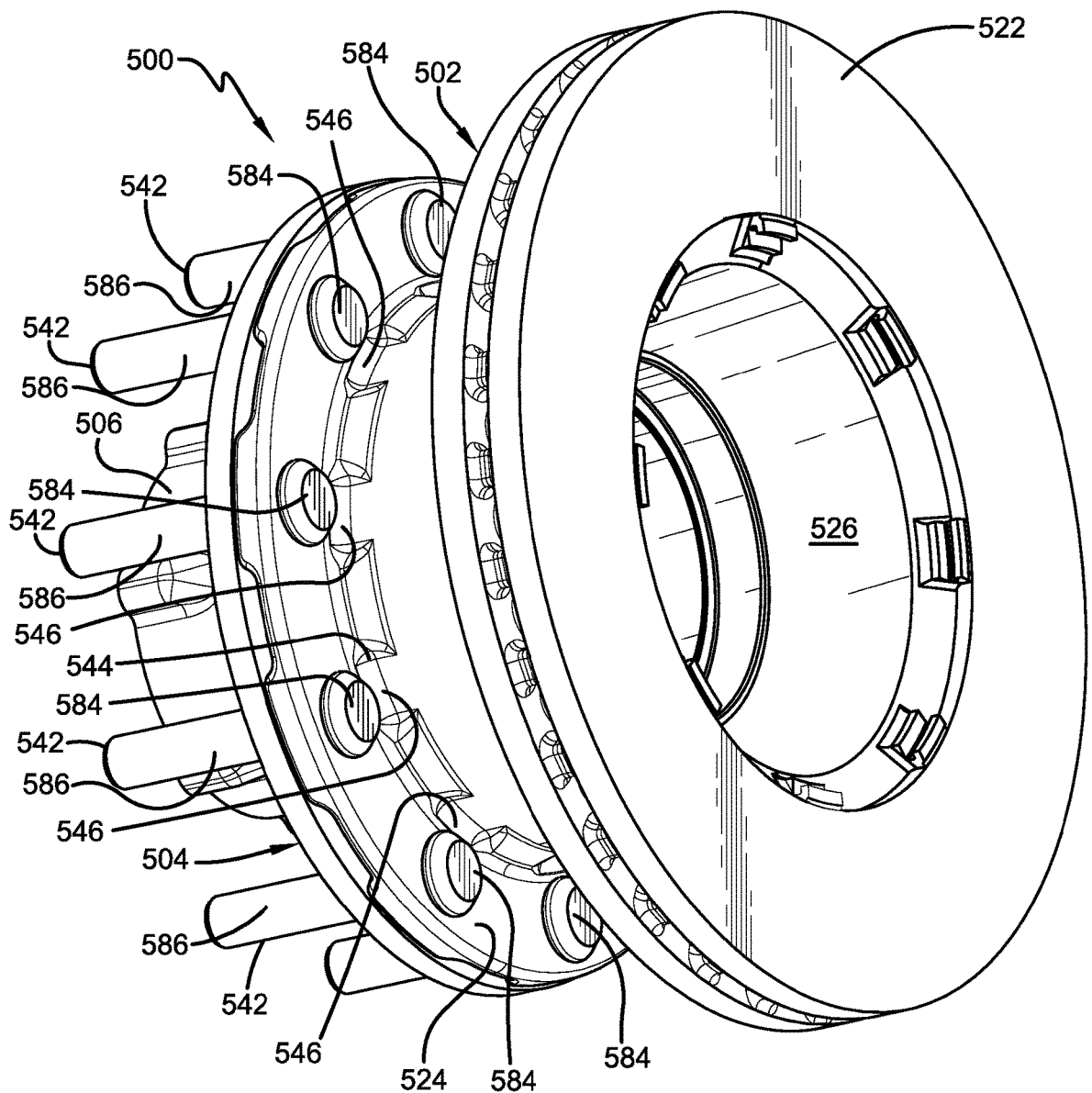
Figure 28:
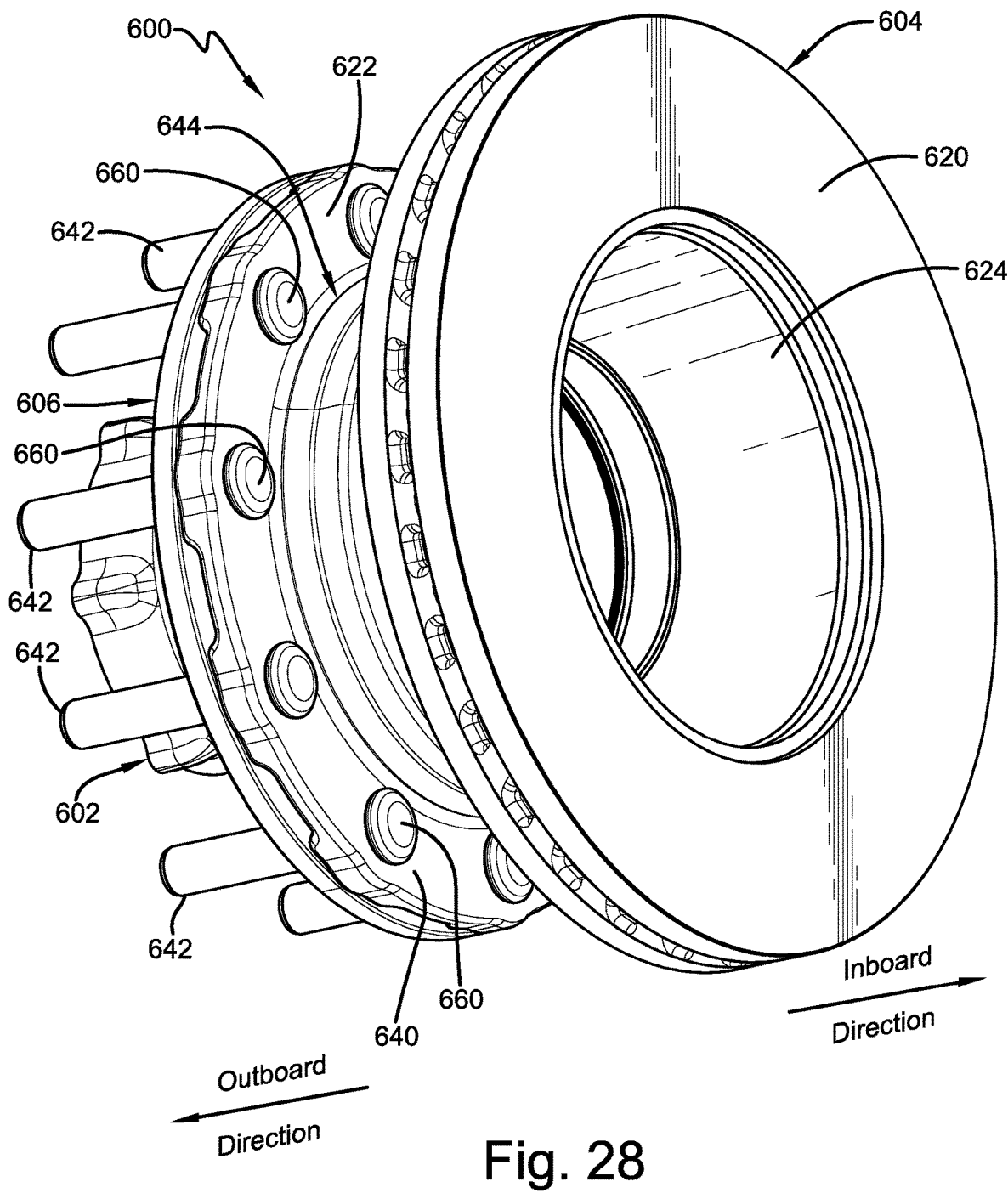
Figure 29:
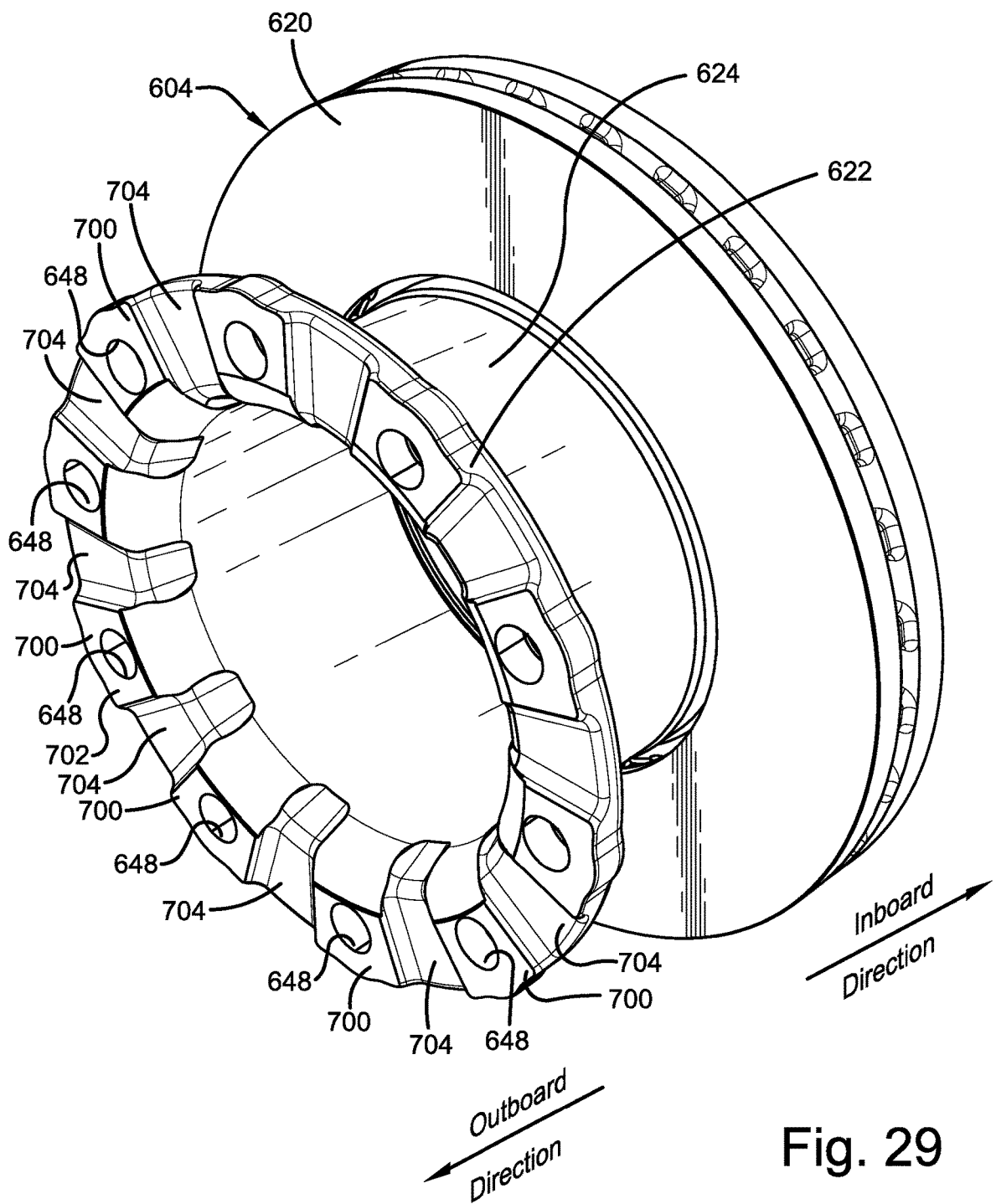
Figure 30:
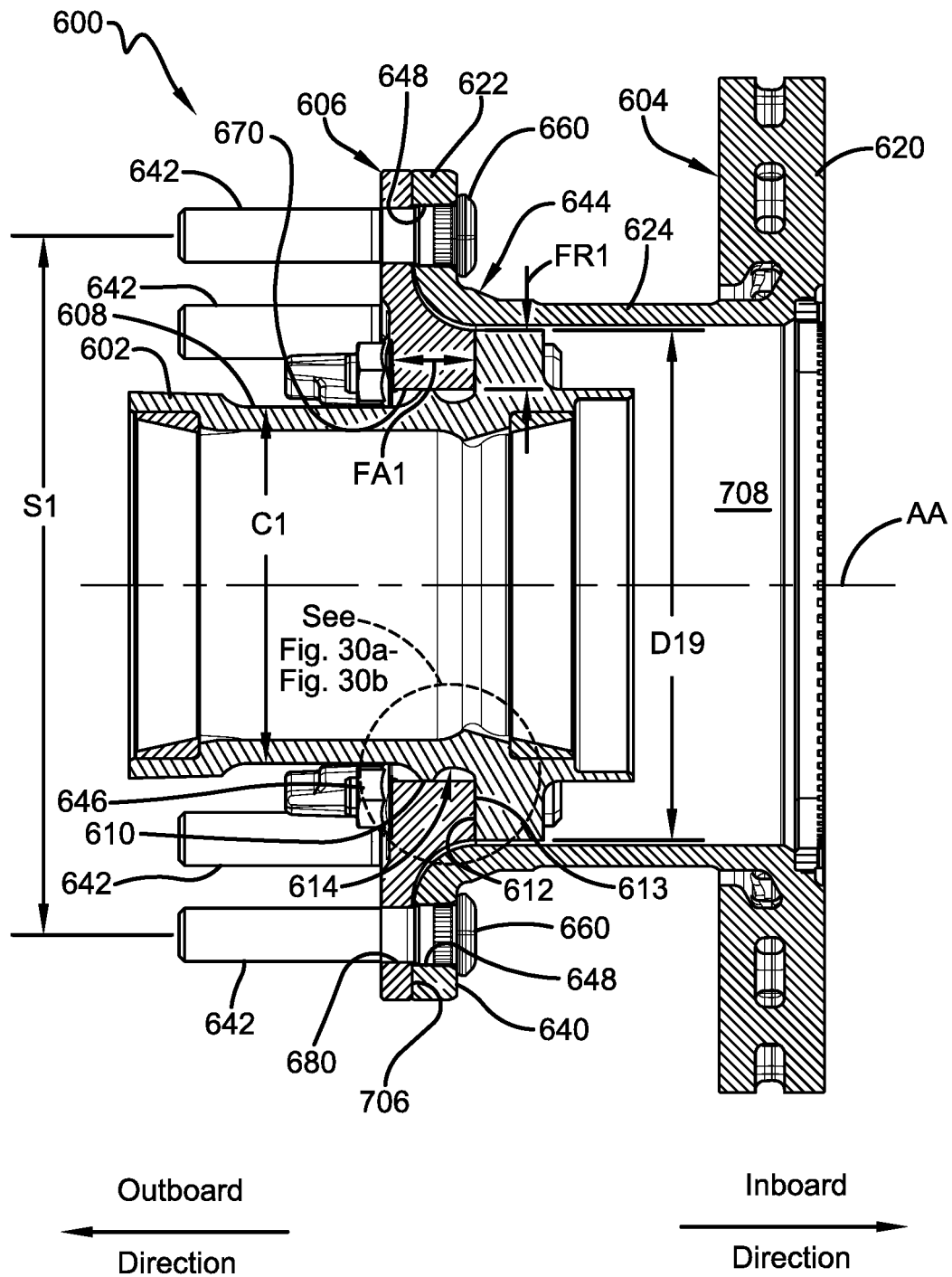
Figure 30A:
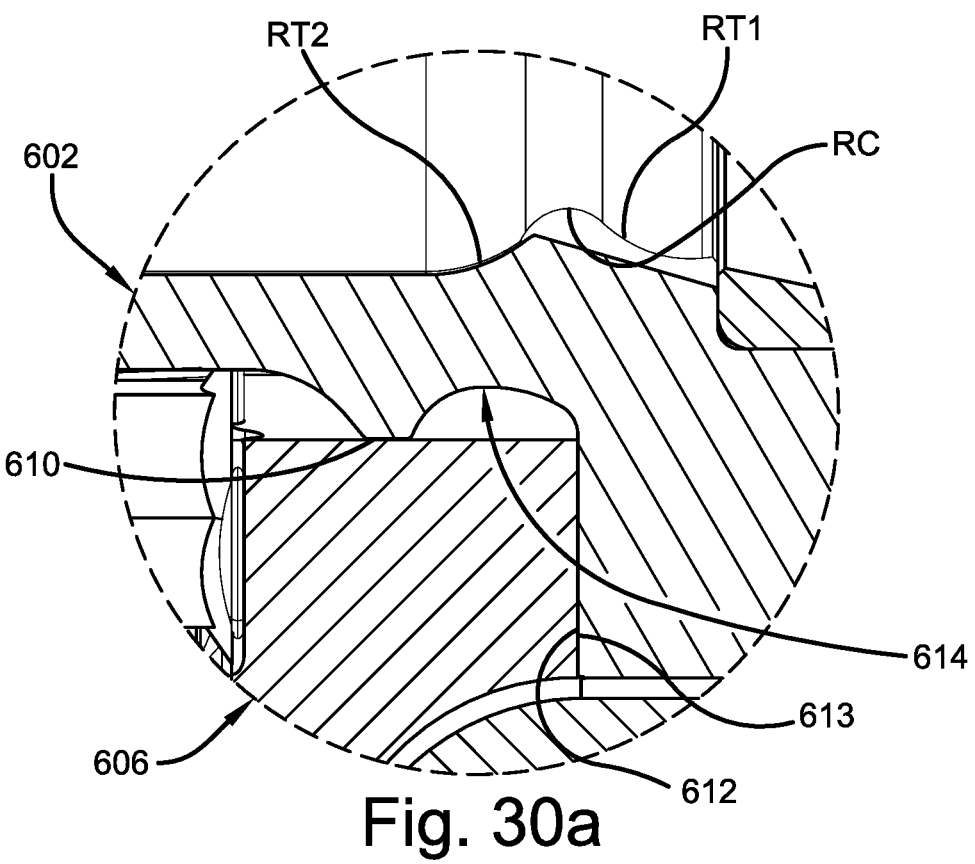
Figure 30B:
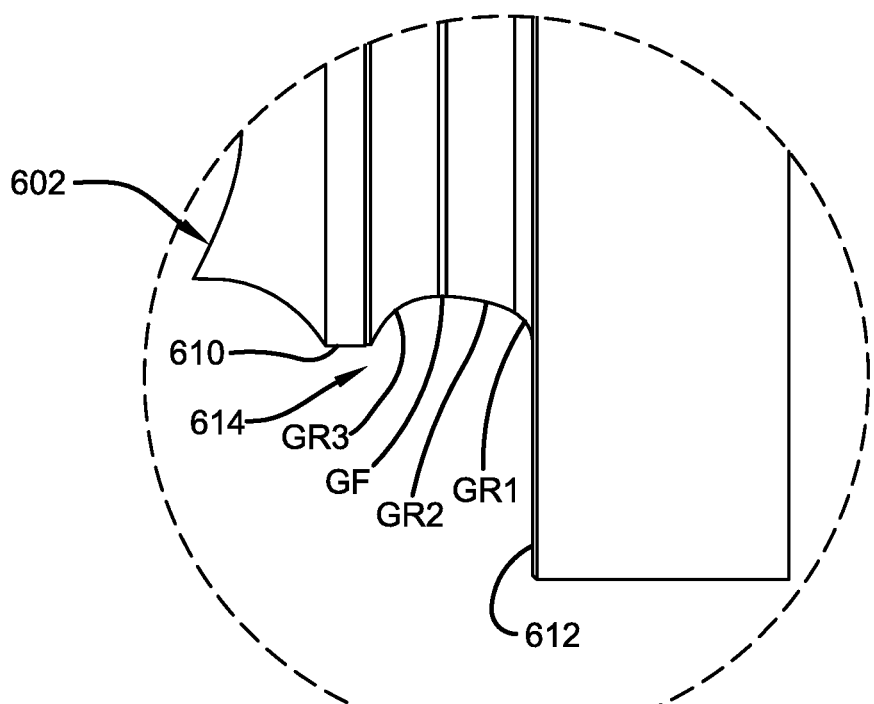
Figure 31:
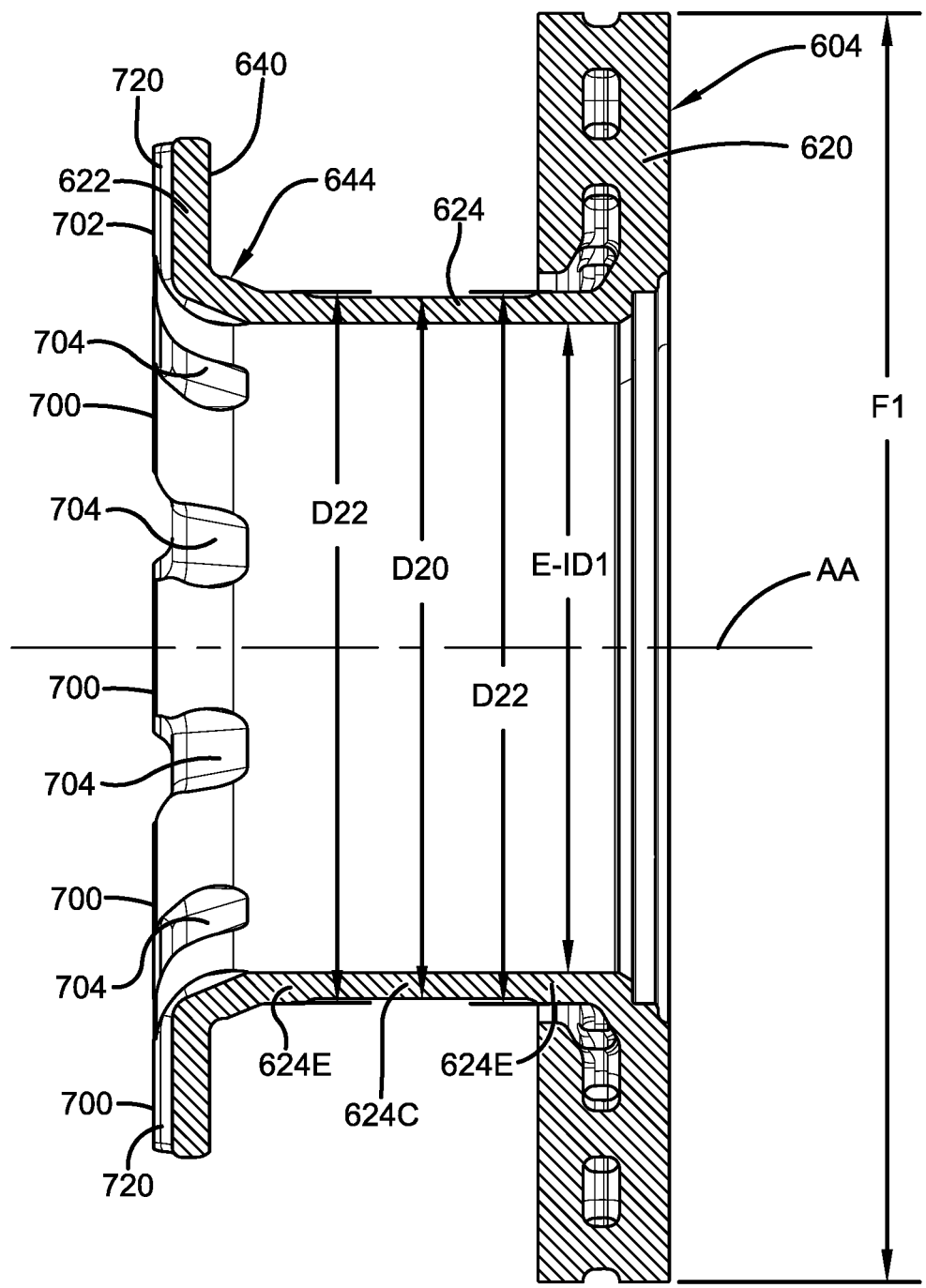
Figure 32:
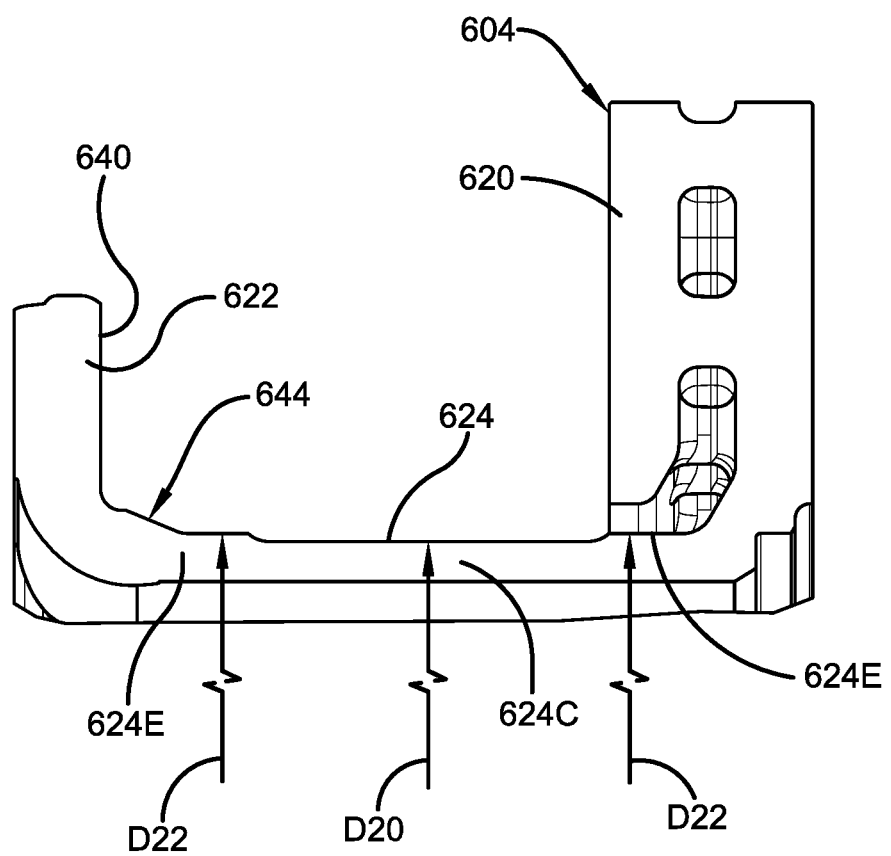
Figure 33:
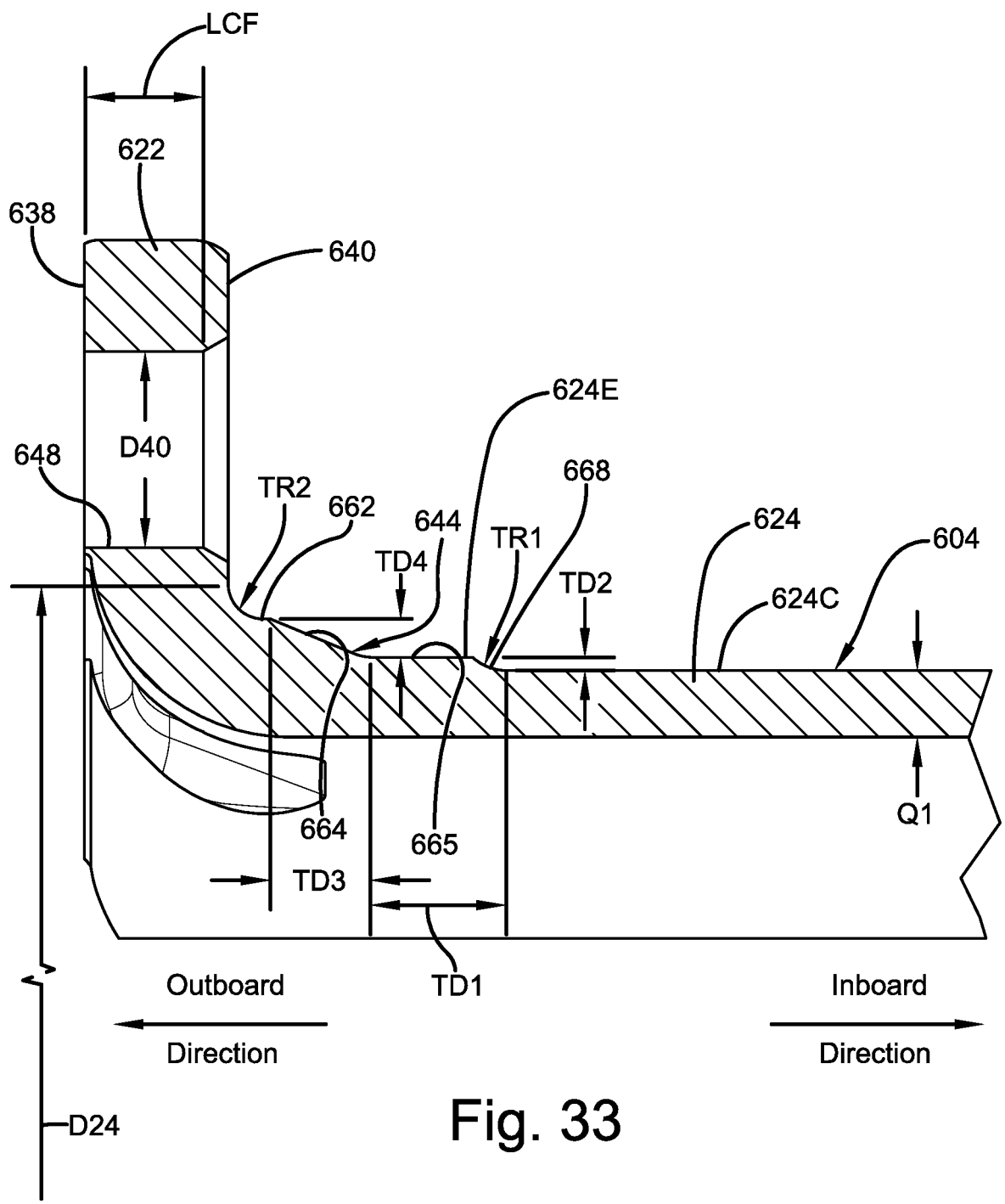
Figure 34:
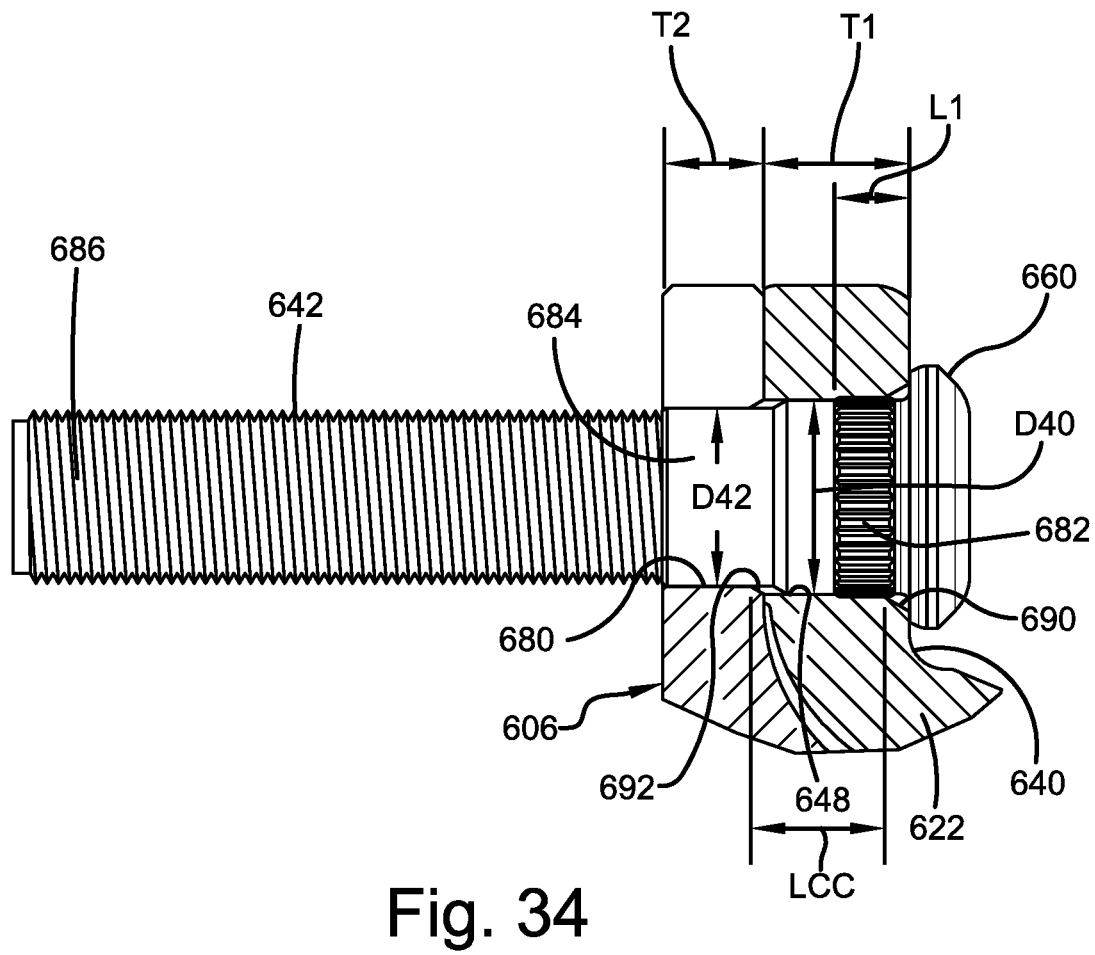
Figure 35:
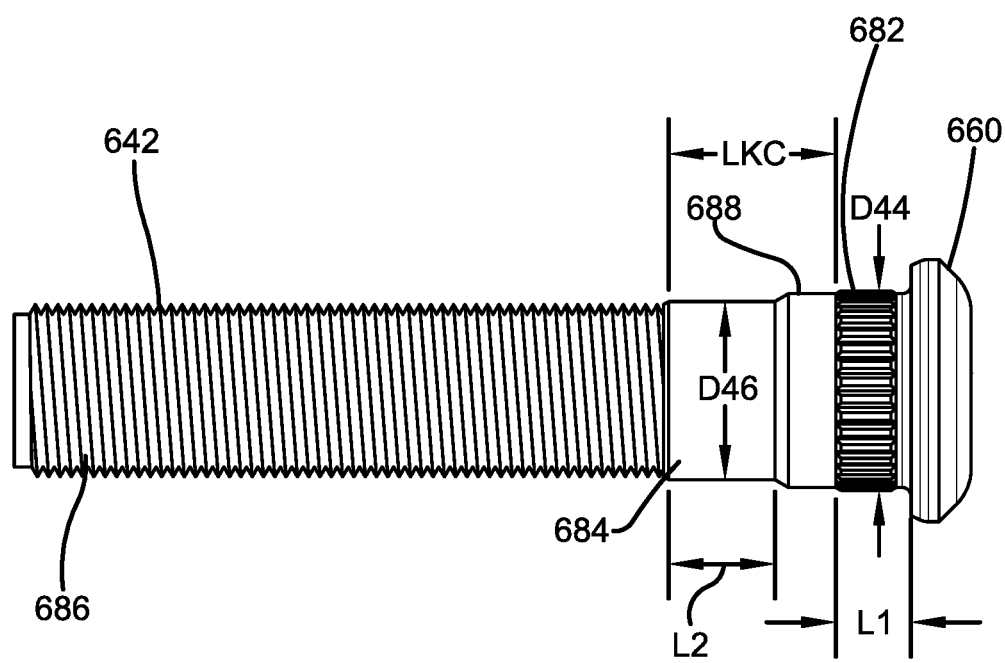
Figure 36:
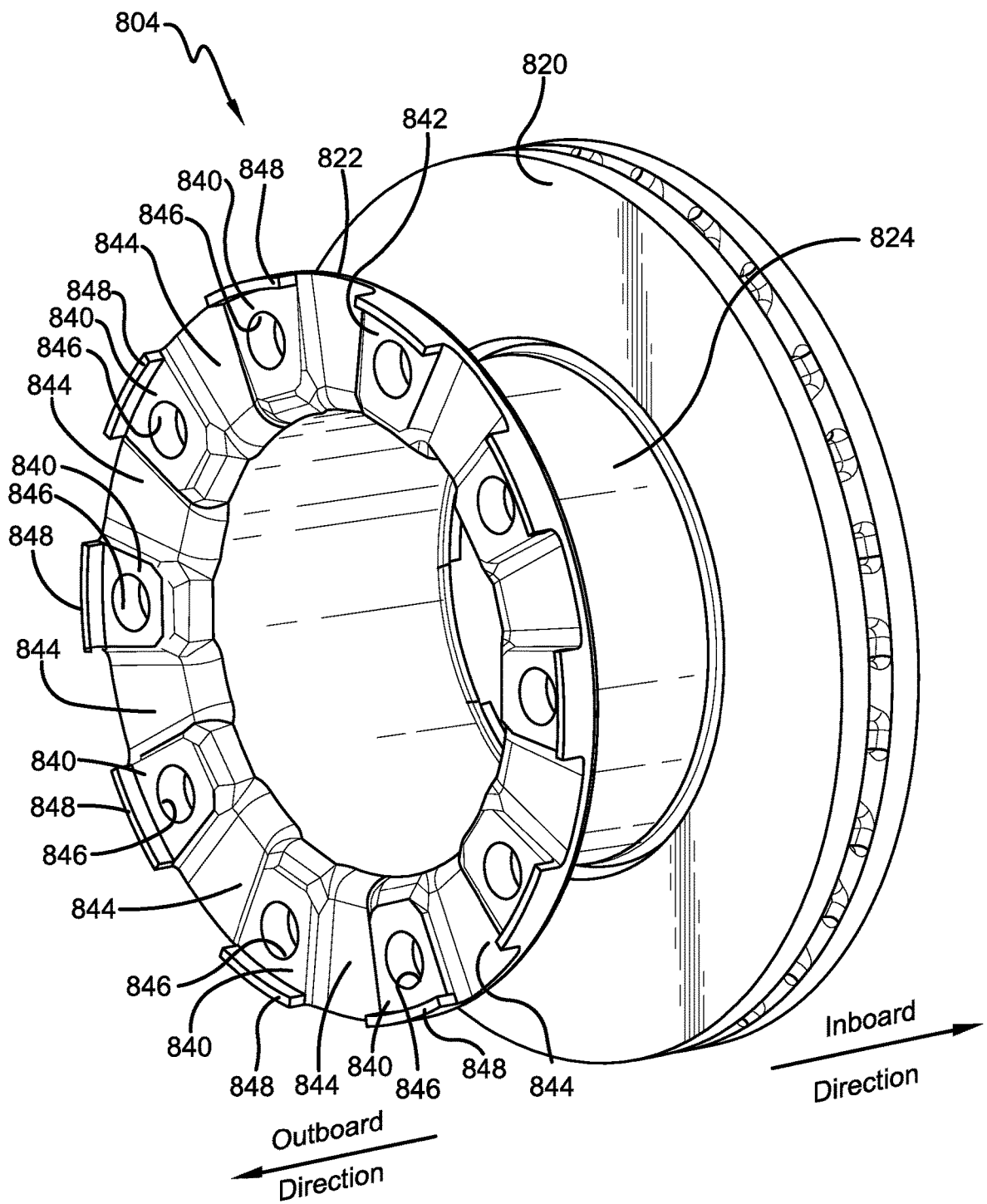

FIG. 15 is a perspective view of a disc brake hub and rotor assembly, according to another aspect, viewed from an outboard side of a heavy-duty vehicle;

FIG. 16 is an exploded perspective view of the disc brake hub and rotor assembly illustrated in FIG. 15;

FIG. 17 is a cross-sectional side elevation view of the disc brake hub and rotor assembly mounted on an axle spindle;

FIG. 18 is an exploded cross-sectional side elevation view of the disc brake hub and rotor assembly and axle spindle illustrated in FIG. 17;

FIG. 19 is a cross-sectional side elevation view of the disc brake hub and rotor assembly;

FIG. 20 is an enlarged cross-sectional side elevation view of a hub portion of the disc brake hub and rotor assembly illustrated in FIGS. 16-19;

FIG. 20a is a greatly enlarged fragmentary cross-sectional view of the hub portion illustrating a fill port plug in a barrel of the hub portion;

FIG. 21 is an enlarged cross-sectional side elevation view of a rotor portion of the disc brake hub and rotor assembly portion illustrated in FIGS. 16-19; and FIG. 22 is an enlarged cross-sectional side elevation view of a flange portion of the disc brake hub and rotor assembly illustrated in FIGS. 16-19;

FIG. 23 is a cross-sectional side elevation view of the disc brake hub and rotor assembly illustrating coolant fluid flow paths;

FIG. 24 is a fragmentary cross-sectional side elevation view of the disc brake hub and rotor assembly, according to another aspect of the disclosed subject matter;

FIG. 25 is a perspective view, in partial cross section, of another prior art rotor and flange of a disc brake hub and rotor assembly for heavy-duty vehicles;

FIG. 26 is an enlarged cross-sectional view of a portion of a prior art disc brake hub and rotor assembly incorporating the rotor and flange illustrated in FIG. 25;

FIG. 27 is a perspective view of the prior art disc brake hub and rotor assembly illustrated in FIG. 26, viewed from an inboard side;

FIG. 28 is a perspective view a disc brake hub and rotor assembly, constructed according to an aspect of the disclosed subject matter, viewed from an inboard side;

FIG. 29 is a perspective view of a rotor illustrated in FIG. 28, viewed from an outboard side;

FIG. 30 is a cross-sectional view of a disc brake hub and rotor assembly illustrated in FIG. 28;

FIG. 30a is an enlarged cross-sectional view of a portion of the hub illustrated in FIG. 30;

FIG. 30b is an enlarged elevational view of a portion of the hub illustrated in FIG. 30;

FIG. 31 is a cross-sectional view of the rotor illustrated in FIG. 29;

FIG. 32 is an enlarged cross-sectional view of a portion of the rotor illustrated in FIG. 31;

FIG. 33 is a greatly enlarged cross-sectional view of the portion of the rotor illustrated in FIG. 32 showing an improved profile of a transition region;

FIG. 34 is an enlarged side elevational schematic view of a portion of the rotor and flange of the disc brake hub and rotor assembly illustrated in FIGS. 28 and 30 illustrating a wheel mounting stud, according to another aspect of the disclosed subject matter, installed in the rotor and flange;

FIG. 35 is an enlarged side elevational view of the wheel mounting stud illustrated in FIG. 34; and FIG. 36 is a perspective view of the rotor of a disc brake hub rotor, according to another aspect of the disclosed subject matter, viewed from an outboard side.

DESCRIPTION

The disclosed subject matter is described with reference to the drawings, in which like reference numerals and identifiers are used to refer to like elements throughout the description. For exemplary purposes, details are set forth in order to provide an understanding of the disclosed subject matter. It will be understood, however, that the disclosed subject matter can be practiced and implemented without these specific details.

There is a need for a disc brake hub and rotor assembly for a heavy-duty vehicle that is relatively easy to handle, easy to service and minimizes heat conducted to lubricant within the hub. An improved disc brake hub and rotor assembly for a heavy-duty vehicle, according to at least one aspect of the disclosed subject matter, satisfies the need and overcomes the limitations, drawbacks and disadvantages of previously known hub and rotor assemblies.

Figure 1:
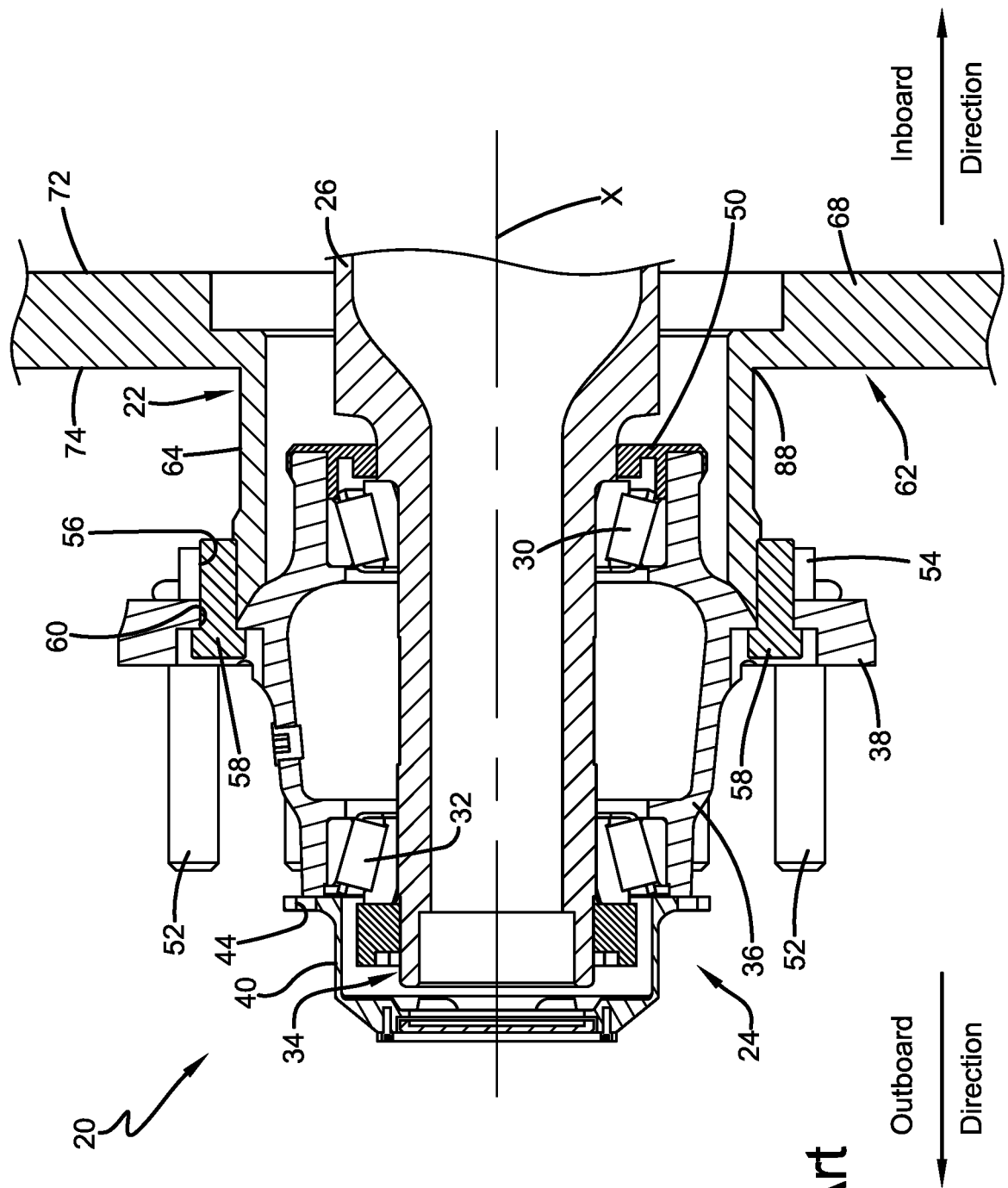
FIG. 1 is a fragmentary side elevational view, partially in cross section, of a prior art wheel end assembly for heavy-duty vehicles with a disc brake and hub assembly that is mounted on an axle spindle.
Figure 3:
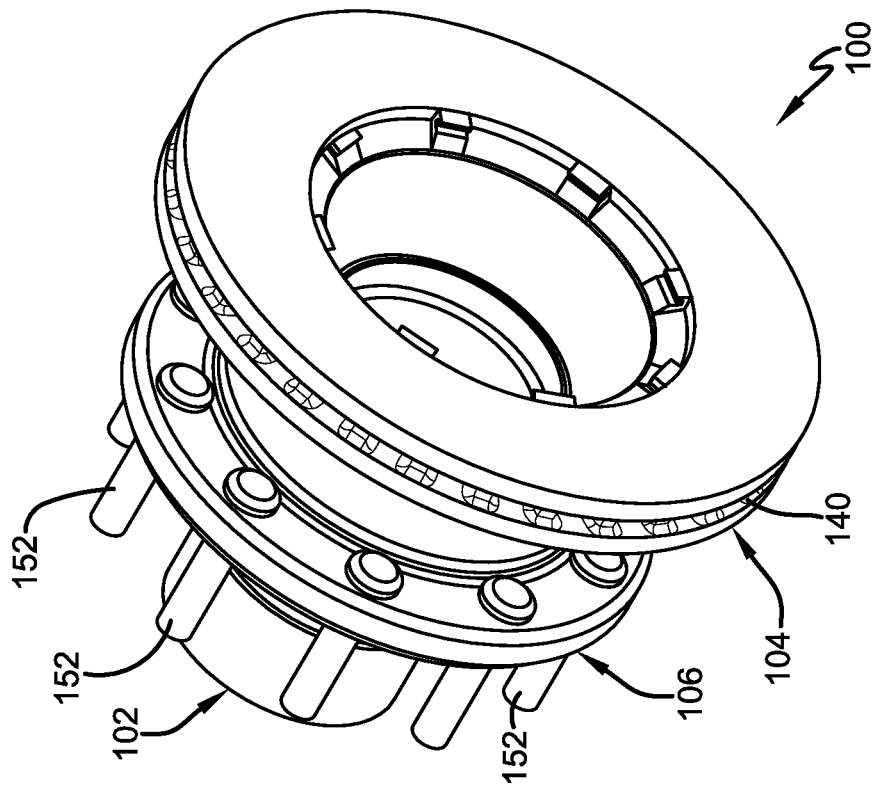
FIG. 3 is a perspective view of the disc brake hub and rotor assembly illustrated in FIG. 2, viewed from an inboard side.
Figure 2:
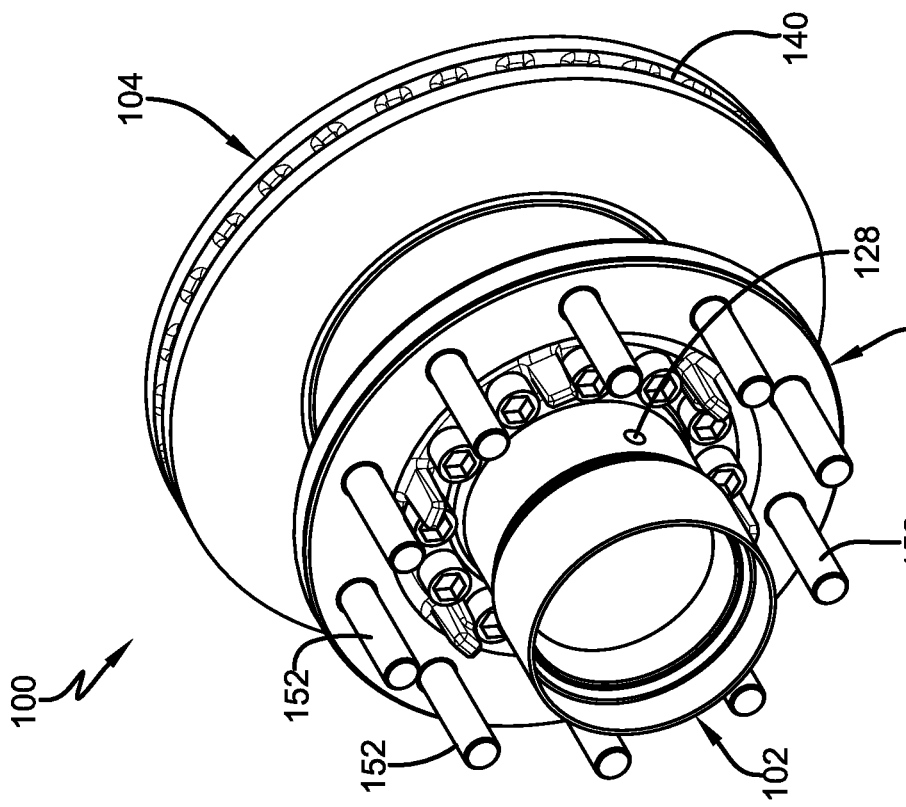
FIG. 2 is a perspective view of a disc brake hub and rotor assembly, according to one aspect of the disclosed subject matter, viewed from an outboard side.
Figure 4:
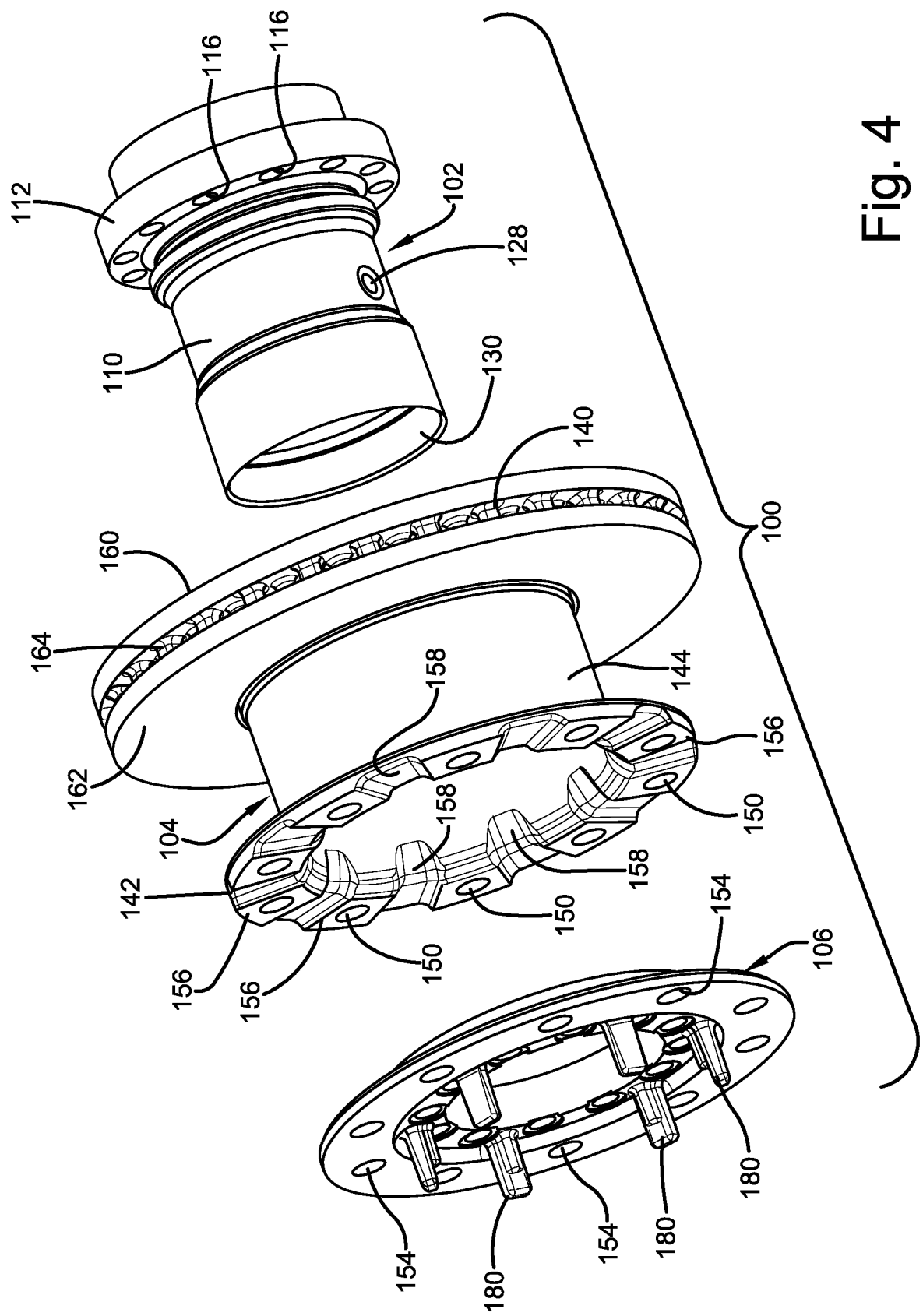
FIG. 4 is an exploded perspective view of the disc brake hub and rotor assembly illustrated in FIGS. 2 and 3.

To better understand the improved hub and rotor assembly of the disclosed subject matter and the environment in which it operates and for differentiation purposes, a prior art disc brake hub and rotor assembly 20 for a heavy-duty vehicle is shown in FIG. 1 and described. Heavy-duty vehicles include trucks and tractor-trailers or semi-trailers, and the tractor-trailers or semi-trailers typically are equipped with one or more trailers. Throughout, reference shall be made to a heavy-duty vehicle with the understanding that such reference includes trucks, tractor-trailers and semi-trailers, and trailers.

The prior art brake hub and rotor assembly 20 is operatively mounted on an axle (not shown), which typically depends from and extends transversely across a heavy-duty vehicle (not shown), as is known. The axle has two axially opposite ends, with a wheel end assembly 24 mounted on each respective end. It is known that heavy-duty vehicles often have more than one axle. For the purposes of convenience and brevity, only one end of the axle and its associated wheel end assembly 24 will be described.

The axle includes a central tube (not shown) and an axle spindle 26 that is connected to an end of the central tube, by suitable means such as welding. The wheel end assembly 24 includes an inboard bearing 30 and an outboard bearing 32 mounted on the axle spindle 26. A spindle nut assembly 34 is threaded onto an outboard end of axle spindle 26 and secures the wheel end assembly 24 and bearings 30, 32 in place.

The prior art brake hub and rotor assembly 20 includes a rotor 22 and wheel hub 36. The wheel hub 36 is rotatable about the axis X on the inboard and outboard bearings 30, 32 in a known manner. Components of the prior brake hub and rotor assembly 20, such as a cast iron rotor 22 and a ductile iron wheel hub 36, are typically made by casting. The wheel hub 36 has a radially outward extending attachment portion 38 about the periphery of the wheel hub.

A hub cap 40 is mounted on the outboard end of the wheel hub 36 by a plurality of bolts (not shown), each of which passes through a respective one of a plurality of openings 44 formed in the hub cap. Each bolt is threaded into a respective one of a plurality of aligned threaded openings (not shown) formed in the wheel hub 36, as is known. In this manner, the hub cap 40 closes the outboard end of wheel end assembly 24. A main seal 50 is mounted in the inboard end of wheel end assembly 24 and closes the inboard end of the wheel end assembly. In a typical heavy-duty vehicle, a plurality of threaded studs 52 and mating nuts (not shown) are used to mount a wheel rim or a pair of wheel rims (not shown) on the wheel end assembly 24. A tire (not shown) is mounted on a respective wheel rim, as is known.

The prior art brake rotor 22 includes a radially-extending mounting flange 54, which is formed with flange openings 56 to receive mechanical fasteners 58, such as bolts, to connect the rotor to the wheel hub 36. The wheel hub 36 is formed with corresponding openings 60 in the radially extending mounting flange 54 for the mechanical fasteners 58 to pass through and thread into the flange openings 56 of the prior art rotor 22 to removably secure the rotor to the wheel hub. The prior art rotor 22, thus, rotates with the wheel hub 36. The prior art rotor 22 is removable for servicing when the wheel hub 36, with the prior art rotor 22 attached, is also removed from the axle spindle 26. The weight of the prior art wheel hub 36 and rotor 22 as an assembly is sufficiently high, for example in the range of about 115 pounds to about 140 pounds, to make handling and servicing challenging at times.

The prior art rotor 22 also includes a radially-extending disc 62. The disc 62 is operatively disposed between a pair of opposing brake pads (not shown), as is known. An axially-extending rotor sleeve 64 is integrally formed with and extends between the disc 62 and the mounting flange 54. The rotor sleeve 64, thus, connects the disc 62 to the mounting flange 54.

The disc 62 of the prior art rotor 22 includes an inboard surface 72 and an outboard surface 74. The inboard surface 72 is adjacent the friction material of a respective one of a pair of brake pads (not shown), and the outboard surface 74 is adjacent to the friction material of the other one of the pair of brake pads.

The integral connection of the disc 62 and the rotor sleeve 64 is at a relatively sharp corner 88. The disc 62 and the axially-extending rotor sleeve 64 meet at the corner 88 which is typically ninety degrees (90°). This connection of the rotor sleeve 64 to the disc 62 is typical in the prior art in order to not interfere with other components. Such a relatively sharp corner 88 connection may be a location of relatively high stress concentrations.

The prior art hub and rotor assembly 20, while mostly satisfactory for its intended purpose, has certain limitations, drawbacks and disadvantages. For example, the radially-extending mounting flange 54 of the prior art rotor 22 is mounted on the inboard side of the radially extending attachment portion 38 of the wheel hub 36. The largest outer diameter of the attachment portion 38 of the wheel hub 36 is larger than the smallest inner diameter of the rotor 22. As a result, should the rotor 22 require servicing or replacement, the wheel hub 36 must be removed with the disc brake rotor attached. This can be a relatively heavy assembly and be difficult to handle. After the spindle nut assembly 34 is removed from the end of the axle spindle 26, the relatively heavy hub and rotor assembly must be maneuvered off of the axle spindle 26. Such maneuvering may cause damage to the bearings 30, 32 and/or main seal 50 during removal or installation of the assembly from or onto the axle spindle. The wheel hub 36 generally requires servicing at this time even if it is the rotor 22 that primarily needs servicing. New main seal 50 is installed, the lubricant is removed and replaced, the bearings 30, 32 are inspected and replaced if not suitable for reuse, a new hub cap gasket is installed and the bearings adjusted.

The disc 62 may be subjected to peak temperatures in excess of 1100° F. and regularly is subjected to temperatures in the 480-800 F° range. The material used to cast the prior art rotor 22 must be able to withstand these temperatures as well as physical forces applied during braking. Since there is intimate contact between the rotor 22 and wheel hub 36, relatively elevated temperature heat can be quickly and directly transferred to lubricant within the wheel hub. Furthermore, the rotor 22 could have relatively high stress concentrations, for example in regions such as the relatively sharp corner 88.

As a result, there is a need in the art for a disc brake hub and rotor assembly for a heavy-duty vehicle that is relatively easy to handle and service, have a relatively longer conductive heat path, allow cooling air flow and reduce stress concentrations in some areas of the rotor. An improved disc brake hub and rotor assembly 100 (FIGS. 2-5) of the disclosed subject matter for heavy-duty vehicles satisfies these needs and overcomes the drawbacks, limitations and disadvantages of the prior art hub and rotor assembly 20.

The disc brake hub and rotor assembly 100 permits a rotor portion to be removed from the wheel end assembly without removing a hub portion from an axle spindle. Removal of just the rotor is relatively easy to handle and service as well as virtually eliminating the chance of damaging the bearings or main seal. The disc brake hub and rotor assembly 100 is configured to provide a relatively longer conductive heat path to dissipate over before reaching lubricant within the wheel hub. The disc brake hub and rotor assembly 100 is also configured to allow cooling air flow between components. The disc brake hub and rotor assembly 100 is further configured to reduce stress concentrations in some regions. While several aspects may be described, it is to be understood that such description or descriptions would apply equally to all aspects.

The disc brake hub and rotor assembly 100, according to one aspect of the disclosed subject matter, is intended for use on a heavy-duty vehicle (not shown). Heavy-duty vehicles include trucks and tractor-trailers or semi-trailers, and the tractor-trailers or semi-trailers may be equipped with one or more trailers. The heavy-duty vehicle may have more than one axle. Reference shall be made to a heavy-duty vehicle for the purposes of clarity and brevity, with the understanding that such reference includes trucks, tractor-trailers and semi-trailers, trailers and the like.

A heavy-duty vehicle typically includes one or more axles (not shown). The axle depends from, and extends transversely across, the heavy-duty vehicle. As is known, the axle includes a central tube (not shown). Each axle has a pair of opposite ends. An axle spindle 101 (FIG. 5) is connected, by any suitable means such as welding, to a respective end of the central tube. For the purposes of convenience, only one end of the axle will be described. The disc brake hub and rotor assembly 100 is mounted for rotation on the axle spindle 101 of the heavy-duty vehicle.

The disc brake hub and rotor assembly 100 for a heavy-duty vehicle, according to an aspect of the disclosed subject matter, is shown in FIGS. 2-5. The disc brake hub and rotor assembly 100 may be a three-piece structure that includes a hub portion 102, a rotor portion 104 and a flange portion 106. The hub portion 102, rotor portion 104 and flange portion 106 are connected together to operate as the disc brake hub and rotor assembly 100 on the heavy-duty vehicle. While the disc brake hub and rotor assembly 100 for a heavy-duty vehicle is illustrated, by way of example, for use with dual wheel/tire systems the concept of the disclosed subject matter may be applied to a single wheel/tire system.

Figure 7:
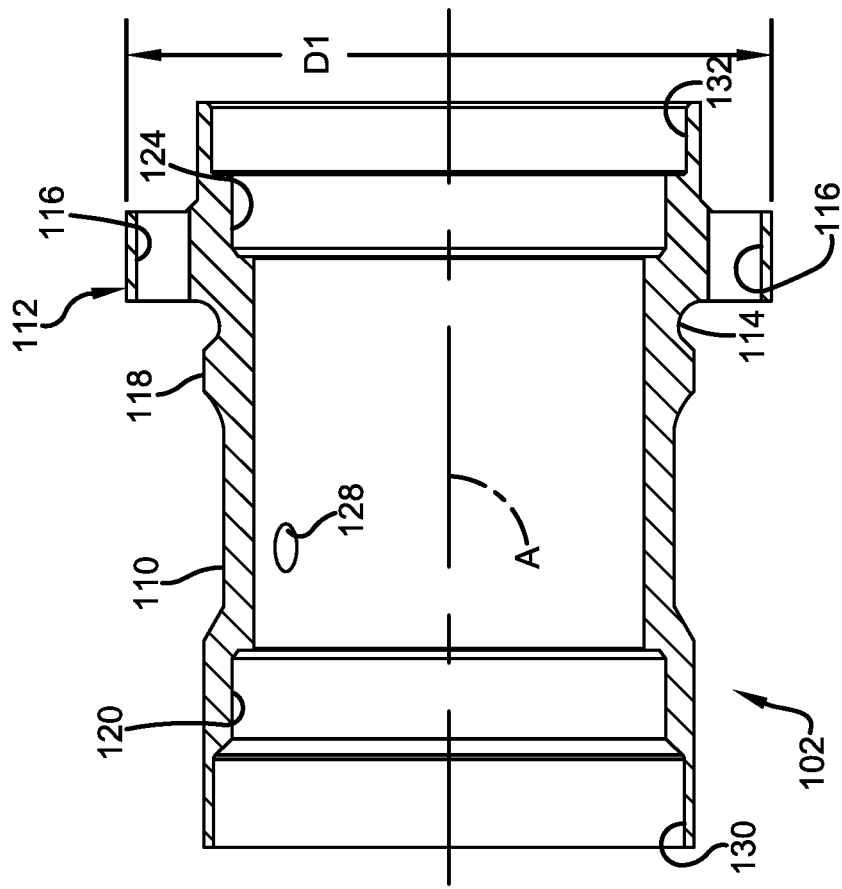
FIG. 7 is a cross-sectional side elevation view of the hub portion of the disc brake hub and rotor assembly illustrated in FIG. 6.
Figure 6:
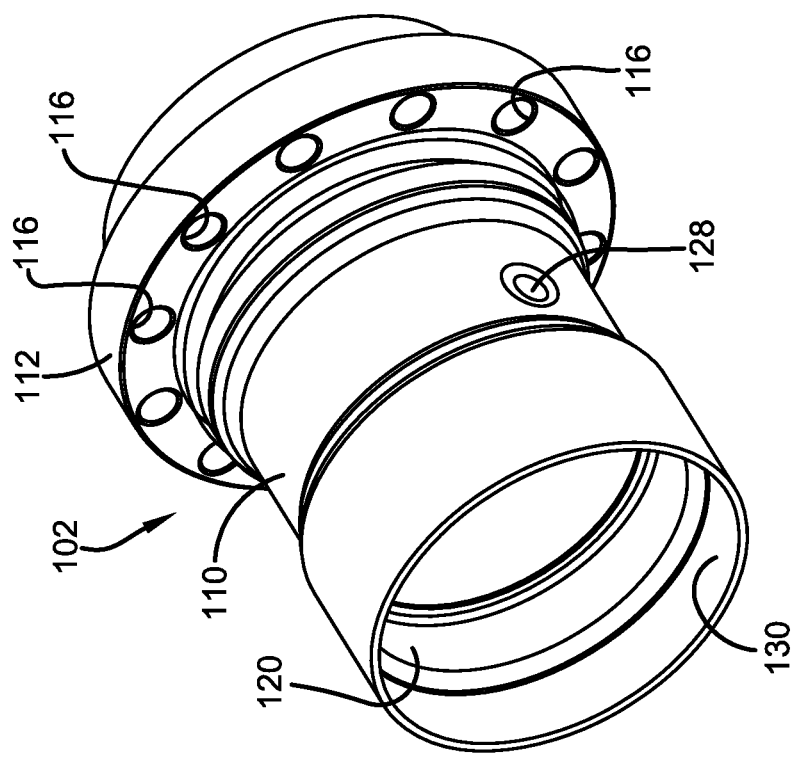
FIG. 6 is a perspective view of a hub portion of the disc brake hub and rotor assembly.

The hub portion 102 of the disc brake hub and rotor assembly 100 includes a substantially cylindrical body 110 (FIGS. 4-7) and a radially outward extending flange mounting section 112 integrally formed with the body. The hub portion 102 has an outer dimension or diameter D1 (FIGS. 5 and 7) which is the diameter of the largest part of the hub portion. The diameter D1 is taken across the flange mounting section 112 of the hub portion 102. The flange mounting section 112 includes a plurality of threaded openings 116 (FIG. 5) arranged in an evenly spaced circumferential array. The flange mounting section 112 of the hub portion 102 is connectable with the flange portion 106 of the disc brake hub and rotor assembly 100. The hub portion 102 is mounted for rotation about a longitudinal central axis A by outboard and inboard bearings 122, 126, respectively, on the axle spindle 101, as is known.

The hub portion 102 may be made of any suitable material. The hub portion 102 also may be made by any suitable method, such as forging. The hub portion 102 may be forged from steel. Forging a steel hub portion 102 creates grain flow in the axial direction which may strengthen the hub portion to allow the use of a relatively thinner wall, so less material may be used that may reduce material costs and provide a relatively lower weight hub portion. The flange mounting section 112 of the hub portion 102 is integrally formed with the body 110 of the hub portion during the manufacturing operation. The flange mounting section 112 is used to locate and connect the flange portion 106 with the hub portion 102.

An annular relief 114 (best seen in FIG. 7) is formed in the outer surface of the hub portion 102 at an interface between the body 110 and flange mounting section 112. The annular relief 114 is located axially along the hub portion 102 outboard of the flange mounting section 112 and radially inward of the flange portion 106 when the flange portion is connected to the hub portion. The annular relief 114 reduces stress concentrations in the body 110 of the hub portion 102 that may occur during operation of the disc brake hub and rotor assembly 100. The hub portion 102 includes a support area 118 (FIG. 7) on the body 110 that extends radially outward and is located axially outboard of the annular relief 114. The support area 118 functions to locate and support the flange portion 106.

Figure 5:
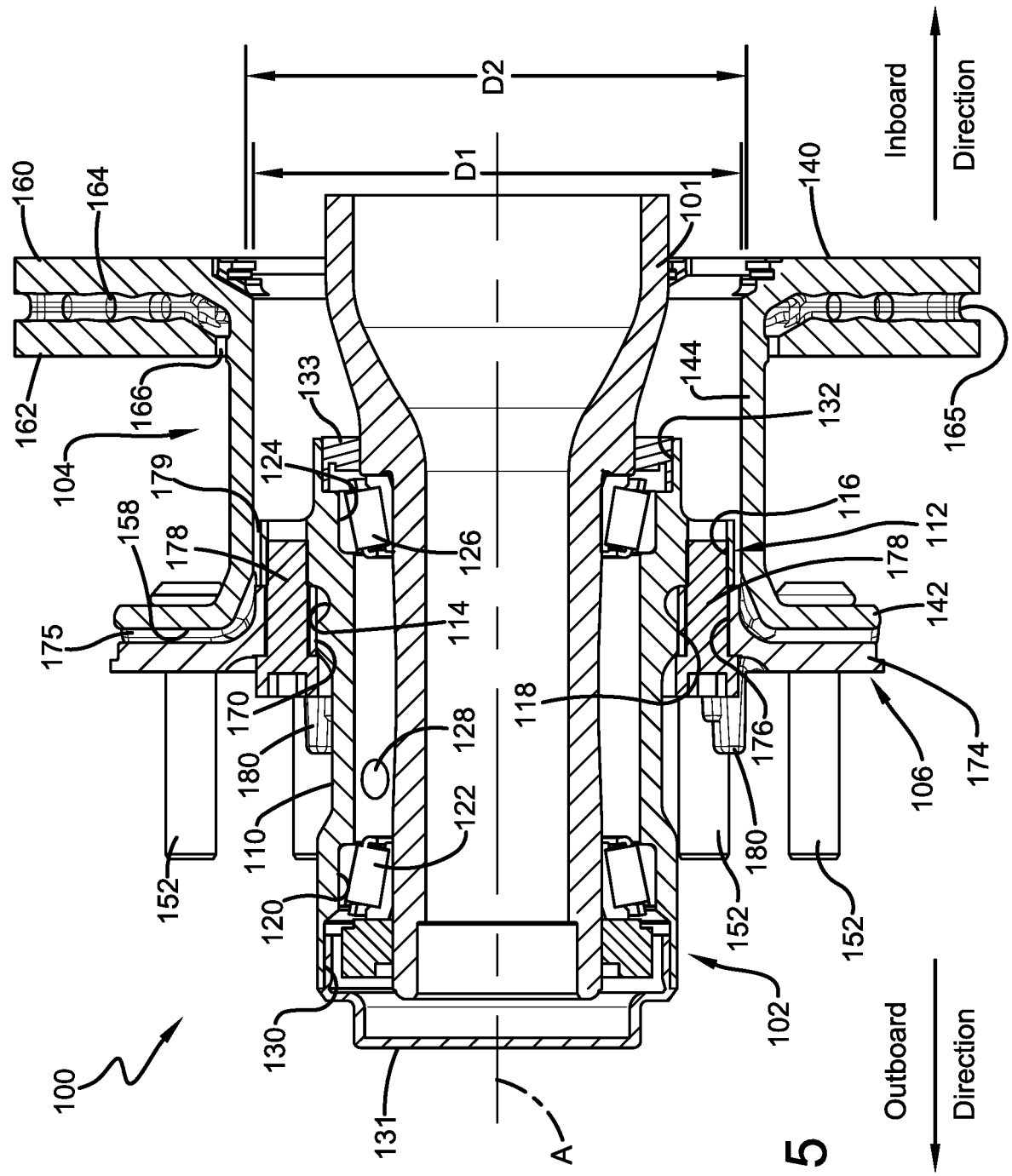
FIG. 5 is a cross-sectional side elevation view of the disc brake hub and rotor assembly.

The hub portion 102 also includes an annular cavity 120 (FIG. 7) in one end segment for receiving the outboard bearing 122 (FIG. 5). The hub portion 102 also includes an annular cavity 124 in an axially opposite end segment for receiving the inboard bearing 126.

The inboard and outboard bearings 126, 122, respectively, received in the hub portion 102 may be of any suitable size. For exemplary purposes, same size bearings, also referred to as parallel bearings, are used to support the hub portion 102 for rotation about the axle spindle 101. The same size bearings are used with an untapered or straight axle spindle 101. Using the same size bearings 122, 126 for mounting the hub portion 102 for rotation allows fewer bearings to be kept in stock, for example, in a service facility, warehouse, or production facility thereby reducing inventory cost. Using the same size bearings for the hub portion 102 also may reduce the cost of machining operations on the hub portion 102 by not having to use different size tooling to form the annular cavities 120 and 124. A further advantage of using same size bearings 122, 126 is that the lubricant fill level exposes both bearings to equal lubricant.

It is, however, contemplated to potentially use a pair of bearings with the same cone bore size but different cup outside diameter sizes, with modification to at least one of the annular cavities 120, 124. It is also contemplated to use a pair of bearings with the same cup outside diameter size but different cone bore sizes, with modification of the axle spindle 101. This potentially allows customization of the hub and/or bearing load rating while using the same hub portion 102 and/or axle spindle 101 to fit or change the needs of a particular application of the heavy-duty vehicle.

A fill port opening 128 (FIGS. 4-7) is provided in the body 110 of the hub portion 102. The fill port opening 128 is preferably threaded to receive a fitting that would allow the introduction of lubricant into the hub portion 102 for the bearings 122, 126. The fill port opening 128 in the hub portion 102 is located outboard of the axial extent of the flange portion 106 and the rotor portion 104 when the hub portion, flange portion and rotor portion are connected together, as illustrated in FIG. 5. The location of the fill port opening 128 allows relatively easy access to introduce lubricant into the interior of the hub portion 102. The fill port opening 128 is preferably provided at an axial and circumferential location in the hub portion 102 between the annular cavities 120, 124 for receiving the pair of bearings 122, 126 so as to be accessible without removing the flange portion 106 or any mechanical fasteners 152.

An outboard end section 130 of the hub portion 102 adjacent the annular cavity 120 is internally threaded to receive an external thread on a hubcap 131, instead of the traditional plurality of bolts that fasten the hubcap into relatively thick boss regions of the hub. The hubcap 131 closes the outboard end of the hub portion 102 and of the wheel end assembly. The internally threaded outboard end section 130 of the hub portion 102 results in a relatively thin wall being used in the end region to reduce overall weight of the hub portion 102 and of the resulting disc brake hub and rotor assembly 100. An inboard end section 132 of the hub portion 102 includes a main wheel seal 133 to close the inboard end of the hub portion. It is contemplated that a traditional bolt on hub cap may be employed.

The rotor portion 104 (FIGS. 4-5 and 8-9) of the disc brake hub and rotor assembly 100 includes a radially extending disc segment 140, a radially extending flange or mounting segment 142 and an axially extending sleeve segment 144 connecting the disc segment and the mounting segment. The disc segment 140, mounting segment 142 and the sleeve segment 144 are integrally formed by casting as one-piece of a suitable iron-based material. The rotor portion 104, especially the disc segment 140, may be subjected to peak temperatures in excess of 1100° F. and regularly subjected to temperatures in the 480-800 F° range. The material used to cast the rotor portion 104 must be able to withstand these temperatures as well as physical forces applied during braking and stresses created during braking.

The sleeve segment 144 is substantially cylindrical over its entire axial extent. The sleeve segment 144 rigidly connects the disc segment 140 and the mounting segment 142. The rotor portion 104 of the disc brake hub and rotor assembly 100 is connected with the hub portion 102 by the flange portion 106 and, therefore, all components forming the disc brake hub and rotor assembly are rotatable as a unit about a longitudinal central axis A (FIG. 5) of the axle spindle 101.

The disc segment 140 of the rotor portion 104 includes an inboard disc 160 and an outboard disc 162. The inboard and outboard discs 160, 162 are spaced apart from one another and are interconnected by a plurality of integrally formed vanes, posts or pins 164 (collectively referred to as "pins"). The vanes, posts or pins 164 are structural members that extend axially between the inboard and outboard discs 160, 162 to provide a rigid connection between the inboard and outboard discs. The vanes, posts or pins 164 cooperate with the inboard and outboard discs 160, 162 to form radial passages 165 which assist in allowing or creating cooling fluid flow through the disc segment 140 of the rotor portion 104. The disc segment 140 of the rotor portion 104 would typically be disposed between a pair of opposing brake pads (not shown) in a known manner. The brake pads slow or stop rotation of the rotor portion 104 and, therefore, the disc brake hub and rotor assembly 100 when the brake pads are forced against respective inboard and outboard discs 160, 162 of the disc segment 140.

The mounting segment 142 of the rotor portion 104 is formed with a plurality of circumferentially arrayed openings 150 (FIGS. 4 and 8) to receive a plurality of lightly interference fit mechanical fasteners 152 (FIGS. 2-3 and 5), such as wheel studs. The mechanical fasteners 152 assist in centering and connecting the rotor portion 104 with the flange portion 106 and to attach a wheel rim to the disc brake hub and rotor assembly 100. By way of example, the mechanical fasteners 152 extend through the openings 150 in the mounting segment 142 of the rotor portion 104 and through coaxially aligned openings 154 (FIGS. 4 and 10-11) in an attachment section 174 of the flange portion 106. Nuts (not shown) are tightened on the on the mechanical fasteners 152 and against the wheel rim which also forces the flange portion 106 against the rotor portion 104. The openings 150 have a diameter D150 (FIG. 5b) that is slightly larger than a diameter D154 of the openings 154. Because of the different hardness and strength between the rotor portion 104 and flange portion 106, a looser interference fit of knurls 151 on the mechanical fasteners 152 is used in the openings 150 than in the openings 154. The mounting segment 142 of the rotor portion 104 may have a lip 148 (FIG. 9) to assist in receiving and positioning the flange portion 106.

Figure 5A:
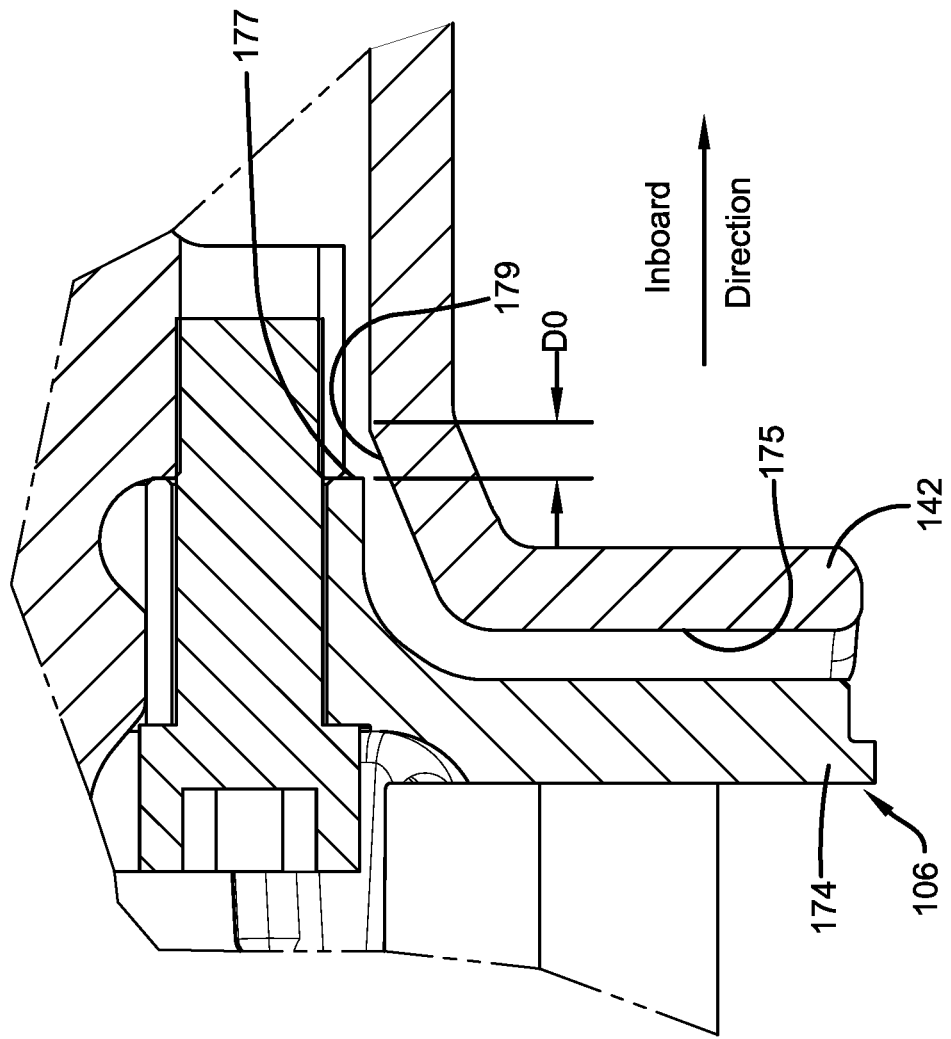

The mounting segment 142 of the rotor portion 104 may be formed with a circumferentially continuous and solid construction of the same axial thickness or may include a plurality of circumferentially spaced apart bosses 156 with the openings 150. Spaces or reliefs 158 between the bosses 156 lighten the weight of the rotor portion 104 without losing functional strength and, therefore, also reduces the weight of the disc brake hub and rotor assembly 100. The reliefs 158 form radial passages extending radially between the rotor portion 104 and flange portion 106 with surfaces that may act as an impeller for circulating cooling fluid through the hub and rotor assembly 100. Such cooling may assist in extending the service life of the lubricant within the hub portion 102 and, therefore, also extending the life of the bearings 122, 126 and the main wheel seal 133. The radial passages formed by the reliefs 158 may also be formed by optional surfaces (not shown) on the inboard side of the flange portion 106 that define another part of the radial passages. Further, portions of the radial passages formed by the reliefs 158 may be located on the outboard side of the mounting segment 142 of the rotor portion 104 as well as inboard side of the flange portion 106. There may also be one or more reliefs or axially extending clearance passages 179 (FIGS. 5-5a) between the outer periphery of the flange mounting section 112 of the hub portion 102 and the inner periphery of the sleeve segment 144 of the rotor portion 104. The clearance passages 179 are in fluid communication with the radially extending passages 175 defined by the reliefs 158. Thus, cooling fluid may flow through the clearance passages and through the radial passages defined by the reliefs 158. The start of the clearance passages 179 begins at a distance inboard of the inboard surface 177 of the flange portion 106 by a distance D0, as best seen in FIG. 5a.

The sleeve segment 144 of the rotor portion 104 is formed with an inner surface and an outer surface that are concentric and substantially cylindrical between the disc segment 140 and the mounting segment 142. The sleeve segment 144 of the rotor portion 104 has an inner dimension or diameter D2 (FIGS. 5 and 9) that is the smallest dimension of the rotor portion. The inner dimension or diameter D2 is greater than a largest outer dimension or diameter D1 of the hub portion 102. Thus, the rotor portion 104 may be removed axially from the hub portion 102 without removing or detaching the hub portion from the axle spindle 101. This is a significant feature that can potentially save time and effort in the servicing of the brake system of the heavy-duty vehicle.

An annular groove defines an axial passage 166 (FIG. 9) formed in the rotor portion 104 to fluidly connect with the radial passages 165 in the rotor portion. The axial passage 166 is formed at the interface of the outboard disc 162 and the sleeve segment 144 of the rotor portion 104. The axial passage 166 may be in the form of a continuous annular groove or a series of circumferentially spaced discrete openings to provide a fluid path for air, water and/or debris to flow through. The outer surface of the sleeve segment 144 may be located relatively close to brake structure, such as brake pads and/or caliper (not shown). Further, the outboard disc 162 is located adjacent to the outside surface of the sleeve segment 144. Thus, the axial passage 166 has a relatively small radially extending dimension. This may be accomplished by casting a major inboard portion of the axial passage 166 and then machining any intervening material from the outboard side of the axial passage.

Cooling fluid may flow from the axial passage 166 to the radial passages 165 formed between the inboard and outboard discs 160, 162. Cooling fluid flows radially outward from the radial passages 165 in the disc segment 140 from centrifugal force during rotation of the rotor portion 104. The axially extending passage 166 serves as an inlet for cooling fluid to enter by negative pressure from centrifugal force during rotation of the rotor portion 104 in the radial passages 165 in the disc segment 140. This cooling flow may carry away some of the heat in the disc segment 140 of the rotor portion 104 that is generated during braking.

The axial passage 166 may provide at least one other beneficial function in addition to directing cooling fluid to the radial passages 165. For example, the axial passage 166 may also disrupt direct heat conduction from the outboard disc 162 to the sleeve segment 144. The heat from the outboard disc 162 of the rotor portion 104 must be conducted from the outboard disc through the vanes, posts or pins 164, into the inboard disc 160 and into the sleeve segment 144. Heat is then conducted into the mounting segment 142 and into the flange portion 106 before it reaches the flange mounting section 112 of the hub portion 102. This heat transfer path through the components of the disc brake hub and rotor assembly 100 is relatively long and takes time. These components along with the attached wheel can serve as heatsinks over time to reduce the heat that the hub portion 102 is exposed to. Thus, less heat or elevated temperatures reach the hub portion 102 that can be conducted to the bearings 122, 126 and lubricant within the hub portion.

The disc brake hub and rotor assembly 100 also includes the flange portion 106 (FIGS. 4-5 and 10-12). The flange portion 106 is connectable with, and positioned between, the hub portion 102 and the rotor portion 104. The flange portion 106 is positioned between the hub portion 102 and the rotor portion 104 so the hub portion and the rotor portion are not in contact so there can be no heat conducted directly between the hub portion 102 and the rotor portion 104. The flange portion 106 is removable from the hub portion 102 with or without the rotor portion attached. The flange portion 106 is an intermediate member that supports the rotor portion 104 and connects with the hub portion 102. The flange portion 106 may be made by any suitable method, such as forging or casting. The flange portion 106 may be made from any suitable metal material, such as steel or an iron-based alloy, for example ductile iron or austempered ductile iron.

The flange portion 106 is a substantially annular shaped structural member with a central and circular opening 170 (FIGS. 10-12) through which part of the hub portion 102 may extend. The opening 170 in the flange portion 106 has a diameter D3 that closely or tightly fits over the support area 118 of the flange mounting section 112 of the hub portion 102. The flange portion 106 also includes a main central section 172 with the radially and circumferentially extending attachment section 174. The main central section 172 axially engages the outboard surface of the flange mounting section 112 of the hub portion 102. The opening 170 in the main central section 172 radially engages the support area 118 of the flange mounting section 112 of the hub portion 102. The opening 170 of the main central section 172 has an axial extent FA and a radial extent FR. An FA/FR ratio may be in the range of about 0.5 to about 3.0, and preferably about 1.0. Such an axial extent to radial extent ratio (FA/FR) assures that there is sufficient material in the main central section 172 of the flange portion 106 to accommodate a clamping force when the fasteners 178 are tightened to mount the flange portion to the hub portion 102 and to withstand loads and stresses encountered during operation of the heavy-duty vehicle.

The largest dimension D1 of the hub portion 102 is less than the smallest inner dimension D2 of the rotor portion 104. Thus, the hub portion 102 also could be removed from the axle spindle 101 without removing the rotor portion 104 or a brake caliper/carrier assembly (not shown) from its mounting structure. The flange portion 106 is first detached from the rotor portion 104. The flange portion 106 and hub portion 102 can then be removed from the axle spindle 101 as a unit. The flange portion 106 may be detached from the hub portion 102 to better access the hub portion for servicing. Alternately, the flange portion 106 may be detached from the hub portion 102 prior to removing the hub portion from the axle spindle 101. This is a significant service enhancement that can save time by not having to remove and reinstall the caliper/carrier assembly, which captures the rotor portion 104, in order to service just the hub portion 102.

The attachment section 174 of the flange portion 106 has the plurality of openings 154 for receiving the mechanical fasteners 152, with an interference fit, to attach a wheel rim to the flange portion 106 of the disc brake hub and rotor assembly 100. That is, the wheel rim is attached directly to the attachment section 174 of the flange portion 106 and not directly the hub portion 102. The bosses 156 of the rotor portion 104 engage the attachment section 174 of the flange portion 106. The reliefs 158 are defined by surfaces that create voids or spaces between the attachment section 174 of the flange portion 106 and the mounting segment 142 of the rotor portion 104, as illustrated in FIG. 5. The voids or spaces define a plurality of radially extending drains or passages 175. The passages 175 permit water and/or cooling air to flow out of and exit the interior of the sleeve segment 144 of the rotor portion 104.

The main central section 172 of the flange portion 106 has another plurality of openings 176 which may extend axially through the main central section. Each of the openings 176 receives a respective fastener 178 (FIG. 5) that is threaded into the threaded openings 116 in the flange mounting section 112 of the hub portion 102. Each of the fasteners 178 is tightened against the main central section 172 to rigidly fasten, with a sufficient clamping force, the flange portion 106 to the flange mounting section 112 of the hub portion 102.

The axial location of the flange portion 106 to the rotor portion 104 connection is between the bearings 122, 126 and around the annular relief 114, as illustrated in FIG. 5. This mounting structure and location allows for removal of the flange portion 106 and the rotor portion 104 from the hub portion 102 without removing the hub portion from the axle spindle 101. This mounting structure and location also applies or concentrates a majority of the load from the rotor portion 104 to the flange portion 106 intermediate the bearings 122, 126 in the hub portion 102. Heat conducted from the rotor portion 104 to the hub portion 102 first passes through the flange portion 106 before reaching the hub portion. The relatively long time that the heat travels through components allows the hub portion 102 to run relatively cooler than if the rotor portion is connected directly to the hub portion, as in the prior art. The lubricant is, thus, exposed to relatively lower temperatures to provide effective life of the bearings 122, 126 and main wheel seal 133.

A plurality of circumferentially arrayed and spaced apart wheel pilots 180 are integrally formed on the flange portion 106 to assist in mounting a tire and wheel assembly (not shown). The wheel pilots 180 are not part of the hub portion 102. Each of the wheel pilots 180 extends axially, and is cantilevered, from the outboard face of the flange portion 106 adjacent an interface of the main central section 172 and the attachment section 174. Each wheel pilot 180 may include a reinforcement structure 182 extending radially inward from of the wheel pilot in order to provide additional radial and bending strength to the wheel pilot. The reinforcement structure 182 may be in the form of a rib extending radially inward of the wheel pilot 180 and having a circumferential extent less than the circumferential extent of the wheel pilot. The reinforcement structure 182 may also be in the form of additional material extending radially inward of the wheel pilot 180 of substantially the same circumferential extent as that of the wheel pilot. The wheel pilots 180 may be integrally formed on the flange portion 106 during a manufacturing operation.

It should be apparent that the disc brake hub and rotor assembly 100 may include a tone ring (not shown) that may be integrally formed with the rotor portion 104 or be a separate component that is attached to the rotor portion. The form and/or configuration of any tone ring may depend on particular design considerations.

In order to remove and service the rotor portion 104 of the disc brake hub and rotor assembly 100, the tire and wheel assembly would first be dismounted from the mechanical fasteners 152. This exposes the disc brake hub and rotor assembly 100 for access. The disc brake pads, caliper and/or carrier would, at some time, be moved away from the disc segment 140 of the rotor portion 104 so as to not interfere with axial outboard movement of the rotor portion. The fasteners 178 would be loosened and removed from the threaded openings 116 in the flange mounting section 112 of the hub portion 102. The flange portion 106 may then be axially moved outboard until it is completely clear of the hub portion 102, the hubcap 131 and any accessory mounted to the hubcap. The rotor portion 104 may still be attached to the flange portion 106. In that case, the rotor portion 104 would be removed at the same time that the flange portion 106 is removed from the hub portion 102 so the bearings 122, 126 and main wheel seal 133 remain in place and are not disturbed or damaged. It is also possible that the flange portion 106 may be removable from the hub portion 102 without the rotor portion 104 attached. In that event, the flange portion 106 would be removed first and then the rotor portion 104 would be removed. The disc brake hub and rotor assembly 100, constructed according to the disclosed subject matter, also permits the removal of the hub portion 102 from the axle spindle 101 without removing the rotor portion 104. These features cooperate to provide improved serviceability of components of the disc brake hub and rotor assembly 100 by being separable, lighter in weight for easier handling and potentially not requiring involvement of highly skilled service technicians in order to minimize cost and downtime of the heavy-duty vehicle.

In order to install or replace a rotor portion 104 onto the hub portion 102 initially, after servicing or when it is to be replaced, the rotor portion would be attached to the flange portion 106 using the interference fit mechanical fasteners 152. The hub portion 102 would be installed on the axle spindle. The rotor portion 104 would be manipulated so the wheel studs or mechanical fasteners 152 extend through the openings 154 in the flange portion 106. The assembly of the rotor portion 104 and the flange portion 106 would then be moved axially relative to the hub portion 102 until the main central section 172 of the flange portion engages the flange mounting section 112 of the hub portion. The assembled rotor portion 104 and flange portion 106 unit is then rotated until the openings 176 in the main central section 172 are aligned with the threaded openings 116 in the flange mounting section 112 of the hub portion 102. Fasteners 178 are then inserted through the openings 176 and threaded into the aligned threaded openings 116 in the flange mounting section 112 and tightened to a proper torque. The disc brake pads, caliper and/or carrier are moved into their operating positions relative to the rotor portion 104. A tire and wheel assembly may then be mounted onto the mechanical fasteners 152 and centered relative to the hub portion by the wheel pilots 180. Nuts are then threaded onto the mechanical fasteners 152 to tighten the wheel against the flange portion 106. The heavy-duty vehicle may then return to service.

The disclosed subject matter also may provide a disc brake hub and rotor assembly 200 (FIGS. 13-14) for a heavy-duty vehicle, according to another exemplary aspect. The disc brake hub and rotor assembly 200, according to the disclosed subject matter, is intended for use on a heavy-duty vehicle. The disc brake hub and rotor assembly 200 is similar in structure and function to the disc brake hub and rotor assembly 100 illustrated in FIGS. 2-12 and described above. The disc brake hub and rotor assembly 200 is a two-piece structure that includes a hub portion 202 and a rotor portion 204. The disc brake hub and rotor assembly 200 permits the removal of the rotor portion 204 from the hub portion 202 without dismounting the hub portion from an axle spindle (not shown). This potentially results in less time that a heavy-duty vehicle having the disc brake hub and rotor assembly 200 is out of service during maintenance or servicing of the rotor portion 204.

The hub portion 202 of the disc brake hub and rotor assembly 200 has a substantially cylindrical body 210 for most of its axial extent. A flange mounting section 212 is integrally formed with and extends radially outward. The disc brake hub and rotor assembly 200 is adapted to be received on, and rotatable about, an axle spindle of the heavy-duty vehicle. The hub portion 202 has a diameter D5 (FIG. 14) which is the largest outer diameter of the hub portion. Diameter D5 is greatest across the flange mounting section 212.

The hub portion 202 also includes an annular cavity 220 (FIG. 14) in one end portion for receiving an outboard bearing (not shown). The hub portion 202 also includes an annular cavity 224 in an axially opposite end portion for receiving an inboard bearing (not shown).

The inboard and outboard bearings received in the hub portion 202 may be of any suitable size. For exemplary purposes, same size bearings are used to support the hub portion 202 for rotation about the axle spindle. The same size bearings are used with an untapered or straight axle spindle. Using the same size bearings for mounting the hub portion 202 allows fewer bearings to be kept in stock, for example, in a service facility, warehouse, or manufacturing facility thereby reducing inventory cost.

The hub portion 202 may be made from any suitable metal material, such as steel. The hub portion also may be made by any suitable method, such as forging. By way of example, the hub portion 202 may be forged from steel. Forging a steel hub portion 202 creates grain flow in the axial direction which may strengthen at least part of the hub portion, provide a relatively thinner wall so less material may be used to provide a relatively lighter weight hub portion and reduce material cost.

The rotor portion 204 includes a radially extending disc segment 240, a radially extending flange segment 242 and a substantially cylindrical sleeve segment 244 rigidly connecting the disc segment with the flange segment. The disc segment 240, the flange segment 242 and the sleeve segment 244 of the rotor portion 204 preferably are integrally formed as one-piece. The rotor portion 204 may be made of any suitable material having sufficient fatigue and thermal properties, such as cast ductile iron, austempered ductile iron or cast steel.

The flange segment 242 has an outer section 250 that extends radially outward of the sleeve segment 244. The flange segment 242 has openings 252 arranged in a spaced circumferential array and extending axially through the outer section 250 of the flange segment to receive wheel studs for mounting a wheel rim. The flange segment 242 also has an inner section 254 extending radially inward from the sleeve segment 244. The flange segment 242 of the rotor portion 204 is connectable with the flange mounting section 212 of the hub portion 202 by a plurality of fasteners 256 extending through openings (not shown) formed through the inner section 254 of the flange segment. The fasteners 256 are threaded into threaded openings (not shown) in the hub portion 202. The inner section 254 of the flange segment 242 abuts, and is located axially outboard of, the flange mounting section 212 of the hub portion 202 when connected together. The sleeve segment 244 has an inner dimension or diameter D4 that is the smallest dimension of the sleeve section. The inner dimension or diameter D4 is greater than the largest outer dimension or diameter D5 of the flange mounting section 212 of the hub portion 202. Thus, the rotor portion 204 may be removed axially outboard from the hub portion 202 without removing the hub portion from the axle spindle.

The disc segment 240 of rotor portion 204 includes an inboard disc 260 and an outboard disc 262. The inboard and outboard discs 260, 262 are spaced apart from one another and are interconnected by a plurality of integrally formed vanes, posts or pins 264. The vanes, posts or pins 264 are structural members that extend axially between the inboard and outboard discs 260, 262 to provide a rigid connection between the inboard and outboard discs, while forming radially-extending passages 265. The disc segment 240 of the rotor portion 204 would typically be disposed between a pair of opposing brake pads (not shown) in a known manner. The disc segment 240 slows or stops rotation of the rotor portion 204 when the brake pads are forced against the inboard and outboard discs 260, 262 of the disc segment during a braking function.

An axially extending passage 266 (FIG. 14) is formed in the rotor portion 204 to fluidly connect with the radially-extending passages 265 in the rotor portion. The axial passage 266 is formed at the intersection of the outboard disc 262 and the sleeve segment 244. The axially extending passage 266 is in fluid communication with the radially-extending passages 265 to provide a path for cooling air, water and/or debris to flow through. The axial passage 266 has a relatively small radially extending dimension. This may be accomplished by casting a major inboard portion of the axial passage 266 and then machining any intervening material from the outboard side of the axial passage.

A plurality of circumferentially arrayed and spaced apart wheel pilots 280 are integrally formed on the flange segment 242 of the rotor portion 204 to assist in mounting and locating a tire and wheel assembly (not shown). The wheel pilots 280 are not part of the hub portion 202. Each of the wheel pilots 280 is cantilevered from the outboard face of the flange segment 242. The wheel pilots 280 are integrally formed on the rotor portion 204 during a production operation. It should be apparent that the disc brake hub and rotor assembly 200 may include a tone ring (not shown) that may be integrally formed with the rotor portion 204 or be a separate component that is attached to the rotor portion.

The inner section 254 of the flange segment 242 of the rotor portion 204 is attached to the flange mounting section 212 of the hub portion 202 preferably at an axial location between the cavities 220, 224 for the bearings. This mounting structure and location allow axial outboard removal of the flange segment 242 and the rotor portion 204 from the hub portion 202 without removing the hub portion from the axle spindle. The mounting construction and location of the flange segment 242 also applies or concentrates a majority of the load from the rotor portion 204 and the flange segment 242 intermediate the cavities 220, 224 in the hub portion 202 for the bearings.

The disc brake hub and rotor assembly 100, 200 of the disclosed subject matter allows the removal of the rotor from the wheel end without removing the hub for ease of service, requiring less service time and less of a chance of damaging bearings or seals. The disc brake hub and rotor assembly 100, 200 of the disclosed subject matter may reduce thermal stresses in components of the disc brake hub and rotor. The disc brake hub and rotor assembly 100, 200 of the disclosed subject matter also reduces the heat that may be transferred to the lubricant contained within the hub, thus, lessening the possibility of an adverse effect on the service life of the bearings and/or main wheel seal.

An improved disc brake hub and rotor assembly 300 (FIGS. 15-19 and 23), according to another aspect of the disclosed subject matter, for a heavy-duty vehicle satisfies the need to be relatively easy to handle, easy to service and minimize heat conducted to lubricant within the hub and overcomes the limitations, drawbacks and disadvantages of previously known hub and rotor assemblies. The disclosed subject matter provides an improved disc brake hub and rotor assembly 300 for use on a heavy-duty vehicle. The disc brake hub and rotor assembly 300 may be in the form of a three-piece disc brake hub and rotor assembly for an air disc braking system of the heavy-duty vehicle.

The improved hub and rotor assembly 300 is mounted for relative rotation on an axle spindle 302 (FIGS. 17-18) of a wheel end (not shown) about a longitudinal central axis A. The disc brake hub and rotor assembly 300 may be a three-piece structure that includes the hub portion 304, the rotor portion 306 and the flange portion 308. The structure of the disc brake hub and rotor assembly 300 allows removal of the disc brake rotor portion 306 from the axle spindle 302 in a relatively simple and efficient manner without having to remove the hub portion 304 from the axle spindle 302. Handling of the removed rotor portion 306, thus, becomes easier because it does not include the weight of the hub portion 304 and bearings. The disc brake hub and rotor assembly 300 may permit a less experienced and less costly service technician to remove and/or replace the rotor portion 306 for servicing. Thus, the improved hub and rotor assembly 300 allows the heavy-duty vehicle to be put back into service sooner and at a relatively lower maintenance cost. The disc brake hub and rotor assembly 300 structure of the disclosed subject matter may also reduce thermal gradients and stress concentrations in components of the disc brake hub and rotor assembly.

The axle spindle 302 has at least one bearing receiving surface 392 (FIG. 18) with a first outer diameter H. The axle spindle 302 also has another bearing receiving surface 394 with an outer diameter H2. The first outer diameter H may be in the range from about 3.475 inches to about 3.800 inches, and preferably in the range from about 3.500 inches to about 3.540 inches and more preferably about 3.543 inches. The second outer diameter H2 may be the same as the first outer diameter H or different.

The hub portion 304, rotor portion 306 and flange portion 308 are connected together to operate as a unit on the heavy-duty vehicle. The hub portion 304 (best seen in FIG. 20) of the disc brake hub and rotor assembly 300 includes a substantially cylindrical body 310 and a radially extending flange mounting section 312 integrally formed with the body. An annular relief 314 is formed in the outer surface of the hub portion 304 at an interface of the body 310 and flange mounting section 312. The flange mounting section 312 includes a plurality of threaded openings 316 arranged in an evenly spaced circumferential array. The number of openings 316 are illustrated for exemplary purposes, any number of threaded openings suitable for a particular application may be employed. The flange mounting section 312 of the hub portion 304 is connectable with the flange portion 308 and may be used to locate and connect the flange portion with the hub portion.

The hub portion 304 may be made of any suitable metal material. The hub portion 304 also may be made by any suitable method, such as forging. The hub portion 304 may be forged from steel. Forging a steel hub portion 304 creates grain flow in the axial direction which may strengthen the hub portion to provide a relatively thinner wall so less material may be used to reduce material costs and provide a relatively lower weight hub portion. The flange mounting section 312 of the hub portion 304 is integrally formed with the body 310 during a manufacturing operation.

The hub portion 304 has an outer dimension or diameter D6 (FIGS. 18-20) which is the diameter of the largest part of the hub portion. The diameter D6 is taken across the outer circumferential surface of the flange mounting section 312. The diameter D6 may be in the range from about 8.000" to about 8.200" and preferably in the range from about 8.075" to about 8.150" and more preferably no greater than about 8.125".

The annular relief 314 is located outboard of the flange mounting section 312 and radially inward of the outer surface of the body 310. The annular relief 314 may be formed with a radius portion having a radius in the range from about 0.20" to about 0.40" and preferably in the range from about 0.25" to about 0.35". The annular relief 314 may also be formed with a frustoconical surface that extends at an angle in the range from about 30° to about 60° relative to the axis A and transitions into the radius portion. The annular relief 314 reduces stress concentration in the body 310 of the hub portion 304 that may occur during operation of the disc brake hub and rotor assembly 300.

The hub portion 304 includes a support area 318 (FIGS. 17-20) on the body 310 that extends radially outward of the outer surface of the body 310 and is located axially outboard of the annular relief 314. The support area 318 functions to locate and support the flange portion 308. The support area 318 of the body 310 of the hub portion 304 extends radially a distance R7 (FIG. 20a) from the axis A. A fill port opening 320 extends through the body 310. Because of the relatively small thickness of the body 310, the fill port opening 320 may be formed by flow drilling to provide additional material extending radially inward from the inner surface of the body. This provides some additional threads in the body 310 for a fill port plug 321 to engage and retain the fill port plug during operation of the heavy-duty vehicle. The fill port plug 321 may be of any suitable type, for example an Allen-head fastener with a sealing device such as an O-ring. The fill port plug 321 has a radial extent R8 that is less than the radial distance R7 of the support area so the flange portion 308 may be removed from the hub portion 304 without interference.

The hub portion 304 has an annular cavity 322 (FIGS. 17-18 and 20) in one end segment for receiving an outboard bearing 324. The hub portion 304 also has an annular cavity 326 in an axially opposite end segment for receiving an inboard bearing 328. The inboard bearing 328 and outboard bearing 324 received in the hub portion 304 may be of any suitable size. For exemplary purposes, same size bearings are used to support the hub portion 304 for rotation about the axle spindle 302. The same size bearings are preferably used with an untapered or straight type of axle spindle 302. Using the same size bearings for mounting the hub portion 304 for rotation allows fewer bearings to be kept in stock, for example, in a service facility, warehouse, or production facility thereby reducing inventory cost.

It is, however, contemplated to potentially use a pair of bearings with the same cone bore size but different cup outside diameter sizes, with modification to at least one of the annular cavities 322, 326. It is also contemplated to use a pair of bearings with the same cup outside diameter size but different cone bore sizes, with modification of the axle spindle 302. This potentially allows customization of the hub portion 304 and/or bearing load rating while using the same axle spindle 302 to fit or change the needs of a particular application of the heavy-duty vehicle.

An outboard end section 330 of the hub portion 304 adjacent the annular cavity 322 preferably has an internal thread to receive an external thread on a hubcap (not shown) instead of the traditional plurality of bolts that fasten the hubcap into relatively thick boss regions of the hub. The hubcap closes the outboard end of the hub portion 304 and of the axle spindle 302, as is known. The internally threaded outboard end section 330 of the hub portion 304 results in a relatively thin wall to reduce overall weight of the hub portion and of the resulting disc brake hub and rotor assembly 300. An inboard end section 334 of the hub portion 304 includes a main wheel seal 336 (FIG. 17) to close the inboard end of the hub portion, as is known.

The rotor portion 306 (FIGS. 15-19 and 21) of the disc brake hub and rotor assembly 300 includes a radially extending disc segment 340, a radially extending flange or mounting segment 342 and an axially extending sleeve segment 344. The disc segment 340, mounting segment 342 and the sleeve segment 344 may be integrally formed as one-piece casting of an iron-based material. The sleeve segment 344 is substantially cylindrical over its entire axial extent. The sleeve segment 344 rigidly connects the disc segment 340 and the mounting segment 342. The axial extent of the sleeve segment 344 may vary and depends on the application into which it is incorporated.

The rotor portion 306 is connectable with the hub portion 304 by the flange portion 308. Therefore, all components forming the disc brake hub and rotor assembly 300 are rotatable as a unit about longitudinal central axis A of the axle spindle 302. A smallest inner dimension E-ID (FIGS. 19 and 21) of the rotor portion 306 is greater than a largest outer dimension D6 of the hub portion 304 to allow for removal of the rotor portion without removing the hub portion from the axle spindle 302.

The sleeve segment 344 of the rotor portion 306 is formed with an inner surface and an outer surface that are substantially cylindrical and substantially concentric and the sleeve segment extends axially between the disc segment 340 and the mounting segment 342. The sleeve segment 344 of the rotor portion 306 has an inner dimension or diameter E-ID that is the smallest dimension of the rotor portion. The inner dimension or diameter E-ID is greater than a largest outer dimension or diameter D6 of the hub portion 304. Thus, the rotor portion 306 may be removed axially from the hub portion 304 without removing or detaching the hub portion from the axle spindle 302. This is a significant feature that can potentially save time and effort in the servicing of the brake system of the heavy-duty vehicle. The largest outside diameter D6 of the hub portion 304 is preferably smaller than the smallest inside dimension E-ID of the rotor portion 306 by at least about 0.030" and preferably at least about 0.050" to form a clearance passage 382.

The disc brake hub and rotor assembly 300 may include the flange portion 308 that connects the rotor portion 306 with the hub portion 304. The rotor portion 306 is preferably connectable only to the flange portion 308. The hub portion 304 is preferably connectable only to the flange portion 308. The flange portion 308 with the connected rotor portion 306 connect to the flange mounting section 312 of the hub portion 304 at a location outboard of flange mounting section.

The body 310 of the hub portion 304 has a second outer diameter C (FIGS. 19-20). The second outer diameter C is in the range from about 5.40" to about 5.86", preferably in the range from about 5.50" to 5.75 and more preferably about 5.65. The sleeve segment 344 of the rotor portion 306 has a radial thickness Q (FIGS. 19 and 21) in the range from about 0.25" to about 0.55" and preferably in the range from about 0.40" to about 0.50". A ratio of the second outer diameter C to the first outer diameter H of the bearing receiving surface 392 may be in the range from about 1.50 to about 1.64 and preferably in the range from about 1.59 to about 1.62.

The sleeve segment 344 of the rotor portion 306 has a third outer diameter E-OD (FIGS. 19 and 21). The third outer diameter E-OD is in the range from about 8.85" to about 9.30" and preferably in the range from about 9.10" to about 9.20". A ratio of the third outer diameter E-OD to the first outer diameter H of the bearing receiving surface 392 may be in the range from about 2.4 to about 2.7 and preferably in the range from about 2.50 to about 2.65.

The fourth inner diameter E-ID of the sleeve segment 344 of the rotor portion 306 is in the range from about 8.16" to about 8.56" and preferably in the range from about 8.26" to about 8.46". A ratio of the fourth inner diameter E-ID to the first outer diameter H of the bearing receiving surface 392 may be in the range from about 2.15 to about 2.55 and preferably in the range from about 2.25 to about 2.45.

The disc segment of the rotor portion has a fifth outer diameter F (FIGS. 17, 19 and 21). The fifth diameter F is in the range from about 16.00" to about 17.00" and preferably in the range from about 16.25" to about 16.60". A ratio of the fifth outer diameter F to the first outer diameter H of the bearing receiving surface 392 may in the range from about 4.35 to about 4.90 and preferably in the range from about 4.60 to about 4.80. A ratio of the fifth outer diameter F to the thickness Q of the sleeve segment 344 of the rotor portion 306 may in the range from about 31.0 to about 68.5 and preferably in the range from about 34.2 to about 40.5.

The disc brake hub and rotor assembly 300 includes wheel mounting segment 342 that has a plurality of circumferentially spaced openings 350 (FIG. 19) arranged on a sixth diameter S which may correspond to SAE recommended standard of 11.25". A ratio of the sixth diameter S to the outer diameter C of the body 310 of the hub portion 304 may be in the range from about 1.92 to about 2.1 and preferably in the range from about 1.95 to about 2.05.

The mounting segment 342 of the rotor portion 306 is formed with the plurality of circumferentially arrayed openings 350 (FIGS. 17-19 and 21) to receive a plurality of interference fit mechanical fasteners 352 (FIGS. 15-19), such as wheel studs. The mechanical fasteners 352 may assist in centering and connecting the rotor portion 306 with the flange portion 308 and attach a wheel rim (not shown) to the disc brake hub and rotor assembly 300. By way of example, the mechanical fasteners 352 extend through the openings 350 in the rotor portion 306 and through circumferentially aligned openings 354 (FIGS. 16-19) in the flange portion 308. Respective nuts (not shown) are tightened against the wheel rim which also forces the flange portion 308 against the rotor portion 306, as is known.

The disc segment 340 of the rotor portion 306 includes an inboard disc 360 and an outboard disc 362 (FIG. 21). The inboard and outboard discs 360, 362 may be spaced apart from one another and are interconnected by a plurality of integrally formed vanes, posts or pins 364. The 364 are structural members that extend axially between the inboard and outboard discs 360, 362 to provide a rigid connection. The vanes, posts or pins 364 also form radial passages 366 to assist in cooling the rotor portion 306. The disc segment 340 of the rotor portion 306 would typically be disposed between a pair of opposing brake pads (not shown) in a known manner. The brake pads slow or stop rotation of the rotor portion 306 when the brake pads are forced against the inboard and outboard discs 360, 362 of the disc segment 340.

At least one axial passage 368 (FIG. 21) is formed in the disc segment 340 of the rotor portion 306 and fluidly connects with the radial passages 366 in the rotor portion. The axial passage 368 is formed at the interface of the outboard disc 362 and the sleeve segment 344 of the rotor portion 306. The axial passage 368 may be in the form of a continuous annular groove or a series of circumferentially spaced discrete openings to provide a fluid path for cooling air, water and/or debris to flow through. The axial passage 368 has a relatively small radially extending dimension of about 0.180" to about 0.290". This may be accomplished by casting a major inboard portion of the axial passage 368 and then machining any intervening material from the outboard side of the axial passage.

The axial passage 368 disrupts direct heat conduction from at least a portion of the outboard disc 362 to the sleeve segment 344. The heat from the outboard disc 362 of the rotor portion 306 must be conducted from the outboard disc through the vanes, posts or pins 364 and into the inboard disc 360, into the sleeve segment 344, into the mounting segment 342 and into the flange portion 308 before it reaches the flange mounting section 312 of the hub portion 304. This relatively long heat conduction and transfer path through the components of the disc brake hub and rotor assembly 300 takes time and reduces in temperature the farther away that the heat is conducted from the outboard disc 362 of the disc segment 340. These components along with the attached wheel can serve as heatsinks over time to further reduce the heat to which the hub portion 304 is exposed. Thus, less heat or elevated temperatures reaches the hub portion 304 and, in turn, less heat can be transferred to the lubricant within the hub portion.

Cooling fluid may flow F1 (FIG. 23) from the axial passage 368 to the radial passages 366 formed between the discs 360, 362. Cooling fluid flows radially outward from the radial passages 366 in the disc segment 340 from centrifugal force during rotation of the rotor portion 306. The axial passage 368 serves as an inlet for cooling fluid to enter by negative pressure from centrifugal force during rotation of the rotor portion 306 in the radial passages 366 in the disc segment 340. This cooling flow F1 carries away some of the heat in the disc segment 340 of the rotor portion 306 that is generated during braking.

The mounting segment 342 of the rotor portion 306 may be formed with a circumferentially continuous and solid construction or may include a plurality of circumferentially spaced apart bosses 356 (FIGS. 16 and 21) with the openings 350. Surfaces defining spaces or reliefs 358 between the bosses 356 may be provided to lighten the weight of the rotor portion 306 without losing functional strength. Therefore, the weight of the disc brake hub and rotor assembly 300 is correspondingly reduced. The reliefs 358 may also cooperate with an inboard facing surface 400 (FIGS. 22-23) of the flange portion 308 to form radial passages 396 that act as impellers for cooling the hub and rotor assembly 300 to further assist in extending the service life of the lubricant within the hub portion 304 and, thus, the bearings 324, 328 and the main wheel seal 336.

The circumferential side surfaces of each relief 358 that extend in a radial direction are preferably smooth. A radially inner end region 402 (FIG. 16) of each relief 358 may have a dimension taken in the circumferential direction that is less than a dimension taken in the circumferential direction of a radially outer end region 404. Reliefs, such as the reliefs 358 in the mounting segment 342 of the rotor portion 306, may also be formed on the inboard facing surface 400 of the flange portion 308 to match the passages formed by the reliefs and form a radial passage with a larger volume than radial passage 396. The clearance passage 382 (FIGS. 17-19 and 23) is formed between the largest outer periphery of the flange mounting section 312 of the hub portion 304 and the smallest inner periphery of the sleeve segment 344 of the rotor portion 306. The clearance passage 382 directs heat flow by preventing or minimizing thermal conductive contact between the rotor portion 306 and the flange portion 308. The clearance passage 382 is at least about 0.030" and preferably about 0.050".

The clearance passage 382 (FIGS. 17-19 and 23) is formed between the outer periphery of the flange mounting section 312 of the hub portion 304 and the inner periphery of the sleeve segment 344 of the rotor portion 306. The clearance passage 382 directs heat flow by preventing or minimizing thermal conductive contact between the rotor portion 306 and the flange portion 308 and assist in inducing fluid flow F2. The reliefs 358 create voids or spaces between an attachment section 374 of the flange portion 308 and the mounting segment 342 of the rotor portion 306. The voids or spaces created by the reliefs 358 at least partially define the plurality of radial passages 396 which permit water to flow out of and exit a cavity 398 within the sleeve segment 344 of the rotor portion 306. The radial passages 396 also allow for cooling air to be pumped out of the radial passages while the hub and rotor assembly 300 rotates.

The chamber or cavity 398 is formed between the cylindrical sleeve segment 344 of the rotor portion and axle spindle 302. The clearance passage 382 is in fluid communication with the cavity 398 and with the radial passages 396. The fluid flow F2 is from the cavity 398 through the clearance passage 382 and through the radial passages 396.

The clearance passage 382 serves as an inlet for cooling fluid to enter from the cavity 398 due to negative pressure from centrifugal force during rotation of the rotor portion 306 from the cavity 398 to the radial passages 396 formed between the rotor portion 306 and the flange portion 308. This cooling fluid flow F2 carries away some of the heat conducted from the disc segment 340 of the rotor portion 306 that is generated during braking. The fluid flow F2 further cools the mounting segment 342 and sleeve segment 344 of the rotor portion 306 as heat is conducted to them from the disc segment 340 generated during braking.

The disc brake hub and rotor assembly 300 also includes the flange portion 308 (FIGS. 15-19 and 22). The flange portion 308 is used to mount wheels (not shown) of the heavy-duty vehicle. The flange portion 308 may also be an intermediate component that supports the rotor portion 306 and connects with the hub portion 304. The flange portion 308 is connectable with, and positioned between, the hub portion 304 and the rotor portion 306. The flange portion 308 may be made by any suitable method, such as forging or casting. The flange portion 308 may be made from any suitable metal material, such as steel or an iron-based alloy, for example ductile iron or austempered ductile iron. The flange portion 308 may be removable from the hub portion 304 with or without the rotor portion 306 attached.

The flange portion 308 is a structural member with a central and circular opening 370 (FIGS. 16 and 22) that permits part of the hub portion 304 to extend through. The opening 370 in the flange portion 308 has an inner diameter O that closely or tightly fits over the support area 318 of the flange mounting section 312 of the hub portion 304. Thus, the inner diameter O of the opening 370 of the flange portion 308 is substantially equal to the outer diameter D7 at the support area 318 of the body 310 of the hub portion 304. If an alternate bolt on hub cap is used to attach to the hub portion 304, the flange portion 308 may have clearance regions (not shown) extending radially from opening 370 so the flange portion may clear hub cap attachment structure. The flange portion 308 includes a main central section 372 (FIG. 22) with a radially and circumferentially extending attachment section 374. The main central section 372 axially engages the outboard surface of the flange mounting section 312 of the hub portion 304. The main central section 372 also radially engages the support area 318 of the flange mounting section 312 of the hub portion 304. An outboard facing end surface 406 (FIGS. 16 and 19-20) of the flange mounting section 312 of the hub portion 304 is located inboard of the inboard facing end surface 408 of the main central section 372 of the flange portion 308.

The attachment section 374 of the flange portion 308 has the plurality of openings 354 for receiving, preferably with an interference fit, the mechanical fasteners 352 that attach a wheel rim to the flange portion 308. That is, the wheel rim is attached directly to the flange portion 308 and not directly to the hub portion 304. The preferred interference fit of the mechanical fasteners 352 within the openings 354 in the flange portion 308 and openings 350 in the mounting segment 342 of the rotor portion 306 serve to center the rotor portion relative to the flange portion. The preferred interference fit of the mechanical fasteners 352 within the openings 354 and openings 350 also hold the flange portion 308 and rotor portion 306 together during installation of a tire and wheel assembly and during installation of the connected rotor portion 306 and flange portion 308. The bosses 356 of the rotor portion 306 engage the attachment section 374 of the flange portion.

The main central section 372 of the flange portion 308 has another plurality of openings 378 (FIG. 22) which may extend axially through the main central section. Each of the openings 378 receives a respective fastener 380 (FIGS. 17-19) that is threaded into the threaded openings 316 in the flange mounting section 312 of the hub portion 304. Each of the fasteners 380 is tightened against the main central section 372 of the flange portion 308 to rigidly fasten, with a sufficient clamping force, to the flange mounting section 312 of the hub portion 304.

The interconnected assembly of the flange portion 308 and the rotor portion 306 is attached to the flange mounting section 312 of the hub portion 304 at an axial location between the bearings 324, 328 and around the annular relief 314, as illustrated in FIGS. 17-19. Specifically, the wheel mounting contact surface or outboard end surface 406 of the flange portion 308 is axially located between the bearings 324, 328. This mounting arrangement and location applies or concentrates a majority of the load from the tires to the flange portion 308 between the bearings 324, 328 in the hub portion 304 preferably in equal amounts. Heat conducted from the rotor portion 306 to the hub portion 304 first passes through the flange portion 308 before reaching the hub portion. This allows the hub portion 304 to run relatively cooler than if the rotor portion connects directly to the hub portion 306 as in the previously known hub and rotor assemblies. This helps prevent or minimize a breakdown of the lubricant and, thus, provides enhanced service life of the bearings 324, 328 and main wheel seal 336.

A plurality of circumferentially arrayed and spaced apart wheel pilots 384 are integrally formed on the flange portion 308 to assist in mounting a tire and wheel assembly (not shown). The wheel pilots 384 are not part of the hub portion 304. Each of the wheel pilots 384 extends axially, and is cantilevered, from the outboard face of the flange portion 308 adjacent the main central section 372. Each wheel pilot 384 may include reinforcement structure 386 extending radially inward from the wheel pilot in order to provide additional radial and bending strength to the wheel pilot. The reinforcement structure 386 may be in the form of a rib extending radially inward of the wheel pilot 384 and having a circumferential extent less than the circumferential extent of the wheel pilot. The reinforcement structure 386 may also be in the form of additional material extending radially inward of the wheel pilot 384.

The disc brake hub and rotor assembly 300 may include a tone ring 390 (FIGS. 17-18) that may be integrally formed with the rotor portion 306 or be a separate component that is attached to the rotor portion. The form and/or configuration of any tone ring may depend on particular design considerations.

The disc brake hub and rotor assembly 300 of the disclosed subject matter allows the removal of the rotor from the wheel end without removing the hub for ease of service, requiring less service time and less of a chance of damaging bearings or seals. The disc brake hub and rotor assembly 300 of the disclosed subject matter may reduce thermal stresses in components of the disc brake hub and rotor. The disc brake hub and rotor assembly 300 of the disclosed subject matter also reduces the heat that may be transferred to the lubricant contained within the hub, thus, lessening the possibility of an adverse effect on the service life of the bearings and/or main wheel seal.

An optional or additional cooling fluid flow F3 (FIG. 24) may be provided in the disc brake hub and rotor assembly 300. The disc brake hub and rotor assembly 300 may include a second radially extending passage 420 formed between the mounting section 312 of the hub portion 304 and the main central section 372 of the flange portion 308. The second radially extending passage 420 is in fluid communication with, and extends inwardly of, the clearance passage 382.

A second axially extending passage 422 may be formed between a radially outboard surface of the mounting section 312 of the hub portion 304 and a radially inboard surface of the main central section 372 of the flange portion 308. The second axially extending passage 422 is in fluid communication with the second radially extending passage 420 at an inboard end portion to define a composite conduit 424. The second axially extending passage 422 is also in fluid communication with atmosphere or the exterior of the disc brake hub and rotor assembly 300 at an outboard end portion.

The path of cooling fluid flow F3 may flow from atmosphere or external to the disc brake hub and rotor assembly 300 to the second axially extending passage 422 of the composite conduit 424 to the second radially extending passage 420 of the composite conduit and to the radially extending passage 396. Fluid flow from the composite conduit 424 may join up with fluid flow F2 (FIG. 23) from the cavity 398 at the clearance passage 382 to be expelled radially outward by centrifugal force due to rotation of the disc brake hub and rotor assembly 300. The path through composite conduit 424 for cooling fluid flow F3 may be particularly useful in instances when increased cooling of the disc brake hub and rotor assembly 300 is desired. The second axially extending passage 422 and the second radially extending passage 420 further define a space of noncontact between the flange portion 308 and the hub portion 304 to prevent or minimize the conduction of heat from the flange portion to the hub portion in that noncontact space. In some conditions, the path of cooling fluid flow may also be from atmosphere to the second axially extending passage 422 to the second radially extending passage 420 to the radial passage 382 and to the cavity 398.

To better understand the rotor constructed according to the disclosed subject matter for use in hub and rotor assemblies, another prior art rotor 502 used in prior art disc brake rotor assembly 500 for a heavy-duty vehicle is shown in FIGS. 25-27. The prior art disc brake rotor assembly 500 operates in and is exposed to the same environment as the prior art disc brake hub and rotor assembly 20 shown in FIG. 1 and described above.

The prior art disc brake rotor assembly 500 includes the rotor 502 and a wheel mounting flange 504. The prior art disc brake rotor assembly 500 is connectable with a hub 506 (FIGS. 26-27) by threaded fasteners 508. The hub 506 and prior art disc brake rotor assembly 500 are receivable on, and rotatable about, an axle spindle (not shown) of the heavy-duty vehicle, as is known.

The rotor 502 includes a disc segment 522, a mounting segment 524 and a substantially cylindrical sleeve segment 526 connecting the disc segment with the mounting segment. The disc segment 522, mounting segment 524 and sleeve segment 526 are typically formed as an integral one-piece component. The wheel mounting flange 504 connects with the mounting segment 524 of the rotor 502. The wheel mounting flange 504 also connects with the hub 506. The connected wheel mounting flange 504 and mounting segment 524 of the rotor 502 may attach to the hub 506 at a location outboard of mounting structure of the hub. The hub 506 may be removed from the axle spindle without removing the rotor 502.

In a typical heavy-duty vehicle, a tire (not shown) is mounted on a wheel rim (not shown), as is known. The wheel rim is operatively mounted on the wheel mounting flange 504 by a plurality of fasteners or threaded wheel mounting studs 542 and mating nuts (not shown). The plurality of threaded wheel mounting studs 542 and mating nuts are used to mount the wheel rim or a pair of wheel rims on the prior art disc brake rotor assembly 500.

The mounting segment 524 is integrally connected to the sleeve segment 526 at a radiused transition region 544. A radius of the transition region 544 is typically as large as possible for strength. The relatively large radius in transition region 544 is typical in the prior art but may tend to interfere with components such as the plurality of wheel mounting studs 542. In order to minimize or eliminate interference with components in the transition region 544, the transition region is often formed with a plurality of clearance reliefs 546 corresponding to the number of wheel mounting studs 542 employed.

The mounting segment 524 of the rotor 502 is formed with the plurality of circumferentially arrayed openings 560 (FIG. 25) to receive the plurality of interference fit mechanical fasteners such as the wheel mounting studs 542. The wheel mounting studs 542 extend through respective openings 560 in the rotor 502 and interference fit in circumferentially aligned openings 562 in the wheel mounting flange 504. The wheel mounting studs 542 may assist in centering and connecting the rotor 502 with the wheel mounting flange 504 and attach the wheel rim to the disc brake rotor assembly 500. Respective nuts (not shown) are tightened against the wheel rim which also forces the wheel mounting flange 504 against the rotor 502 to further secure the rotor with the wheel mounting flange.

Each of the wheel mounting studs 542 has a cylindrical portion 582 extending from a head 584 to a threaded portion 586. The cylindrical portion 582 of the wheel mounting stud 542 is interference fit into the openings 560 in the mounting segment 524 of the rotor 502 and the openings 562 in the wheel mounting flange 504. The wheel mounting stud 542 may include a knurled portion (not shown) that can be interference fit into the openings 560 and 562.

The prior art rotor assembly 500, while mostly satisfactory for its intended purpose, has certain limitations, drawbacks and disadvantages. For example, the relatively large radius and reliefs 546 in the transition region 544 of the rotor 502 may result in undesirable localized relatively high stress concentrations. Further, the wheel mounting studs 542 may not provide optimal securement and alignment of the rotor 502 and mounting flange 504.

As a result, there is a need for a rotor assembly for a disc brake hub and rotor assembly for use in a heavy-duty vehicle. An improved rotor assembly for a disc brake hub and rotor assembly of the disclosed subject matter satisfies the need and overcomes the drawbacks, limitations and disadvantages associated with the prior art rotor 502 of the rotor assembly 500. The rotor assembly of the disclosed subject matter provides a rotor with a transition region that reduces undesirable high stress concentrations. The rotor assembly of the disclosed subject matter also incorporates an improved wheel mounting stud.

A disc brake hub and rotor assembly 600 (FIGS. 28 and 30) constructed according to an aspect of the disclosed subject matter is relatively light in weight. The disc brake hub and rotor assembly 600 of the disclosed subject matter is intended for use on a heavy-duty vehicle. The disc brake hub and rotor assembly 600 permits a rotor 604 to be removed from a wheel end assembly without removing a hub 602 from an axle spindle (not shown). The separately removed rotor 604 is relatively easy to handle and service as well as minimizing the chance of damaging bearings or main seal. The disc brake hub and rotor assembly 600 is also configured to allow cooling air flow between components. The rotor 604 of the disc brake hub and rotor assembly 600 is configured to reduce relatively high stress concentrations in some regions of the rotor. The disc brake hub and rotor assembly 600 also provides a new and improved wheel mounting stud. While several aspects may be described, it is to be understood that such description or descriptions would apply equally to all aspects.

The disclosed subject matter provides the improved disc brake hub and rotor assembly 600 for use on a heavy-duty vehicle that is relatively light weight, strong, and employs an improved wheel stud. The disc brake hub and rotor assembly 600 may be a three-piece structure that includes the hub 602, the rotor 604 (FIGS. 28-35) and a wheel mounting flange 606 for use in an air disc braking system of the heavy-duty vehicle. The hub 602, rotor 604 and flange 606 connect together to operate as a unit in a wheel end of the heavy-duty vehicle. The hub 602 and flange 606 may be made of any suitable metal material, such as steel or an iron-based alloy, for example ductile iron or austempered ductile iron. The rotor 604 may be made of any suitable metal material, such as gray iron. The flange 606 may be removable from the hub 602 with or without the rotor 604 attached. The hub 602, rotor 604 and flange 606 may be made by any suitable process, such as casting. The structure of the disc brake hub and rotor assembly 600 allows removal of the disc brake rotor 604 from the axle spindle in a relatively simple and efficient manner without having to remove the hub 602 from the axle spindle, as described above.

The improved hub and rotor assembly 600 is mounted for relative rotation on an axle spindle, such as the axle spindle 302 (FIGS. 17-18 and 23), of the wheel end about a longitudinal central axis AA. The rotor 604 is connected with the hub 602 for rotation with the hub. The construction and operation of at least part of the hub 602, rotor 604 and/or flange 606 are identical to the corresponding components described above in the disc brake hub and rotor assemblies 100, 200, 300, unless otherwise noted below. A smallest inner dimension E-ID1 (FIG. 31) of the rotor 604 is greater than a largest outer dimension D19 (FIG. 30) of the hub 602 to allow for removal of the rotor portion without removing the hub portion from the axle spindle 302. The inner diameter E-ID1 (FIG. 31) of the rotor 604 may be in the range from about 8.16 inches to about 8.56 inches, preferably in the range from about 8.26 inches to about 8.46 inches, and more preferable about 8.366 inches. A ratio of the inner diameter E-ID1 to the first outer diameter H of the bearing receiving surface 392 of the axle spindle 302 (E-ID1/H) may be in the range from about 2.15 to about 2.55, preferably in the range from about 2.25 to about 2.45 and more preferably about 2.36. The outer dimension D19 may be within the range of about 8.000 inches to about 8.350 inches, preferably in the range of about 8.150 inches to about 8.250 inches, and more preferably not greater than about 8.200 inches.

The hub 602 includes a cylindrical surface 610 (FIGS. 30-30b) for supporting and centering the flange 606 on the hub. The hub 602 also includes an outboard facing annular surface 612 for engaging an inboard facing annular surface 613 of the flange 606 to establish the axial position of the flange on the hub. The hub 602 further includes an annular groove 614 between an outboard facing annular surface 612 for engaging an inboard facing annular surface 613.

The annular groove 614 has a compound radius or specific cross-sectional configuration taken in a plane extending through the longitudinal central axis AA. The annular groove 614 has three different radii (GR1, GR2, GR3) and an axially extending cylindrical surface GC located among the different radii. The specific configuration of the annular groove 614 functions to reduce relatively high stress concentrations and overall stress in this region of the hub near the interface with the flange. Alternatively, the annular groove may have any other suitable configuration that reduces relatively high stress concentrations and overall stress in this region of the hub near the interface with the flange.

The radius GR1 extends axially outboard and smoothly from the annular surface 612 of the hub 602 for an axial extent of about 0.064 inch. The radius GR1 is about 0.129 inch. The radius GR2 extends axially outboard and smoothly from the radius GR1 of annular groove 614. The radius GR2 is about 0.574 inch. The radius GR2 extends axially outboard from the annular surface 612 of the hub 602 to an axial extent of about 0.354 inch. The cylindrical surface GF extends axially outboard and smoothly from the radius GR2 of annular groove 614 for an axial distance of about 0.032 inch. The radius GR3 extends axially outboard and smoothly from the cylindrical surface GF. The radius GR3 is about 0.296 inch. The compound radius configuration of the annular groove 614 in the hub 602 reduces stress at intersection of the body 608 to the outboard facing annular surface 612 and improves fatigue life of the hub.

The flange 606 is a substantially annular shaped structural member with a central and circular opening 670 (FIG. 30) through which a body 608 of the hub 602 may extend. The opening 670 has an axial extent FA1 and a radial extent FR1. The axial extent FA1 may be in the range of about 1.0 inch to about 1.6 inches and preferably about 1.3 inches. The radial extent FR1 may be in the range of about 0.95 inch to about 1.33 inches. A ratio of the axial extent FA1 to the radial extent FR1 (FA1/FR1) may be in the range of about 0.6 to about 2.2, and preferably about 1.4. Such an axial extent to radial extent ratio (FA1/FR1) assures that there is sufficient material in the flange 606 to accommodate a clamping force when the flange portion is mounted to the hub 602 and to withstand loads and stresses encountered during operation of the heavy-duty vehicle.

The rotor 604 has a radially extending disc segment 620 (best seen in FIGS. 29 and 31), a flange mounting segment 622, and a substantially cylindrical sleeve segment 624 connecting the disc segment to the flange mounting segment. The disc segment 620, flange mounting segment 622 and cylindrical sleeve segment 624 are preferably integrally formed as one-piece to form the rotor 604. The disc segment 620 is engageable by friction pads of a disc brake system to slow rotation of the disc segment and rotor 604 and ultimately stop motion of the heavy-duty vehicle.

The sleeve segment 624 is substantially cylindrical over its entire axial extent. The axial extent of the sleeve segment 624 may vary and depends on the application into which it is incorporated. The sleeve segment 624 rigidly and permanently connects the disc segment 620 with the flange mounting segment 622. The rotor 604 may include a tone ring (not shown) that may be integrally formed with the rotor or be a separate component that is attached to the rotor. The form and/or configuration of any tone ring may depend on particular design considerations.

The flange 606 is connected with the flange mounting segment 622 of the rotor 604 by a plurality of wheel mounting studs 642 and separately with the hub 602 by threaded fasteners 646. A plurality of circumferentially arrayed and spaced apart wheel pilots (not shown) may be integrally formed on an outboard surface of the flange 606 to assist in mounting a tire and wheel assembly.

The flange mounting segment 622 of the rotor 604 has an inboard facing surface 640 at least part of which is for engaging portions, such as a head 660 (FIGS. 34-35), of the wheel studs 642 (FIGS. 28 and 30). The wheel studs 642 extend through openings 648 in the flange mounting segment 622 of the rotor 604. The inboard facing surface 640 of the flange mounting segment 622 of the rotor 604 is substantially planar and free of wheel stud clearance reliefs, as illustrated in FIGS. 28, 30 and 31, that were present in the prior art rotors. The inboard facing surface 640 of the flange mounting segment 622 preferably extends perpendicular to the longitudinal central axis AA and has no more than a very small tolerance deviation from being perfectly flat and perpendicular. Being free of wheel stud clearance reliefs eliminates a potential weak area of a rotor and that may result in relatively high stress concentrations and lowers overall stress in this region of the rotor.

The rotor 604 of disc brake hub and rotor assembly 600 has a transition region 644 (FIGS. 30-33) of the rotor. The transition region 644 (FIGS. 30-33) of the rotor 604 may be as cast, machined or a combination of as cast and machined. The transition region 644 is located between the flange mounting segment 622 and the sleeve segment 624 and smoothly blends and connects the flange mounting segment with the sleeve segment. The transition region 644 is also free of wheel stud clearance reliefs. It is this transition region 644 having specific geometry that was demonstrated by Finite Element Analysis to be desirable for the rotor 604 to have a relatively light weight while maintaining sufficient strength and fatigue life for operation.

The geometry of the transition region 644, best seen in FIGS. 32-33, includes a first radiused portion defining an undercut portion 662, an angled or inclined surface 664, a surface defining a cylindrical portion 665 and a surface defining a second radiused portion 668. Recognizing that the rotor 604 is actually a substantially cylindrical component, the transition region 644 will be described below as it appears in cross-section illustrated in FIG. 33. The geometry of the transition region 644 will described in a direction from the inboard side towards the outboard side.

The angled or inclined surface 664 joined to the surface defining a cylindrical portion 665 extends axially outboard from the surface defining the second radiused portion 668 in the sleeve segment 624. The radiused portion 668 smoothly blends and extends from the outer surface of the cylindrical sleeve segment 624. The radiused portion 668 has a radius TR1 in the range of about 0.20 inch to about 0.30 inch, and preferably about 0.25 inch. The radiused portion 668 then transitions in the axial outboard direction into the cylindrical portion 665 for an axial distance TD1. TD1 is the axial distance between the outboard ends of the cylindrical portion 665 and the sleeve segment 624 of the rotor 604. The distance TD1 is in the range of about 0.64 inch to about 0.70 inch, and preferably about 0.67 inch. The cylindrical portion 665 is offset from the outer cylindrical surface of the sleeve segment 624 by a distance TD2. The distance TD2 is in the range of about 0.50 inch to about 0.90 inch, and preferably about 0.70 inch. The cylindrical portion 665 then smoothly blends and extends axially outboard into the inclined portion 664. The inclined portion 664 extends at an angle relative to the longitudinal central axis AA of the rotor 604 of about 18° to about 28°, and preferably about 23°. The inclined portion 664 extends axially for a distance TD3. The distance TD3 is in the range of about 0.45 inch to about 0.55 inch, and preferably about 0.50 inch. The inclined portion 664 extends radially from the cylindrical portion 665 for a distance TD4. The distance TD4 is in the range of about 0.17 inch to about 0.21 inch, and preferably about 0.19 inch. The inclined portion 664 then blends axially outboard into the undercut portion 662. The undercut portion 662 has a radius TR2 in the range of about 0.15 inch to about 0.20 inch, and preferably about 0.18 inch. The undercut portion 662 provides sufficient clearance for the entire head 660 of the wheel stud 642 to always sit flush against the planar inboard facing surface 640 when the wheel stud is tightened. This maximizes the contact under the head 660 of the wheel stud 642 against the planar inboard facing surface 640 and creates a relatively strong horizontal section just below the head to resist axial displacement of the sleeve segment 624 of the rotor 604. During heavy cornering of the heavy-duty vehicle this relatively strong horizontal section just below the head 660 reduces the sensitivity of the stress riser in the rotor 604 in the transition region 644. The undercut portion 662 transitions into the planar inboard facing surface 640 adjacent the openings 648 for a 11.25" bolt circle diameter S1 (FIG. 30) of 11.25 inches to the hub at a location that that has a diameter D24 (FIG. 33). The diameter D24 is in the range from about 9.85 inches to about 9.95 inches and preferably about 9.90 inches.

The sleeve segment 624 of the rotor 604 of disc brake hub and rotor assembly 600 has a machined brake caliper clearance section 624C (FIGS. 31-32) in the sleeve segment of a first outer diameter D20. Outer diameter D20 of the caliper clearance section 624C should be in the range of no greater than about 9.00 inches to about 9.20 inches, and preferably about 9.034 inches. A ratio of the first outer diameter D20 to the first outer diameter H of the bearing receiving surface 392 of the axle spindle 302 (D20/H) may be in the range from about 2.4 to about 2.7, preferably in the range from about 2.50 to about 2.65 and more preferably about 2.581. The bolt circle diameter S1 to the outer diameter D20 of the caliper clearance section 624C has a ratio (S1/D20) in the range of about 1.23 to about 1.26, and preferably about 1.25. The caliper clearance section 624C is located between cast axially opposite sleeve end sections 624E having second outer diameters D22. The second outer diameters D22 are in the range of about 9.086 inches to about 9.246 inches, and preferably about 9.166 inches. The second outer diameters D22 are greater than the first outer diameter D20. One of the sleeve end sections 624E is located in the transition region 644 of the rotor 604 and may be machined. The rotor barrel or sleeve segment 624 is made up of the brake caliper clearance section 624C and the sleeve end sections 624E.

The body 608 of the hub 602 has a second outer diameter C1 (FIG. 30). The second outer diameter C1 is in the range from about 5.40 inches to about 5.90 inches, preferably in the range from about 5.50 inches to about 5.80 inches and more preferably about 5.73 inches. The sleeve segment 624 of the rotor 604 has a radial thickness Q1 (FIG. 33) in the range from about 0.25 inches to about 0.55 inches, preferably in the range from about 0.30 inches to about 0.40 inches and more preferably about 0.334 inches. A ratio of the second outer diameter C1 to the first outer diameter H of the bearing receiving surface 392 of the axle spindle 302 (C1/H) may be in the range from about 1.52 inches to about 1.69 inches, preferably in the range from about 1.61 inches to about 1.64 inches and more preferably about 1.618 inches. A ratio of the bolt circle diameter S1 (FIG. 30) to the second outer diameter C1 (S1/C1) may be in the range of about 1.9 to about 2.1 and preferably in the range of about 1.94 to about 2.05.

The disc segment 620 of the rotor 604 has an outer diameter F1 (FIG. 31). The outer diameter F1 is in the range from about 16.00 inches to about 17.10 inches and preferably is about 16.14 inches, 16.339 inches, 16.54 inches, 16.929 inches or 17.08 inches. A ratio of the outer diameter F1 to the first outer diameter H of the bearing receiving surface 392 of the axle spindle 302 (F1/H) may be in the range from about 4.35 to about 4.90, preferably about 4.55, 4.67 or 4.84, and more preferably about 4.613. A ratio of the outer diameter F1 to the radial thickness Q1 (FIG. 33) of the sleeve segment 624 of the rotor 604 (F1/Q1) may in the range from about 40.5 to about 55.5, preferably about 40.62 or 55.33, and more preferably about 48.92 or 50.68.

As illustrated in FIGS. 33-34, the wheel studs 642 extend through the respective openings 648 in the flange mounting segment 622 of the rotor 604. The wheel studs 642 also extend through respective openings 680 in the flange 606. The openings 648 in the flange mounting segment 622 of the rotor 604 and the openings 680 in the flange 606 are preferably equal in number and circumferentially aligned. The openings 648 in the flange mounting segment 622 of the rotor 604 have an inner diameter D40. The openings 680 in the flange 606 have an inner diameter D42 of about 0.884 inch. The diameters D40 of the openings 648 in the flange mounting segment 622 of the rotor 604 are greater than the diameters D42 of the openings 680 in the flange 606.

The flange mounting segment 622 of the rotor has a thickness T1 (FIG. 34) taken in an axial direction in the range of about 0.60 inch to about 0.80 inch and preferably about 0.72 inch. Each of the wheel studs 642 has a knurled portion 682 (FIGS. 34-35) extending axially from the head 660 for a length L1 of about 0.35 inch and a peak-to-peak outer diameter D44 of the knurled portion. The peak-to-peak outer diameter D44 of the knurled portion 682 is sized to have a suitable interference fit within the inner diameter D40 of the openings 648 in the flange mounting segment 622. The knurled portion 682 of the wheel stud 642 extends through and engages surfaces of the openings 648 in the flange mounting segment 622 of the rotor 604. Since the outside diameter of the knurled portion 682 is slightly larger than the inside diameter D40 of the opening 648, thus there is a press or interference fit of the knurled portion into the flange mounting segment 622 of the rotor 604. Such interference fit engagement inhibits relative movement between the wheel studs 642 and the flange mounting segment 622 of the rotor 604. The axial length L1 of the knurled portion 682 may be less than the thickness T1 of the openings 648 in the flange mounting segment 622. The length L1 of the knurled portion 682 may be varied. The knurled portion 682 is shown as being axially located close to the beginning of the opening 648 at the inboard side of the flange mounting segment 622 of the rotor 604. The location of the knurled portion 682 within the opening 648 may be varied axially from what is shown in FIG. 34.

The flange 606 has a thickness T2 taken in an axial direction in the range of about 0.450 inch to about 0.550 inch, and preferably about 0.500 inch. Each of the wheel studs 642 has a cylindrical portion 684 extending axially from the knurled portion 682 for a length L2 of about 0.53 inch. The cylindrical portion 684 has an outer diameter D46 of about 0.888 or slightly greater. Thus, the cylindrical portion 684 of the wheel stud 642 may extend into the openings 680 in the flange 606 with a slight interference fit. A cylindrical surface 688 extends axially from the knurled portion 682. The cylindrical surface 688 has an outer diameter that is slightly less than the inner diameter D40 of the openings 648 in the flange mounting segment 622 for a clearance fit.

Each wheel stud 642 has an axial extent LKC (FIG. 35) taken from the leading or outboard edge of the smaller cylindrical portion 684 to the leading edge of the knurled portion 682. The axial extent LKC is no greater than 0.080 inch more than the thickness T1 of the flange mounting segment 622 of the rotor 606 plus the thickness T2 of the flange 606. The rotor 604 is aligned and centered on the assembled hub 602 and flange 606 by first having the cylindrical portion 684 engage the opening 680 in the flange before the knurled portion 682 engages the opening 648 in the flange mounting segment 622. The cylindrical portion 684 is at least partially interference fit into the opening 680 in the flange 606 before the knurled portion 682 is interference fit into the opening 648. This reduces stress in the area of the openings 648 in the rotor 604 when the wheel stud 642 is completely in place by having the head 660 of the wheel stud engaging the inboard facing surface 640 of the rotor. An axial extent LCF (FIG. 33) is taken is from the outboard end of the chamfer in the opening 648 of the rotor flange to the lead in chamfer. The hub and rotor assembly 600 has an axial extent LCC (FIG. 34) from an outboard edge of the chamfer 690 in the opening 648 in the flange mounting section 622 to the outboard edge of the inboard chamfer 692 in the opening 680 in the flange 606. The axial extent LCF is greater than the axial extent LCC.

The wheel stud 642 also includes a threaded portion 686. The threaded portion 686 of the wheel stud 642 extends axially from the cylindrical portion 684. The threaded portion 686 is intended to extend beyond the outboard surface of the flange 606. The threaded portion 686 receives a vehicle wheel rim (not shown) and nut (not shown) that tightens the wheel rim against the flange 606, as is known. Upon tightening of the nut against the wheel rim, the wheel rim engages the flange 606 which is secured in intimate contact with the mounting section 622 of the rotor 604.

The flange mounting segment 622 of the rotor 604 may be formed with its outboard facing surface 702 (FIGS. 29 and 31) having a circumferentially continuous and solid construction. However, according to an aspect of the disclosed subject matter, the flange mounting segment 622 of the rotor 604 is constructed having a plurality of circumferentially spaced apart bosses 700 (FIG. 29) in the outboard facing surface 702 for engaging the wheel mounting flange 606. Each of the bosses 700 has a respective one of openings 648 extending through the flange mounting segment 622. Each of the openings 648 in the bosses 700 receive a respective one of the wheel studs 642. The wheel studs 642 may assist in centering the rotor 604 with the flange 606. The wheel studs 642 are preferably press into both the openings 648 in the rotor 604 and the openings in the flange 606. This establishes a correct relative position of the rotor 604 and flange 606 before wheels are installed and wheel nuts tightened on the wheel studs 642.

The bosses 700 define a plurality of scallops 704 formed in the outboard surface 702 of the flange mounting segment 622 of the rotor 604. Each scallop 704 is defined by circumferentially adjacent bosses 700. The scallops 704 between the bosses 700 may be provided to lighten the weight of the rotor 604 without losing functional strength. Therefore, the weight of the disc brake hub and rotor assembly 600 is correspondingly reduced.

The scallops 704 may also cooperate with an inboard facing surface 706 (FIGS. 30-31) of the flange 606 to form radially extending passages 720. Each scallop 704 has surfaces that act as impellers to force or pump cooling fluid to flow through the passages 720. Fluid may flow from a cavity 708 defined by the interior of the sleeve segment 624 of the rotor 604. Fluid flow from the cavity 708 through the passages 720 functions to cool the hub and rotor assembly 600. Cooling of the hub and rotor assembly 600 may assist in extending the service life of lubricant, bearings and main wheel seal within the hub 602.

An improved disc brake rotor 804, according to another aspect of the disclosed subject matter is illustrated in FIG. 36. The improved rotor 804 is intended for use in a disc brake hub and rotor assembly for a heavy-duty vehicle. The improved rotor 804 offers the same advantages and overcomes the same limitations, drawbacks and disadvantages that the rotor 604 does, described above. The improved rotor 804 satisfies the need to be relatively easy to handle due to its relatively light weight, and to provide a rotor with a transition region that reduces undesirable relatively high stress concentrations in some regions of a rotor.

The rotor 804 has a radially extending disc segment 820, a flange mounting segment 822, and a substantially cylindrical sleeve segment 824 connecting the disc segment to the flange mounting segment. The cylindrical sleeve segment 824 rigidly and permanently connects the disc segment 820 with the flange mounting segment 822. The disc segment 820, flange mounting segment 822 and cylindrical sleeve segment 824 are preferably integrally formed as one-piece to form the rotor 804 from a suitable material. The disc segment 820 is engageable by friction pads of a disc brake system to slow rotation of the disc segment and rotor 804 and ultimately stop motion of the heavy-duty vehicle, as is known.

The flange mounting segment 822 of the rotor 804 has an inboard facing surface (not visible in FIG. 36) at least part of which is for engaging portions, such as heads (not shown) of wheel studs (not shown). The wheel studs extend through openings 846 in the flange mounting segment 822 of the rotor 804. The inboard facing surface is substantially planar and free of wheel stud clearance reliefs that were present in the prior art rotors, as illustrated in FIGS. 26 and 27. Being free of wheel stud clearance reliefs eliminates a potential weak area of a rotor structure and minimizes relatively high stress concentrations and lowers overall stress in this region of the rotor. The absence of wheel stud clearance reliefs stiffens the rotor 804 in the axial direction at the flange mounting segment 822 to reduce stress on the flange mounting segment of the rotor near area of contact with the flange 606.

According to an aspect of the disclosed subject matter, the flange mounting segment 822 of the rotor 804 is constructed having a plurality of circumferentially spaced apart wheel engaging bosses 840 (FIG. 36) in the outboard facing surface 842. Each of the bosses 840 has a respective one of openings 846 extending through the flange mounting segment 822. Each of the openings 846 in the bosses 840 receive a respective one of the wheel studs. The bosses 840 engage a wheel mounting flange (not shown). Ten bosses 840 are illustrated in FIG. 36, but any suitable number of bosses may be employed depending upon the application in which the rotor 804 is to be used.

The bosses 840 define a plurality of scallops 844 formed in the outboard surface 842 of the flange mounting segment 822 of the rotor 804. Each of the scallops 844 is located between a circumferentially adjacent pair of the bosses 840. The scallops 844 may be provided to lighten the weight of the disc brake rotor 804 without losing functional strength. The scallops 844 may also be employed to conduct cooling fluid flow.

The flange mounting segment 822 of the rotor 804 preferably has a plurality of lips 848. Each of the lips 848 extend axially outboard from a respective one of the bosses 840. Each lip 848 has an arcuate shape, viewed axially inboard, extending substantially for the width of the boss 840. It will be appreciated that any suitable shape and dimension may be adopted for a lip 848. The lips 848 assists in receiving and positioning the flange. While a lip 848 is illustrated as extending from each boss 840, it will also be appreciated that any suitable number of lips 848 may be utilized.

The features of aspects of the disclosed subject matter cooperate to provide an improved serviceability of components of the disc brake hub and rotor assembly 100, 200, 300, 600, and rotor 804 by being separable, lighter in weight for easier handling, operating at relatively cooler temperatures and potentially not requiring involvement of highly skilled service technicians in order to minimize cost and downtime of the heavy-duty vehicle. While reference herein has been made generally to a heavy-duty vehicle for the purpose of convenience, it is with the understanding that such reference includes trucks, tractor-trailers and semi-trailers, and trailers thereof.

It is to be understood that the structure and arrangement of the exemplary disc brake hub and rotor assembly 100, 200, 300, 600, and rotor 804 for heavy-duty vehicles of the disclosed subject matter may be altered or rearranged without affecting the overall concept or operation. In addition, the disc brake hub and rotor assembly 100, 200, 300, 600, and rotor 804 for heavy-duty vehicles of the disclosed subject matter may be employed with other types of axles, wheel end assemblies, and/or brake systems than those shown and described above, without affecting the overall concept or operation of the invention. It is to be understood that the hub and rotor assembly 100, 200, 300, 600, and rotor 804 of the disclosed subject matter may find application in all types of disc brake systems without affecting the concept or implementation.

In the foregoing description, certain terms have been used for brevity, clarity and understanding, but no unnecessary limitations are to be implied because such terms are used for descriptive purposes and are intended to be broadly construed. Moreover, the disclosed subject matter has been described with reference to exemplary aspects. It shall be understood that the description and illustration is by way of example and not by way of limitation. Potential modifications and alterations may occur to others upon a reading and understanding of the disclosed subject matter, and it is understood that the disclosed subject matter may include all such modifications and alterations and equivalents thereof.

What is claimed is:

1. A disc brake hub and rotor assembly for a heavy-duty vehicle, the disc brake hub and rotor assembly comprising:
   a hub receivable on and rotatable about an axle spindle of a heavy-duty vehicle;
   a rotor connectable with the hub for rotation with the hub, the rotor including a disc segment, a flange mounting segment, and a substantially cylindrical sleeve segment connecting the disc segment and the flange mounting segment;
   a flange connectable with the flange mounting segment of the rotor and separately with the hub; and
   the flange mounting segment of the rotor having an inboard facing surface at least part of which is for engagement with head portions of wheel studs, the inboard facing surface being substantially planar and free of wheel stud clearance reliefs.

2. The disc brake hub and rotor assembly of claim 1 further including a transition region of the rotor located between the flange mounting segment and sleeve segment, the transition region being free of wheel stud clearance reliefs.

3. The disc brake hub and rotor assembly of claim 2 wherein the transition region includes a pair of joined planar surfaces extending axially outboard from a radiused surface formed in the sleeve segment.

4. The disc brake hub and rotor assembly of claim 1 wherein the sleeve segment includes a caliper clearance section of a first diameter located between axially opposite sleeve end sections of second diameters greater than the first diameter, one of the sleeve end sections located in the transition region.

5. The disc brake hub and rotor assembly of claim 1 further including a plurality of wheel studs extending through respective openings in the flange mounting segment of the rotor and through respective openings in the flange, the flange mounting segment having a thickness taken in an axial direction, the diameter of the openings in the flange mounting segment of the rotor being greater than the diameter of the openings in the flange.

6. The disc brake hub and rotor assembly of claim 5 further including each of the wheel studs having a knurled portion extending axially through and engaging surfaces of the openings in the flange mounting segment of the rotor, an axial length of the knurled portion being less than the thickness of the flange mounting segment.

7. The disc brake hub and rotor assembly of claim 5 further including each of the wheel studs having a cylindrical portion extending axially for a length through the openings in the flange, the cylindrical portion for interference fit with surfaces of the openings in the flange.

8. The disc brake hub and rotor assembly of claim 1 further including circumferentially spaced wheel engaging boss surfaces in an outboard surface of the flange mounting segment of the rotor, the boss surfaces define scallops for cooling fluid to flow through.

9. The disc brake hub and rotor assembly of claim 8 further including a lip on the flange mounting segment of the rotor, the lip extending axially from a wheel engaging boss surface.

10. A disc brake component assembly for a heavy-duty vehicle, the disc brake assembly comprising:
a rotor including a disc segment, a flange mounting segment and a substantially cylindrical barrel segment connecting the disc segment and the flange mounting segment, the flange mounting segment having a thickness taken in an axial direction;
a plurality of circumferentially arranged openings extending through the flange mounting segment;
a flange connectable with the flange mounting segment of the rotor;
a plurality of circumferentially arranged openings extending through the flange, each of the openings in the flange being aligned with a respective one of the plurality of openings in the flange mounting segment;
a plurality of wheel studs extendable through the openings in the flange mounting segment of the rotor and through the openings in the flange; and
at least one of the wheel studs having a knurled portion and a cylindrical portion, the knurled portion extending axially for a length through an opening in the flange mounting segment of the rotor, the knurled portion engaging a surface of the opening in the flange mounting segment, the length of the knurled portion being no greater than the thickness of the flange mounting segment, the cylindrical portion being axially spaced from the knurled portion and extending axially for a length though an opening in the flange and at least partially engaging the opening in the flange via an interference fit, whereby stress in an area around the opening in the flange mounting segment of the rotor is reduced.

11. The disc brake component assembly of claim 10 wherein the diameter of the openings in the flange mounting segment of the rotor being greater than the diameter of the openings in the flange.

12. A disc brake hub and rotor assembly for a heavy-duty vehicle, the disc brake hub and rotor assembly comprising:
a hub receivable on and rotatable about an axle spindle of a heavy-duty vehicle;
a rotor including a disc segment, a flange mounting segment, and a substantially cylindrical sleeve segment connecting the disc segment and the flange mounting segment, the flange mounting segment having an axial thickness;
a plurality of circumferentially arranged openings extending axially through the flange mounting segment of the rotor;
a flange connectable with the flange mounting segment of the rotor and separately with the hub;
a plurality of circumferentially arranged openings extending axially through the flange;
a plurality of wheel studs extendable through the openings in the flange mounting segment of the rotor and through the openings in the flange;
the flange mounting segment of the rotor having an inboard facing surface at least part of which is for engaging a portion of the plurality of wheel studs, the inboard facing surface being substantially planar and free of wheel stud clearance reliefs; and
at least one of the wheel studs having a knurled portion extending axially for a length through an opening in the flange mounting segment of the rotor, the knurled portion for engaging surfaces of the openings in the flange mounting segment, the length of the knurled portion being no greater than the axial thickness of the flange mounting segment.

13. The disc brake hub and rotor assembly of claim 12 wherein the hub includes a cylindrical surface for supporting and centering the flange on the hub, an outboard facing annular surface for engaging an inboard facing annular surface of the flange to establish the axial position of the flange on the hub, and an annular groove located between the cylindrical surface of the hub and the outboard facing annular surface of the hub, the annular groove having a specific configuration with surfaces of three different radii and an axially extending cylindrical surface located among the different radii.

14. The disc brake hub and rotor assembly of claim 13 wherein the annular groove has a first radius extending axially outboard from the outboard facing annular surface of the hub, a second radius extending axially outboard from the first radius, a cylindrical surface extending axially outboard from the second radius, and a third radius extending axially outboard from the cylindrical surface.

15. The disc brake hub and rotor assembly of claim 14 wherein the first radius of the annular groove being about 0.129 inch and extending axially about 0.064 inch, the second radius being about 0.574 inch and extending axially from the first radius for an axial extent of about 0.354 inch, the cylindrical surface extending axially from the second radius an axial distance of about 0.032 inch, and the third radius being about 0.296 inch and extending from the cylindrical surface.

16. The disc brake hub and rotor assembly of claim 12 further including a cylindrical portion on the at least one of the wheel studs, the cylindrical portion being axially spaced from the knurled portion and for being interference fit into an opening in the flange.

17. The disc brake hub and rotor assembly of claim 16 further including the cylindrical portion for being interference fit into the opening in the flange before the knurled portion is interference fit into the opening in the flange mounting segment of the rotor.

18. The disc brake hub and rotor assembly of claim 12 further including a transition region of the rotor located between the flange mounting segment and the sleeve segment, the transition region being free of wheel stud clearance reliefs.

19. The disc brake hub and rotor assembly of claim 18 wherein the sleeve segment includes a caliper clearance section of a first diameter located between axially opposite sleeve end sections of second diameters greater than the first diameter, one of the sleeve end sections being located in the transition region.

20. The disc brake component assembly of claim 12 wherein the diameter of the openings in the flange mounting segment of the rotor being greater than the diameter of the openings in the flange.

21. The disc brake hub and rotor assembly of claim 12 further including circumferentially spaced surfaces defining reliefs in an outboard surface of the flange mounting segment of the rotor for cooling fluid to flow through.

22. The disc brake hub and rotor assembly of claim 12 wherein the hub has an outer dimension, the rotor having an inner dimension, the smallest inner dimension of the rotor being greater than the largest outer dimension of the hub to facilitate removal of the rotor without removing the hub portion from the axle spindle.

23. The disc brake hub and rotor assembly of claim 12 wherein the rotor has no contact with the hub.

24. A disc brake hub and rotor assembly for a heavy-duty vehicle, the disc brake hub and rotor assembly comprising:
a hub receivable on and rotatable about an axle spindle of a heavy-duty vehicle;
a rotor including a disc segment, a flange mounting segment, and a substantially cylindrical sleeve segment connecting the disc segment and the flange mounting segment, the flange mounting segment having an axial thickness;
a plurality of circumferentially arranged openings extending axially through the flange mounting segment of the rotor;
a flange connectable with the flange mounting segment of the rotor and separately with the hub;
a plurality of circumferentially arranged openings extending axially through the flange;
a plurality of wheel studs extendable through the openings in the flange mounting segment of the rotor and through the openings in the flange;
the flange mounting segment of the rotor having an inboard facing surface at least part of which is for engaging a portion of the plurality of wheel studs, the inboard facing surface being substantially planar and free of wheel stud clearance reliefs;
at least one of the wheel studs having a knurled portion extending axially for a length through an opening in the flange mounting segment of the rotor, the knurled portion for engaging surfaces of the openings in the flange mounting segment, the length of the knurled portion being no greater than the axial thickness of the flange mounting segment; and
the hub including a cylindrical surface for supporting and centering the flange on the hub, an outboard facing annular surface for engaging an inboard facing annular surface of the flange to establish the axial position of the flange on the hub, and an annular groove located between the cylindrical surface of the hub and the outboard facing annular surface of the hub, the annular groove having a specific configuration with surfaces of three different radii and an axially extending cylindrical surface located among the different radii.

25. The disc brake hub and rotor assembly of claim 24 wherein the annular groove has a first radius extending axially outboard from the outboard facing annular surface of the hub, a second radius extending axially outboard from the first radius, a cylindrical surface extending axially outboard from the second radius, and a third radius extending axially outboard from the cylindrical surface.

26. The disc brake hub and rotor assembly of claim 25 wherein the first radius of the annular groove being about 0.129 inch and extending axially about 0.064 inch, the second radius being about 0.574 inch and extending axially from the first radius for an axial extent of about 0.354 inch, the cylindrical surface extending axially from the second radius an axial distance of about 0.032 inch, and the third radius being about 0.296 inch and extending from the cylindrical surface.

\* \* \* \* \*